US011025949B2

(12) United States Patent
Takehara et al.

(10) Patent No.: US 11,025,949 B2
(45) Date of Patent: *Jun. 1, 2021

(54) MOVING PICTURE CODING DEVICE, MOVING PICTURE CODING METHOD AND MOVING PICTURE CODING PROGRAM, AND MOVING PICTURE DECODING DEVICE, MOVING PICTURE DECODING METHOD AND MOVING PICTURE DECODING PROGRAM

(71) Applicant: JVCKENWOOD Corporation, Yokohama (JP)

(72) Inventors: Hideki Takehara, Yokosuka (JP); Hiroya Nakamura, Yokosuka (JP); Shigeru Fukushima, Yokosuka (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,193

(22) Filed: Sep. 23, 2020

(65) Prior Publication Data
US 2021/0006822 A1    Jan. 7, 2021

Related U.S. Application Data

(60) Continuation of application No. 16/938,498, filed on Jul. 24, 2020, now Pat. No. 10,834,422, which is a
(Continued)

(30) Foreign Application Priority Data

Dec. 28, 2011 (JP) ................. 2011-288982
Dec. 28, 2011 (JP) ................. 2011-288983
(Continued)

(51) Int. Cl.
*H04N 19/52*      (2014.01)
*H04N 19/513*     (2014.01)
(Continued)

(52) U.S. Cl.
CPC ........... *H04N 19/52* (2014.11); *H04N 19/105* (2014.11); *H04N 19/176* (2014.11);
(Continued)

(58) Field of Classification Search
None
See application file for complete search history.

(56) References Cited

U.S. PATENT DOCUMENTS

2012/0219064 A1   8/2012  Zheng et al.
2012/0320984 A1*  12/2012  Zhou .................. H04N 19/463
                                                        375/240.16

FOREIGN PATENT DOCUMENTS

JP    10-276439 A    10/1998
RU    2562379 C2     9/2015

OTHER PUBLICATIONS

Wen et al. (Document: JCTVC-G387, Title: Parallel Merge/skip Mode for HEVC, Joint Collaborative Team on Video Coding (JCT-VC) of ITU-T SGI6 WP3 and ISO/IEC JTC1/SC29/WG11 7th Meeting: Geneva, CH, Nov. 21-30, 2011).*
(Continued)

*Primary Examiner* — Dakshesh D Parikh
(74) *Attorney, Agent, or Firm* — Brundidge & Stanger, P.C.

(57) ABSTRACT

A temporal merging motion information candidate generation unit derives, when information indicating whether or not to derive a temporal merging motion information candidate shared for all prediction blocks in a coding block is information indicating the derivation of a temporal merging motion information candidate shared for all the prediction
(Continued)

blocks in the coding block, a temporal merging motion information candidate shared for all the prediction blocks in the coding block from a prediction block of a coded picture different from a picture having a prediction block subject to coding. A merging motion information candidate list construction unit generates a plurality of merging motion information candidates including a temporal merging motion information candidate.

4 Claims, 36 Drawing Sheets

Related U.S. Application Data continuation of application No. 16/878,116, filed on May 19, 2020, now Pat. No. 10,771,810, which is a continuation of application No. 15/184,502, filed on Jun. 16, 2016, now Pat. No. 10,701,389, which is a division of application No. 14/299,732, filed on Jun. 9, 2014, now abandoned, which is a continuation of application No. PCT/JP2012/008427, filed on Dec. 28, 2012.

(30) Foreign Application Priority Data

Dec. 27, 2012 (JP) .................................. 2012-285808
Dec. 27, 2012 (JP) .................................. 2012-285809

(51) Int. Cl.
  *H04N 19/176* (2014.01)
  *H04N 19/70* (2014.01)
  *H04N 19/593* (2014.01)
  *H04N 19/503* (2014.01)
  *H04N 19/105* (2014.01)

(52) U.S. Cl.
  CPC ......... *H04N 19/503* (2014.11); *H04N 19/513* (2014.11); *H04N 19/593* (2014.11); *H04N 19/70* (2014.11)

(56) References Cited

OTHER PUBLICATIONS

Bross et al., "BoG Report on Non-CE MV Coding Proposals," Joint Collaborative Team on Video Coding (JCT-VC) of 1 TU-T SG16 WP3 and ISO/IEC JTC1/SC29/WG11 7th Meeting: Geneva, CH, Nov. 21-30, 2011, pp. 1-25 JCTVC-G1006]. [Cited in OA in counterpart EP Patent Application No. 12863054.8 dated Sep. 20, 2018].

Zheng et al., "Simplification and improvement of additional merge candidate," Joint Collaborative Team on Video 2 oding (JCT-VC) of ITU-T SG16 WP3 and ISO/IEC JTC1/SC29/WG11 7th Meeting: Geneva, CH, Nov. 21-30, 2011, pp. 1-8 [JCTVC-G683]. [Cited in OA in counterpart EP Patent Application No. 12863054.8 dated Sep. 20, 2018].

Zhou, "CE9: Test results on parallelized merge/skip mode," Joint Collaborative Team on Video Coding (JCT-VC) of 1 TU-T SG16 WP3 and ISO/IEC JTC1/SC291WG11, 7th Meeting: Geneva, CH, Nov. 19-30, 2011, pp. 1-15. [Cited in office Action in counterpart Taiwanese Patent Application Nos. 106106172 and 106106175, dated Apr. 17, 2018.

Kim, et al, "CU-based Merge Candidates List Constructions," Joint Collaborative Team on Video Coding (JCT-VC) of ITU-T SG16 WP3 and ISO/IEC JTC1/SC29/WG11 7th Meeting: Gevenva, Nov. 21, 2011, pp. 1-15 [JCTVC-G416].

International Search Report in PCT International Application No. PCT/JP2012/008427, dated Apr. 2, 2013.

International Preliminary Report on Patentability and Written Opinion in PCT International Application No. PCT/JP2012/008427, dated Jul. 1, 2014.

Oudin et al., "Cross-check of CU-based Merge Candidate List Construction", JCTVC-G899 7th meeting: Geneva, Suisse, 21-30 Nov. 15, 2011.

Wen et al., "Parallel Merge/skip Mode for HEVC", JCTVC-G387 7th meeting: Geneva, CH, 21-30, Nov. 21, 2011.

Supplementary European Search Report for European Application No. 12863054.8 dated Jul. 10, 2015.

Office Action of Substantive Examination in Russian Application No. 2014130463/07, dated Nov. 26, 2015.

Sugio, et al., "Parsing Robustness for Merge/AMVP," Joint Collaborative Team on Video coding (JCT-VC) of ITU-T SG16 WP3 and ISO/IEC JTC1/SC29/WG11, 6th Metting: Torino, IT, Jul. 14-22, 2011.

Takehara et al., "Temporal predictor restriction harmonized with motion vector compression," Joint Collaborative Team on Video Coding (JCT-VC) of ITU-T SG16 WP3 and ISO/IEC JTC1/SC29/WG11, 5th Meeting; Geneva, CH, Mar. 16-23, 2011, document JCTVC-E097 [Cited in Office Action in counterpart Japanese Patent Application No. 2015-226252, dated Dec. 20, 2016].

Bross et al., "WD4: Working Draft 4 of High Efficiency Video Coding," Joint Collaborative Team on Video Coding {JCT-VC) of ITU-T SG16 WP3 and ISO/IEC JTC1/SC29/WG11, 6th Meeting: Torino, IT, Jul. 14-22, 2011, document JCTVC-F803d6 [Cited in Office Action in counterpart Japanese Patent Application No. 2015-226252, dated Dec. 20, 2016].

\* cited by examiner

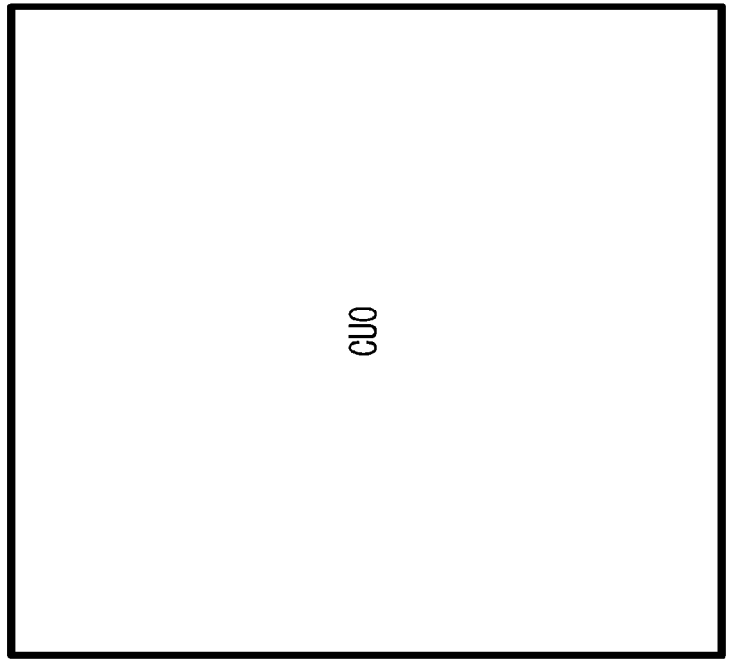
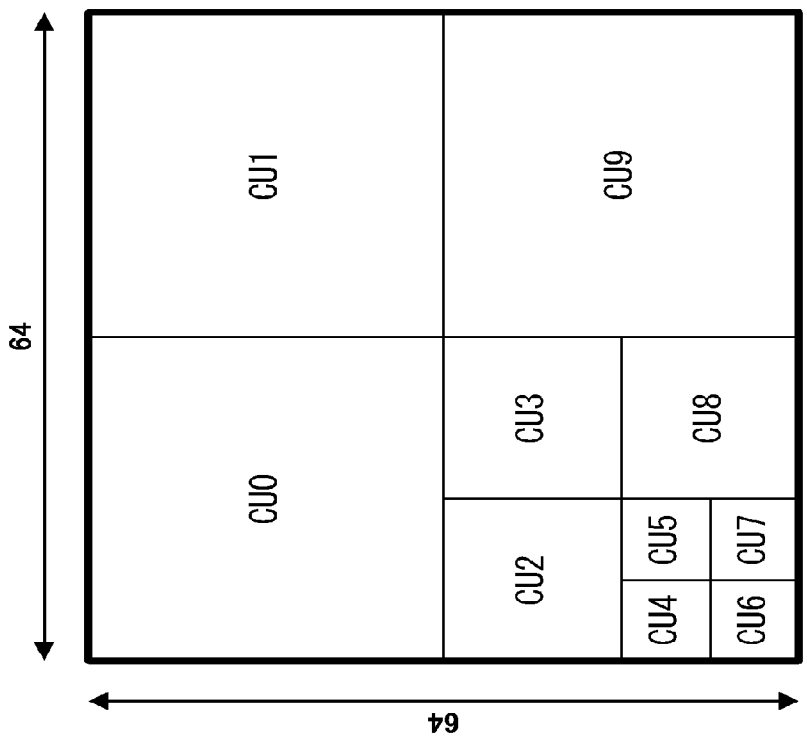

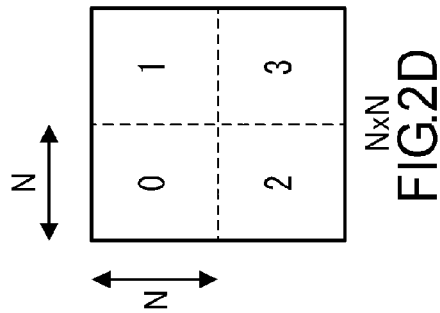
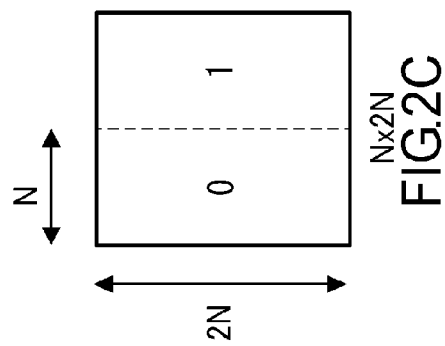
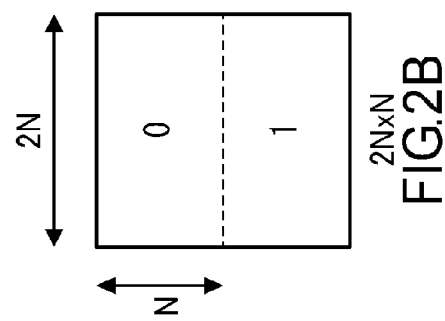
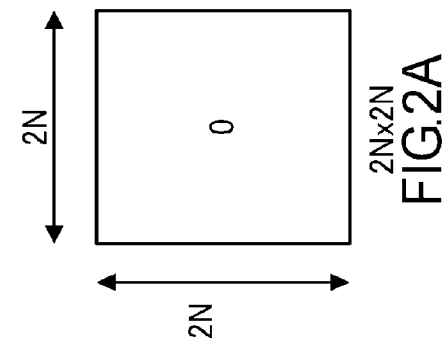

FIG.3

| NUMBER OF CU PARTITION OCCURRENCES | PREDICTION BLOCK SIZE TYPE | | | |
|---|---|---|---|---|
| | 2Nx2N | 2NxN | Nx2N | NxN |
| 0 | 64x64 | 64x32 | 32x64 | - |
| 1 | 32x32 | 32x16 | 16x32 | - |
| 2 | 16x16 | 16x8 | 8x16 | - |
| 3 | 8x8 | 8x4 | 4x8 | 4x4 |

FIG.4

| PREDIC-TION CODING MODE | PREDICTION DIRECTION OF MOTION COMPENSATION PREDICTION | NUMBER OF CODING VECTORS | NUMBER OF REFERENCE PICTURE INDICES | NUMBER OF VECTOR PREDICTOR INDICES | NUMBER OF MERGE INDICES |
|---|---|---|---|---|---|
| PredL0 | UNI-PREDICTION (L0 PREDICTION) | 1 | 1 | 1 | 0 |
| PredL1 | UNI-PREDICTION (L1 PREDICTION) | 1 | 1 | 1 | 0 |
| PredBI | BI-PREDICTION (BI PREDICTION) | 2 | 2 | 2 | 0 |
| MERGE | UNI-PREDICTION/ BI-PREDICTION | 0 | 0 | 0 | 1 |
| Intra | — | 0 | 0 | 0 | 0 |

FIG.5

| MERGE INDEX | BITSTREAM |
|---|---|
| 0 | 0 |
| 1 | 10 |
| 2 | 110 |
| 3 | 1110 |
| 4 | 1111 |

FIG.6

```
CodingTree()
{
   ...
   split_coding_unit_flag
   ...
   if( split_coding_unit_flag ) {
      for( noCT=0; noCT<4; noCT++ )
         CodingTree();
   }
   else
      Coding Unit();
}
```

```
Coding Unit()
{
   skip_flag
   if (skip_flag) {
      Prediction Unit();
   }
   else {
      ...
      pred_mode
      part_mode
      ...
      for( noPU=0; noPU<PartNum; noPU++ )
         Prediction Unit();
   }
}
```

```
Prediction Unit()
{
   if (skip_flag) {
      merge_idx
   }
   else if (pred_mode == INTER) {
      merge_flag
      if (merge_flag) {
         merge_idx
      } else {
         if (slice_type == B)
            inter_pred_type
         if (inter_pred_type != Pred_L1) {
            ref_idx_l0
            mvd_l0[0]
            mvd_l0[1]
            mvp_idx_l0
         }
         if (inter_pred_type != Pred_L0) {
            ref_idx_l1
            mvd_l1[0]
            mvd_l1[1]
            mvp_idx_l1
         }
      }
   }
}
```

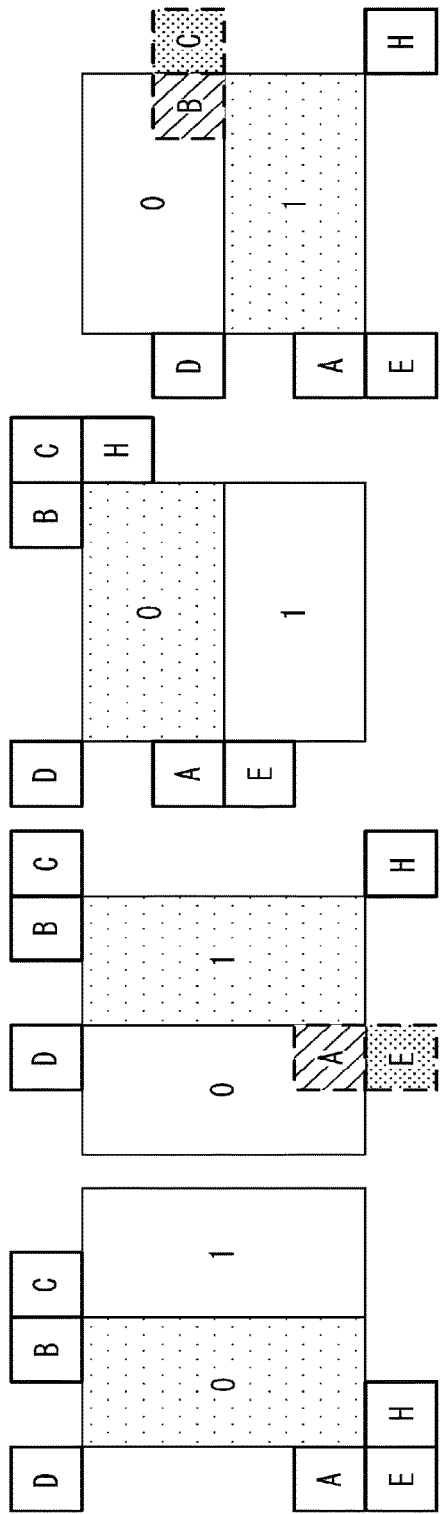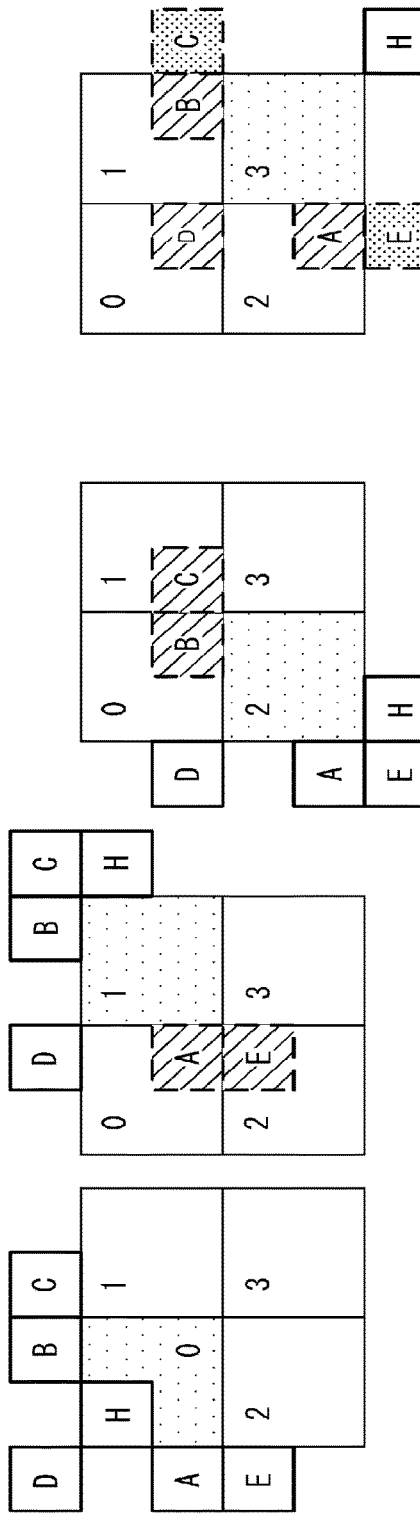

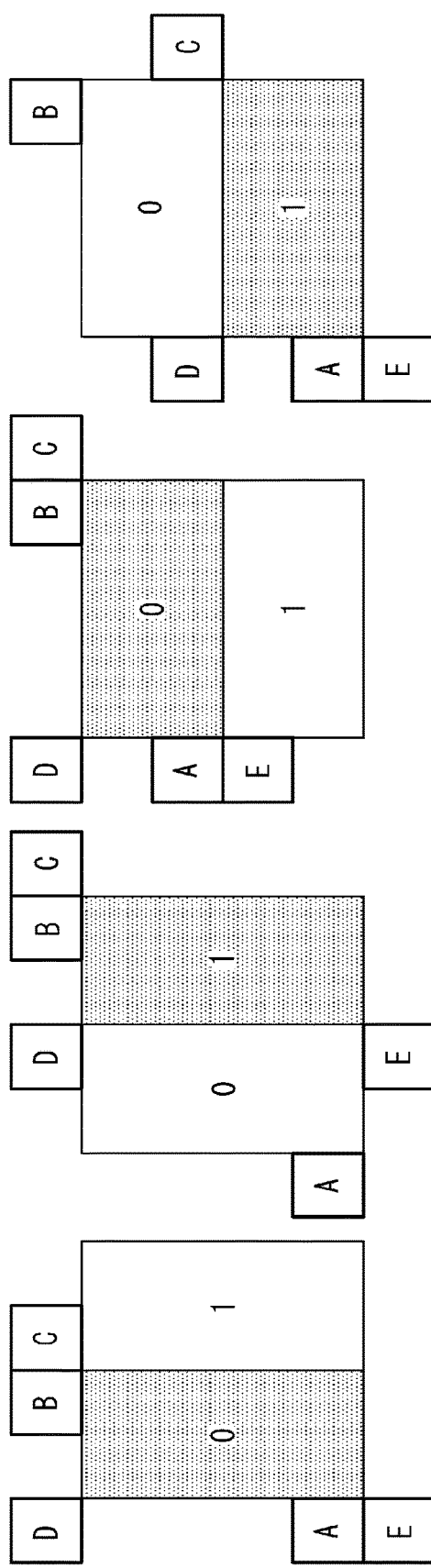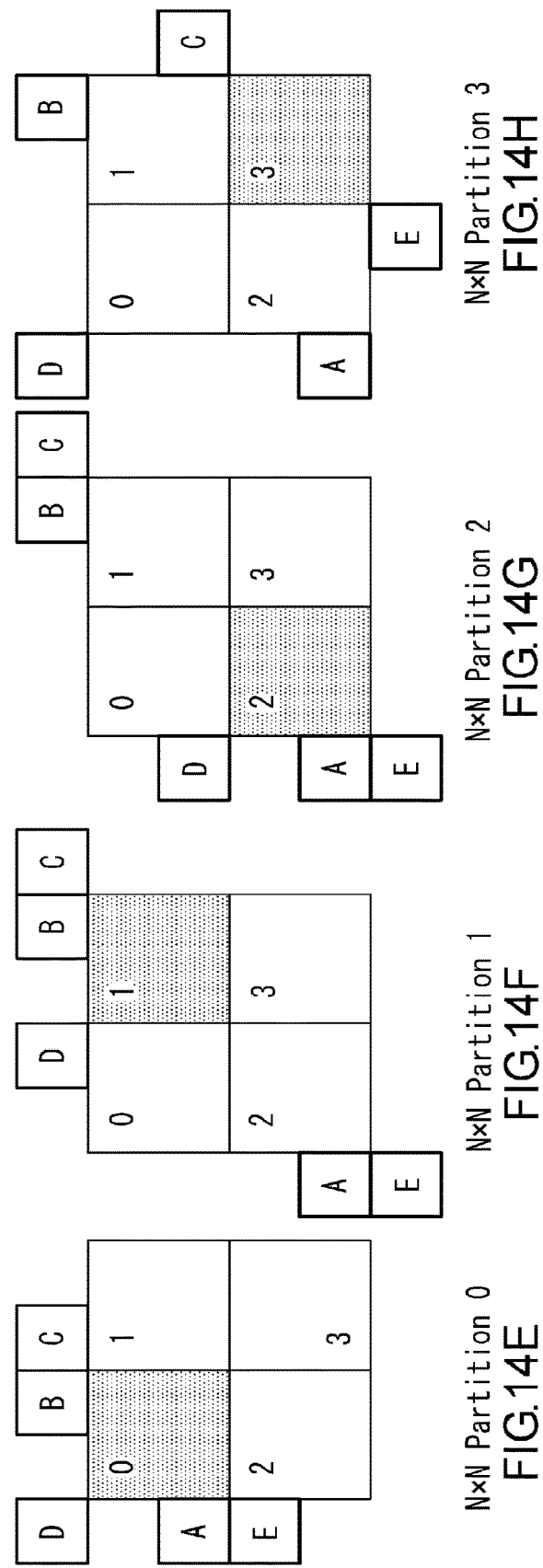

FIG.18

| loopTimes | M | N |
|---|---|---|
| 0 | 0 | 1 |
| 1 | 1 | 0 |
| 2 | 0 | 2 |
| 3 | 2 | 0 |
| 4 | 1 | 2 |
| 5 | 2 | 1 |
| 6 | 0 | 3 |
| 7 | 3 | 0 |

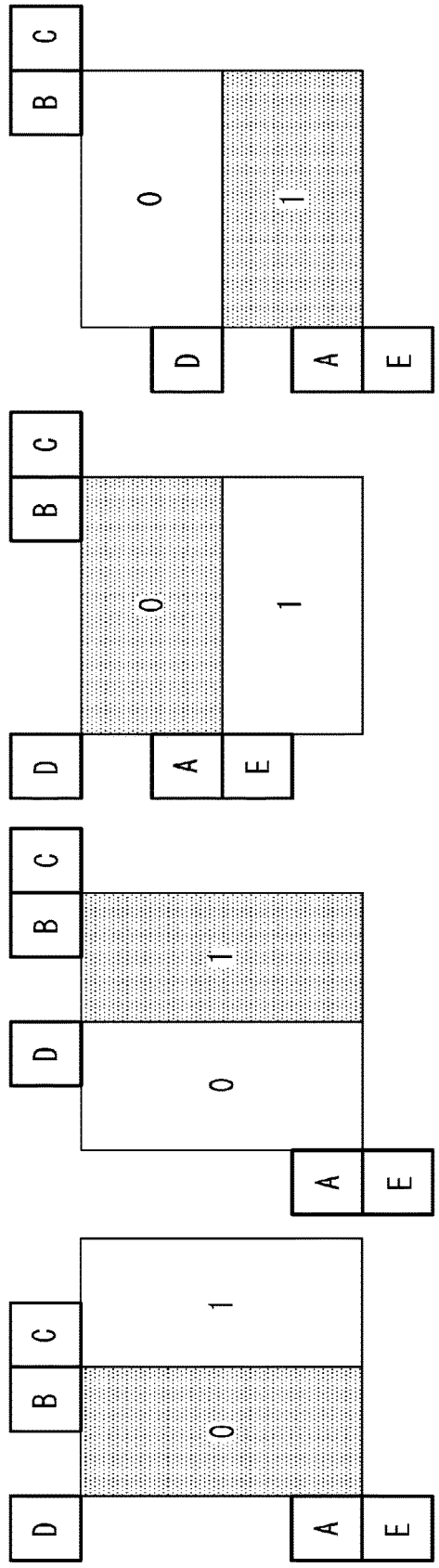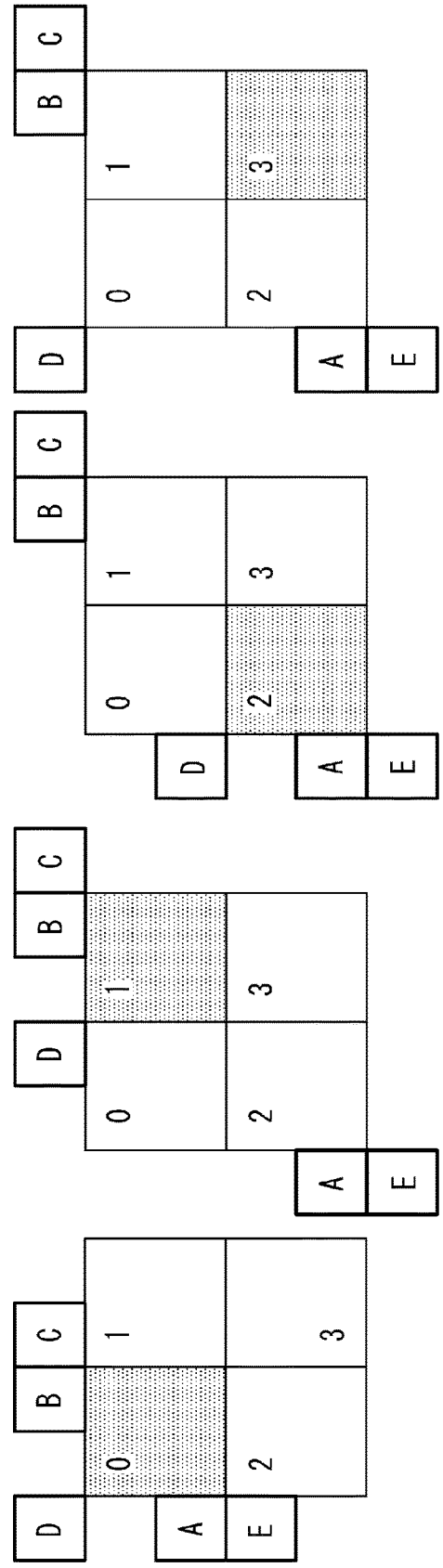

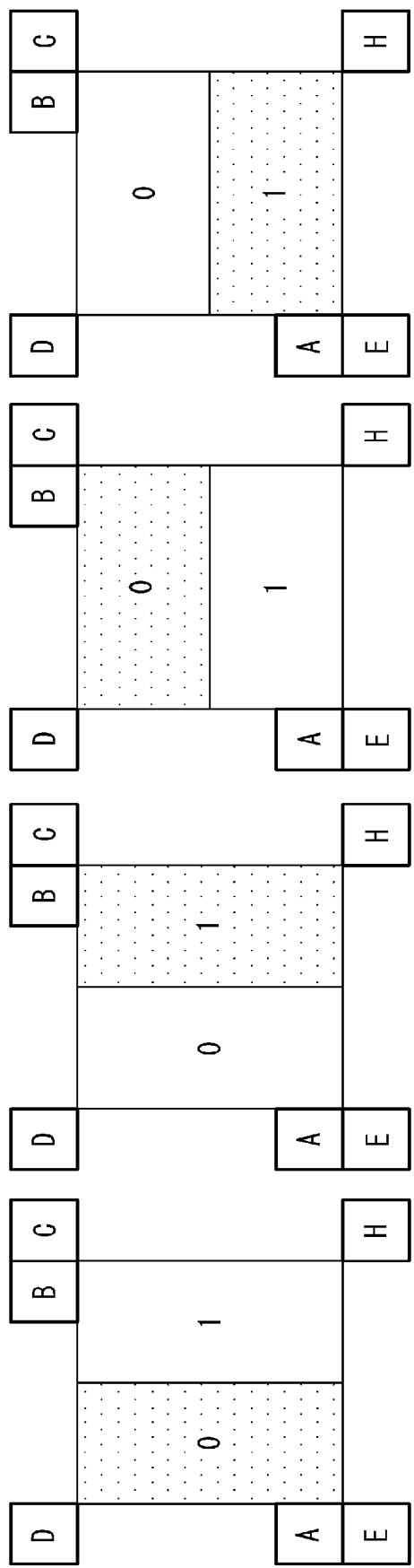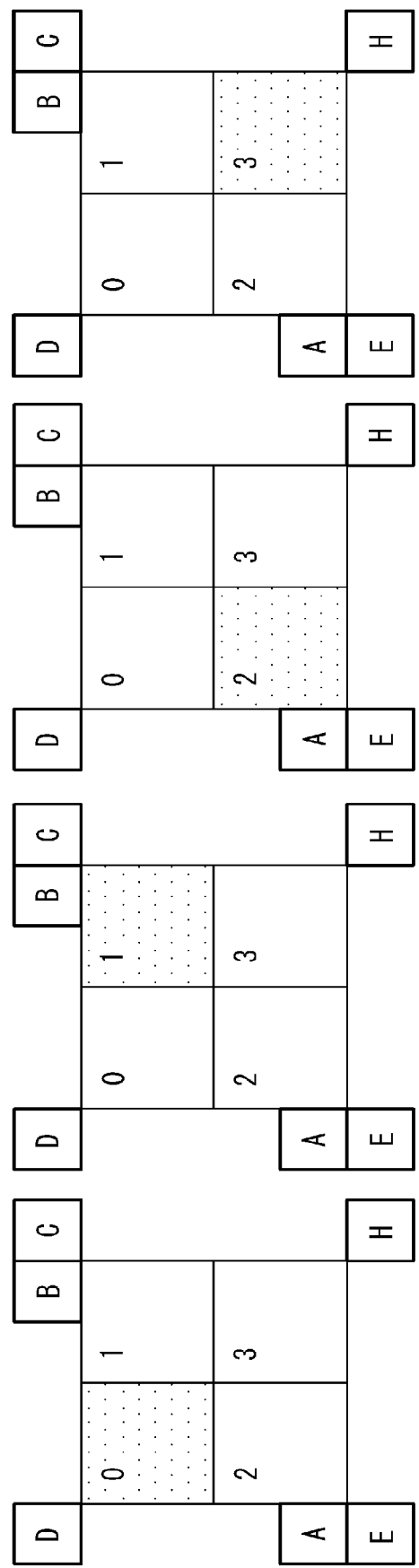

FIG.25A N×2N Partition 0

FIG.25B N×2N Partition 1

FIG.25C 2N×N Partition 0

FIG.25D 2N×N Partition 1

FIG.25E N×N Partition 0

FIG.25F N×N Partition 1

FIG.25G N×N Partition 2

FIG.25H N×N Partition 3

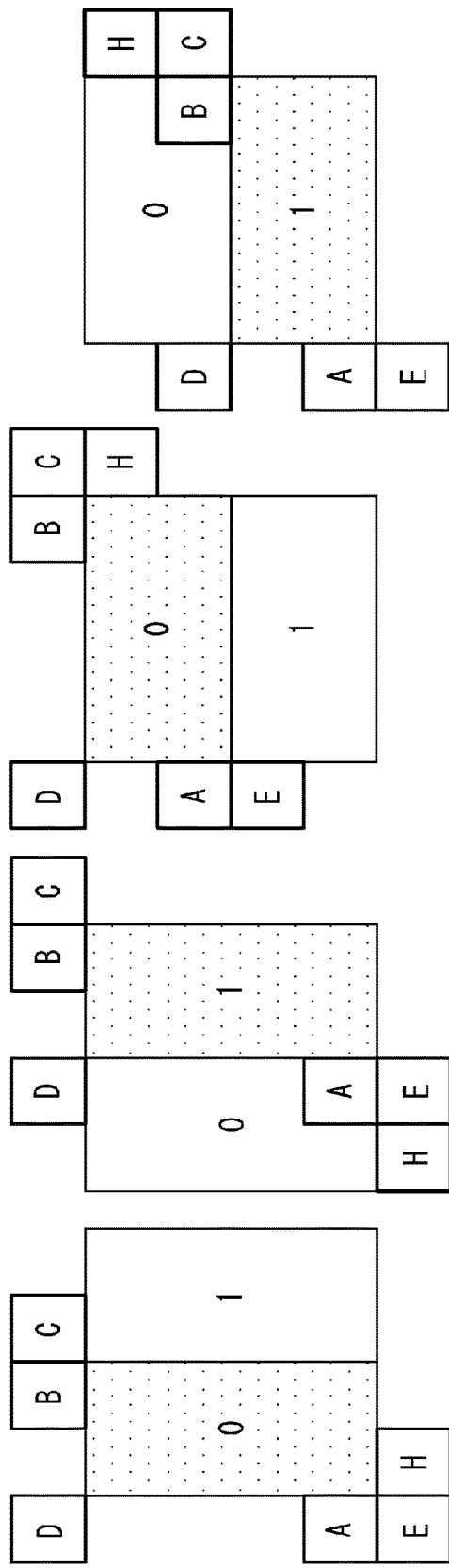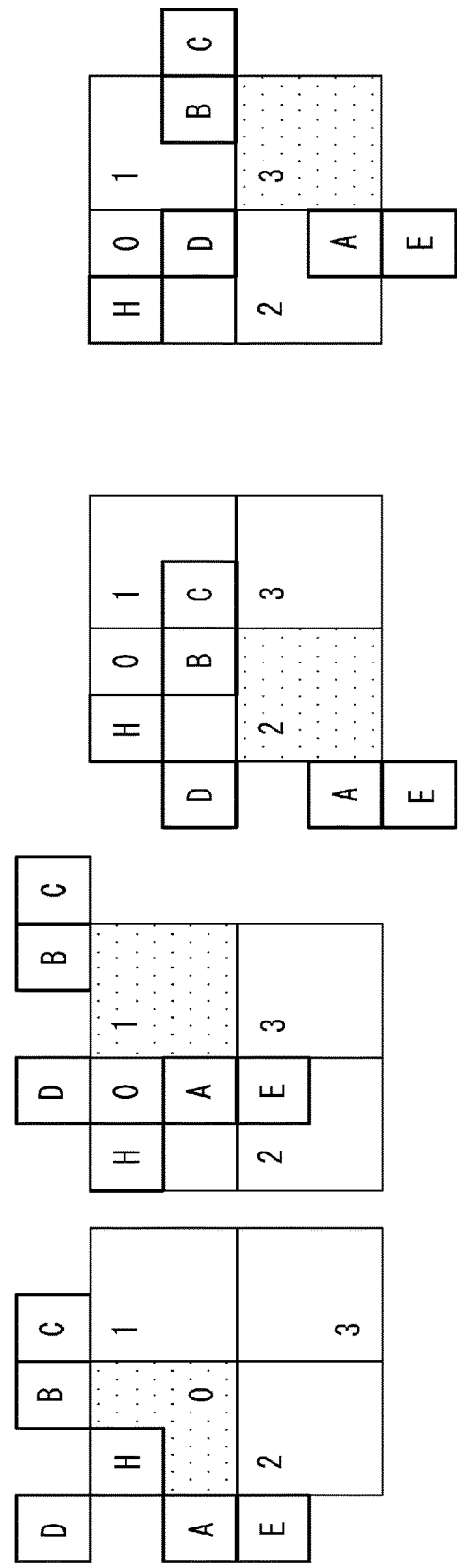

MOVING PICTURE CODING DEVICE, MOVING PICTURE CODING METHOD AND MOVING PICTURE CODING PROGRAM, AND MOVING PICTURE DECODING DEVICE, MOVING PICTURE DECODING METHOD AND MOVING PICTURE DECODING PROGRAM

CROSS-REFERENCE TO RELATED APPLICATIONS

This application is a Continuation of U.S. Ser. No. 16/938,498, filed Jul. 24, 2020; which is a Continuation of U.S. Ser. No. 16/878,116, filed May 19, 2020; which is a Continuation of U.S. Ser. No. 15/184,502, filed Jun. 16, 2016, now U.S. Pat. No. 10,701,389, issued Jun. 30, 2020; which is a Divisional of U.S. patent application Ser. No. 14/299,732, filed Jun. 9, 2014, now abandoned; which is a Continuation of PCT International Application No. PCT/JP2012/008427, filed Dec. 28, 2012, which claims the benefit of Japanese Patent Application Nos. 2011-288982 and 2011-288983, filed Dec. 28, 2011, and 2012-285808 and 2012-285809, filed Dec. 27, 2012.

BACKGROUND

1. Field of the Invention

The present invention relates to a technology of coding and decoding moving pictures by using motion compensation prediction and, more particularly, to a moving picture coding device, a moving picture coding method and a moving picture coding program, and a moving picture decoding device, a moving picture decoding method and a moving picture decoding program that code and decode motion information used in motion compensation prediction.

2. Description of the Related Art

Motion compensation prediction is used in commonly-used moving-picture compression coding. Motion compensation prediction is a technology of partitioning a target picture into small blocks and generating, as a prediction signal, a signal located a position moved from a target block of the target picture to a reference block of a reference picture based on the amount of motion indicated by a motion vector, the reference picture being a decoded picture. Motion compensation prediction includes uni-prediction performed using a single motion vector and bi-prediction performed using two motion vectors.

Regarding motion vectors, a motion vector of a coded block neighboring a target block is set to be a motion vector predictor (also simply referred to as "vector predictor"), and a difference between a motion vector of the target block and the vector predictor is obtained and transmitted as a coding vector so as to improve compression efficiency.

Moving-picture compression coding such as MPEG-4AVC/H.264 (hereinafter, MPEG-4AVC) allows for highly-accurate motion compensation prediction by making the size of a block used for motion compensation to be small with variations. On the other hand, there is a problem that the code size of a coding vector becomes large when reducing the size of the block.

Thus, in MPEG-4AVC, the continuity of motion in a temporal direction is focused, and motion compensation prediction in a temporal direct mode is used where motion compensation is achieved, without transmitting coding vectors, by scaling a motion vector of a block on a reference picture that is located at the same position as a target block according to an inter-frame distance and using the scaled motion vector as a motion vector of the target block, the reference picture being a processed picture different from a target picture on which the target block is located. This allows for a reduction in a code size of a motion vector, achieving improvement in coding efficiency.

Also, focusing on the continuity of motion in a spatial direction, Patent document 1 discloses a method of achieving motion compensation prediction, without transmitting coding vectors, by using a motion vector of a processed block neighboring a target block as a motion vector of the processed block.

[Patent document 1] JP 10-276439

In the derivation of a motion vector in a temporal direction such as that defined in the above-stated MPEG-4AV, scaling is required at the time of the derivation, and complicated operations thus become necessary. In the method described in Patent document 1, a motion vector of a processed block neighboring a target prediction block is used as a motion vector of the target prediction block, and in the case of performing motion compensation prediction collectively on a plurality of neighboring prediction blocks, a parallel motion prediction process may not be performed.

SUMMARY

Accordingly, a purpose of the present invention is to provide a moving picture coding and moving picture decoding technology capable of efficiently achieving parallel processing of motion compensation prediction that performs motion compensation prediction collectively on a plurality of neighboring prediction blocks while using a motion vector of a processed block neighboring a target prediction block in the generation of a motion block of the target prediction block.

A picture coding device according to one embodiment of the present invention includes: a temporal merging motion information candidate generation unit (161) configured to derive, when information indicating whether or not to derive a temporal merging motion information candidate shared for all prediction blocks in the coding block is information indicating the derivation of a temporal merging motion information candidate shared for all the prediction blocks in the coding block, a temporal merging motion information candidate shared for all the prediction blocks in the coding block from a prediction block of a coded picture different from a picture having a prediction block subject to coding; a merging motion information candidate generation unit configured to generate a plurality of merging motion information candidates including the temporal merging motion information candidate; a merging motion information selection unit (141) configured to select one merging motion information candidate from the plurality of merging motion information candidates and to use the selected merging motion information candidate as motion information of the prediction block subject to coding; and a coding unit configured to code an index for specifying the selected merging motion information candidate as a candidate specifying index.

Another embodiment of the present invention also relates to a moving picture coding device. The device is a moving picture coding device adapted to partition a coding block into a plurality of prediction blocks and perform motion compensation, including: a temporal merging motion information candidate generation unit (161) configured to generate a temporal merging motion information candidate shared in any one of prediction blocks in the coding block from a block of a coded picture different from a picture having a prediction block subject to coding; a merging motion information candidate generation unit configured to generate a plurality of merging motion information candidates including the temporal merging motion information candidate; a merging motion information selection unit (141) configured to select one merging motion information candidate from the plurality of merging motion information candidates and to set the selected merging motion information candidate to be motion information of the prediction block subject to coding; and a coding unit configured to code an index for specifying the selected merging motion information candidate as a candidate specifying index.

Yet another embodiment of the present invention relates to a picture coding method. This method is a moving picture coding method for coding a coding block consisting of greater than or equal to one prediction block, including: deriving, when information indicating whether or not to derive a temporal merging motion information candidate shared for all prediction blocks in the coding block is information indicating the derivation of a temporal merging motion information candidate shared for all the prediction blocks in the coding block, a temporal merging motion information candidate shared for all the prediction blocks in the coding block from a prediction block of a coded picture different from a picture having a prediction block subject to coding; generating a plurality of merging motion information candidates including the temporal merging motion information candidate; selecting one merging motion information candidate from the plurality of merging motion information candidates and using the selected merging motion information candidate as motion information of the prediction block subject to coding; and coding an index for specifying the selected merging motion information candidate as a candidate specifying index.

A moving picture decoding device according to one embodiment of the present invention is a moving picture decoding device adapted to decode a decoding block consisting of greater than or equal to one prediction block, including: a decoding unit configured to decode, from a bitstream in which an index for specifying a merging motion information candidate used in a prediction block subject to decoding is coded as a candidate specifying index, the candidate specifying index; a temporal merging motion information candidate generation unit (161) configured to derive, when information indicating whether or not to derive a temporal merging motion information candidate shared for all prediction blocks in the decoding block is information indicating the derivation of a temporal merging motion information candidate shared for all the prediction blocks in the decoding block, a temporal merging motion information candidate shared for all the prediction blocks in the decoding block from a prediction block of a decoded picture different from a picture having a prediction block subject to decoding; a merging motion information candidate generation unit configured to generate a plurality of merging motion information candidates including the temporal merging motion information candidate; and a merging motion information selection unit (231) configured to select one merging motion information candidate from the plurality of merging motion information candidates based on the candidate specifying index and to use the selected merging motion information candidate as motion information of the prediction block subject to decoding.

Another embodiment of the present invention also relates to a moving picture decoding device. This device is a moving picture decoding device adapted to partition a decoding block into a plurality of prediction blocks and perform motion compensation, including: a decoding unit configured to decode, from a bit stream in which an index for specifying a merging motion information candidate used in a prediction block subject to decoding is coded as a candidate specifying index, the candidate specifying index; a temporal merging motion information candidate generation unit (161) configured to generate a temporal merging motion information candidate shared in any one of prediction blocks in the coding block from a block of a decoded picture different from a picture having a prediction block subject to decoding; a merging motion information candidate generation unit configured to generate a plurality of merging motion information candidates including the temporal merging motion information candidate; and a merging motion information selection unit (231) configured to select one merging motion information candidate from the plurality of merging motion information candidates based on the candidate specifying index and to set the selected merging motion information candidate to be motion information of the prediction block subject to decoding.

Another embodiment of the present invention relates to a moving image decoding method. This method is a moving picture decoding method for decoding a decoding block consisting of greater than or equal to one prediction block, including: decoding, from a bitstream in which an index for specifying a merging motion information candidate used in a prediction block subject to decoding is coded as a candidate specifying index, the candidate specifying index; deriving, when information indicating whether or not to derive a temporal merging motion information candidate shared for all prediction blocks in the decoding block is information indicating the derivation of a temporal merging motion information candidate shared for all the prediction blocks in the decoding block, a temporal merging motion information candidate shared for all the prediction blocks in the decoding block from a prediction block of a decoded picture different from a picture having a prediction block subject to decoding; a merging motion information candidate generation module configured to generate a plurality of merging motion information candidates including the temporal merging motion information candidate; and selecting one merging motion information candidate from the plurality of merging motion information candidates based on the candidate specifying index and using the selected merging motion information candidate as motion information of the prediction block subject to decoding.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1A and 1B are diagrams showing coding blocks;

FIGS. 2A through 2D are diagrams explaining prediction block size types;

FIG. 3 is a diagram explaining prediction block size types;

FIG. 4 is a diagram explaining prediction coding modes;

FIG. 5 is a diagram explaining relationships between merge indices and bitstreams;

FIG. 6 is a diagram explaining an example of syntax of a prediction block;

FIGS. 13A-13H are diagrams showing a candidate block group occurring when a positional relationship that is the same as that of a prediction block of a coding block that has a prediction block size type of 2N.times.2N is applied to a prediction block in a coding block that does not have a prediction block size type of 2N.times.2N;

FIGS. 14A-14H are diagrams explaining an example of a positional relationship between a prediction block having a prediction block size type other than 2N.times.2N and a spatial candidate block group in the first embodiment;

FIG. 18 is a diagram explaining relationships among the number of combination checks, a merging motion information candidate M, and a merging motion information candidate N;

FIGS. 23A-23H are diagrams explaining a positional relationship between a prediction block having a prediction block size type other than 2N.times.2N and a spatial candidate block group in a second embodiment;

FIGS. 24A-24H are diagrams explaining a positional relationship between a prediction block having a prediction block size type other than 2N.times.2N and a spatial candidate block group in an example where a candidate block of a prediction block in a coding block is shared without depending on a prediction block size type;

FIGS. 25A-25H are diagrams explaining a positional relationship between a prediction block having a prediction block size type other than 2N.times.2N and a spatial candidate block group in a third embodiment;

FIGS. 28A-28H are diagrams explaining a positional relationship between a prediction block having a prediction block size type other than 2N.times.2N and a spatial candidate block group in a fourth embodiment;

DETAILED DESCRIPTION

Figure 7:
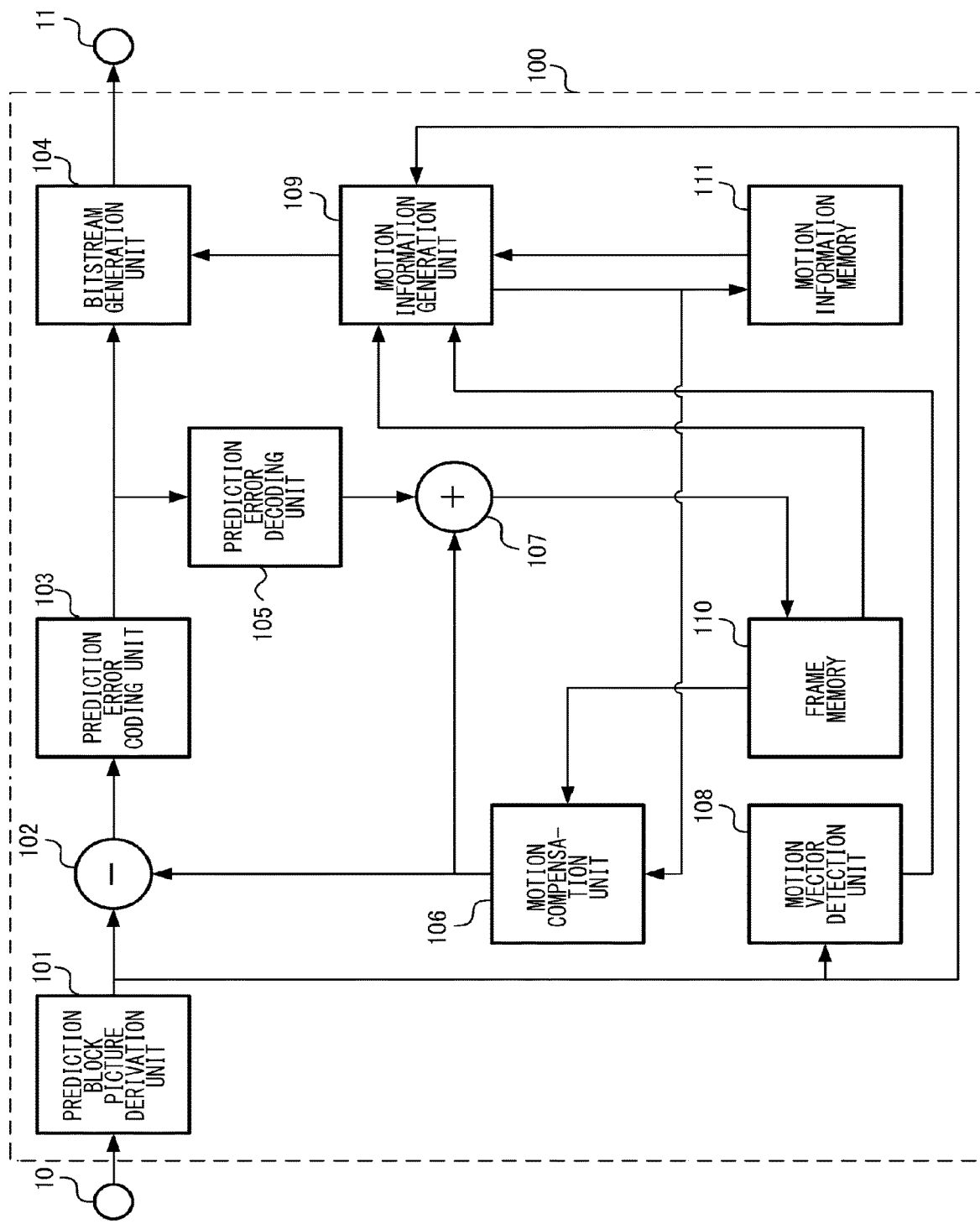
FIG. 7 is a diagram showing the configuration of a moving picture coding device according to a first embodiment.

The invention will now be described by reference to the preferred embodiments. This does not intend to limit the scope of the present invention, but to exemplify the invention.

First, an explanation is first given of a technology on which embodiments of the present invention are based.

Currently, devices and systems complying with a coding system such as MPEG (Moving Picture Experts Group) or the like have become widely used. In such a coding system, a plurality of pictures that are continuous on a time axis are treated as digital signal information. In that case, for the purpose of highly efficient broadcasting, transmission, accumulation, and the like of information, compression coding is performed using motion compensation prediction where a picture is partitioned into a plurality of blocks and redundancy in a temporal direction is used and using orthogonal transformation such as discrete cosine transform where redundancy in a spatial direction is used.

In 2003, by cooperative work of Joint Technical Committee (ISO/IEC) of the International Organization for Standardization (ISO) and the International Electrotechnical Commission (IEC) and the International Telecommunication Union Telecommunication Standardization Sector (ITU-T), a coding system called MPEG-4 AVC/H.264 (a standard number of 14496-10 is assigned in ISO/IEC and a standard number of H.264 is assigned in ITU-I, and this system is hereinafter referred to as MPEG-4AVC) was established as a global standard. In MPEG-4AVC, a median value of respective motion vectors of a plurality of neighboring blocks of a target block is basically set to be a vector predictor. If the size of a prediction block is not square and a reference index of a specific neighboring block of a target block is the same as a reference index of the target block, a motion vector of the specific neighboring block is set to be a vector predictor.

Currently, by cooperative work of Joint Technical Committee (ISO/IEC) of the International Organization for Standardization (ISO) and the International Electrotechnical Commission (IEC) and the International Telecommunication Union Telecommunication Standardization Sector (ITU-T), the standardization of a coding system called HEVC is under consideration.

In the standardization of HEVC, a merge mode is under consideration where a single candidate block is selected from a candidate block group composed of candidate blocks, which are a plurality of neighboring blocks and blocks of another picture that is decoded, so that information of the selected candidate block is coded and decoded.

First Embodiment (Coding Block)

In the present embodiment, a picture signal that has been input is partitioned in units of maximum coding blocks, and maximum coding blocks that have been partitioned are processed in raster scan order. A coding block has a hierarchical structure, and smaller coding blocks can be obtained by quartering the coding block sequentially in consideration of coding efficiency and the like. Quartered coding blocks are coded in zigzag scanning order. Minimum coding blocks that cannot be made any smaller are referred to as minimum coding blocks. Coding blocks represent coding units. If the number of partition occurrences is zero in a maximum coding block, the maximum coding block also represents a coding block. In the present embodiment, a maximum coding block represents 64 pixels.times.64 pixels, and a minimum coding block represents 8 pixels.times.8 pixels.

FIGS. 1A and 1B are diagrams for explaining coding blocks. In an example shown in FIG. 1A, a coding block is partitioned into ten pieces. CU0, CU1, and CU9 represent coding blocks of 32 pixels.times.32 pixels, CU2, CU3, and CU8 represent coding blocks of 16 pixels.times.16 pixels, and CU4, CU5, CU6, and CU7 represent coding blocks of 8 pixels.times.8 pixels. In an example shown in FIG. 1B, a coding block is partitioned into one piece.

(Prediction Block)

In the present embodiment, a coding block is further partitioned into prediction blocks (also referred to as partitions). A coding block is partitioned into greater than or equal to one prediction block according to a prediction block size type (also referred to as "partitioning type" or partition type). FIGS. 2A through 2D are diagrams for explaining prediction block size types. FIG. 2A shows 2N.times.2N where a coding block is not partitioned. FIG. 2B shows 2N.times.N where a coding block is halved in a horizontal direction. FIG. 2C shows N.times.2N where a coding block is halved in a vertical direction. FIG. 2D shows N.times.N where a coding block is quartered in a horizontal and in a vertical direction. 2N.times.2N consists of a single prediction block 0. Both 2N.times.N and N.times.2N each consist of two prediction blocks: a prediction block 0 and a prediction block 1. N.times.N consists of four prediction blocks: a prediction block 0, a prediction block 1, a prediction block 2, and a prediction block 3. Coding is performed in order of a prediction block 0, a prediction block 1, a prediction block 2, and a prediction block 3.

FIG. 3 is a diagram for explaining prediction block sizes according to the number of partition occurrences of a coding block and prediction block size types. For prediction block sizes in the present embodiment, there are 13 prediction block sizes from 64 pixels.times.64 pixels, where the number of CU partition occurrences is 0 and a prediction block size type is 2N.times.2N, to 4 pixels.times.4 pixels, where the number of CU partition occurrences is 3 and a prediction block size type is N.times.N. For example, a coding block can be halved in a horizontal or a vertical direction in an asymmetric manner.

In the present embodiment, a maximum coding block represents 64 pixels.times.64 pixels, and a minimum coding block represents 8 pixels.times.8 pixels. However, the maximum coding block and the minimum coding block are not limited to this combination. Partition patterns of a prediction block are shown to be those of FIGS. 2A through 2D. However, the partition patterns are not limited to this as long as the partition patterns are a combination of patterns where a prediction block is partitioned into greater than or equal to one piece.

(Prediction coding mode) In the present embodiment, motion compensation prediction and the number of coding vectors can be changed for each prediction block. An explanation is now given using FIG. 4 regarding an example of a prediction coding mode with which motion compensation prediction and the number of coding vectors are associated. FIG. 4 is a diagram for explaining prediction coding modes.

Prediction coding modes shown in FIG. 4 include PredL0 where a prediction direction of motion compensation prediction is uni-prediction (L0 prediction) and the number of coding vectors is 1, PredL1 where a prediction direction of motion compensation prediction is uni-prediction (L1 prediction) and the number of coding vectors is 1, PredBI where a prediction direction of motion compensation prediction is bi-prediction (BI prediction) and the number of coding vectors is 2, and a merge mode (MERGE) where a prediction direction of motion compensation prediction is uni-prediction (L0 prediction/L1 prediction) or bi-prediction (BI prediction) and the number of coding vectors is 0. There is also an intra mode (Intra), which is a prediction coding mode where motion compensation prediction is not performed. In these modes, PredL0, PredL1, and PredBI are vector predictor modes.

In the merge mode, a prediction direction can be any one of L0 prediction, L1 prediction, and BI prediction. This is because the prediction direction of a candidate block selected from a candidate block group is passed on without any change as the prediction direction of the merge mode, or the prediction direction of the merge mode is derived from decoded information. Also, a coding vector is not coded in the merge mode. This is because a motion vector of a candidate block selected from a candidate block group is passed on without any change as a coding vector of the merge mode, or the coding vector of the merge mode is derived by a predetermined rule.

(Reference Index)

The present embodiment allows an optimum reference picture to be selected from a plurality of reference pictures in motion compensation prediction for the improvement of the accuracy of the motion compensation prediction. Therefore, a reference picture used in the motion compensation prediction is coded along with a coding vector as a reference picture index. A reference picture index used in the motion compensation prediction has a numerical value of larger than or equal to 0. If the motion compensation prediction is uni-prediction, one reference index is used. If the motion compensation prediction is bi-prediction, two reference indices are used (FIG. 4).

A reference index is not coded in the merge mode. This is because a reference index of a candidate block selected from a candidate block group is passed on without any change as a reference index of the merge mode, or the reference index of the merge mode is derived by a predetermined rule.

(Reference Index List)

In the present embodiment, greater than or equal to one reference picture that can be used in motion compensation prediction is added in a reference index list in advance, and, by indicating a reference picture added in the reference index list by a reference index, the reference picture is determined and used in the motion compensation prediction. The types of reference index lists include a reference index list L0 (also referred to as a reference index list of L0 prediction) and a reference index list L1 (also referred to as a reference index list of L1 prediction). If the motion compensation prediction is uni-prediction, either L0 prediction where a reference picture in the reference index list L0 is used or L1 prediction where a reference picture in the reference index list L1 is used is used. If the motion compensation prediction is bi-prediction, BI prediction where both the reference index list L0 and the reference index list L1 are used is used. The maximum number of reference pictures that can be added in each reference index list is set to be 16.

(Merge Index)

In the case of a merge mode in the present embodiment, by using, as a candidate block group, a plurality of neighboring blocks in a target picture and blocks in and around a same-position prediction block located at the same position as a target prediction block in another picture that is decoded, a candidate block having an optimum prediction coding mode, motion vector, and reference index is selected from the candidate block group so as to code and decode a merge index for indicating the selected candidate block. One merge index is used only during the merge mode (FIG. 4). The maximum number of merge indices (also referred to as the maximum number of merge candidates) is 5, and a merge index is an integer of 0 to 4. The maximum number of merge indices is set to be 5 in this case. However, the maximum number of merge indices is not limited to this as long as the maximum number of merge indices is greater or equal to 2.

Hereinafter, motion information of a candidate block subject to a merge index is referred to as a merging motion information candidate, and a collection of merging motion information candidates is referred to as a merging motion information candidate list. Hereinafter, motion information includes a prediction direction, a motion vector, and a reference index.

An explanation is now given regarding relationships between merge indices and bitstreams. FIG. 5 is a diagram for explaining relationships between merge indices and bitstreams. If a merge index is 0, a bitstream is "0". If a merge index is 1, a bitstream is "10". If a merge index is 2, a bitstream is "110". If a merge index is 3, a bitstream is "1110". If a merge index is 4, a bitstream is "1111". Thus, the merge indices and the bitstreams are set such that the respective bitstreams become longer as the merge indices become larger. Therefore, by assigning a small marge index to a candidate block with high selectivity, the coding efficiency can be improved.

An explanation is now given regarding relationships between a merging motion information candidate list and merge indices. A merge index 0 represents a first (0-th) merging motion information candidate of a merging motion information candidate list. Hereinafter, a merge index m represents an m-th merging motion information candidate of the merging motion information candidate list, where m is an integer of 0 to [(maximum number of merge candidates)−1].

(Vector Predictor Index)

In order to improve the accuracy of a vector predictor in the present embodiment, by using, as a candidate block group, a plurality of neighboring blocks in a target picture and blocks in and around a same-position prediction block located at the same position as a target prediction block in another picture that is decoded, a candidate block having an optimum motion vector as a vector predictor is selected from the candidate block group so as to code and decode a vector predictor index for indicating the selected candidate block. If the motion compensation prediction is uni-prediction, one vector predictor index is used. If the motion compensation prediction is bi-prediction, two vector predictor indices are used (FIG. 4). The maximum number of vector predictor indices (also referred to as the maximum number of vector predictor candidates) is 2, and a vector predictor index is an integer of 0 or 1. The maximum number of vector predictor indices is set to be 2 in this case. However, the maximum number of vector predictor indices is not limited to this as long as the maximum number of vector predictor indices is greater than or equal to 2.

An explanation is now given regarding relationships between vector predictor indices and bitstreams. A bitstream of a vector predictor index is "0" when the vector predictor index is 0, and a bitstream of a vector predictor index is "1" when the vector predictor index is 1. If the maximum number of vector predictor candidates is greater than or equal to 3, bitstreams can be assigned in a rule similar to that of a merge index (a bitstream becomes longer as an index becomes larger).

Hereinafter, a motion vector of a candidate block subject to a vector predictor index is referred to as a vector predictor candidate, and a collection of vector predictor candidates is referred to as a vector predictor candidate list.

(Syntax)

An explanation is given regarding an example of syntax of a prediction block according to the present embodiment. FIG. 6 is a diagram explaining syntax according to the present embodiment. FIG. 6 shows an example of a syntax structure of a coding tree (Coding Tree), a coding block (Coding Unit), and a prediction block (prediction Unit). In the coding tree, partition information of the coding block is managed. In the coding tree, split_coding_unit_flag is set. If the split_coding_unit_flag is 1, the coding tree is partitioned into four coding trees. If the split_coding_unit_flag is 0, the coding tree represents a coding block (Coding Unit). In the coding block, a skip mode flag (skip_flag), a prediction mode (pred_mode), and a prediction block size type (part_mode) are set. The coding block is partitioned into one, two, or four prediction blocks according to the skip mode flag and the prediction block size type. The prediction mode shows whether the coding block is a coding block on which intra prediction is performed or a coding block on which inter prediction (motion compensation prediction) is performed. If the skip mode flag is 1, a skip mode is implemented. There exists one prediction block in the skip mode. The number of partition occurrences of a coding block is also referred to as a depth of the coding block (coding tree).

Set in the prediction block are a merge flag (merge_flag), a merge index (merge_idx), an inter prediction type (inter_pred_type), a reference index of the L0 prediction (ref_idx_l0), a vector difference of the L0 prediction (mvd_l0[0], mvd_l0[1]), a vector predictor index of the L0 prediction (mvp_idx_l0), a reference index of the L1 prediction (ref_idx_l1), a vector difference of the L1 prediction (mvd_l1[0], mvd_l1[1]), and a vector predictor index of the L1 prediction (mvp_idx_l1). In the vector difference, [0] represents a horizontal component, and [1] represents a vertical component.

In this case, inter_pred_type shows a prediction direction of motion compensation prediction (also referred to as an inter prediction type) and includes three types: Pred_L0 (uni-prediction of L0 prediction); Pred_L1 (uni-prediction of L1 prediction); and Pred_BI (bi-prediction of BI prediction). If inter_pred_type is Pred_L0 or Pred_BI, information related to the L0 prediction is set. If inter_pred_type is Pred_L1 or Pred_BI, information related to the L1 prediction is set. In a P picture (P slice), inter_pred_type uniquely represents Pred_L0. Thus, inter_pred_type is omitted.

In the case of the skip mode, a prediction block is a coding block on which inter prediction is performed, and a merge mode is used as a prediction coding mode. Therefore, a merge index is set in the case of the skip mode.

Syntax according to the present embodiment is set as shown in FIG. 6. However, the syntax is not limited to this as long as coding blocks and prediction blocks have a plurality of block sizes and the merge mode and the vector predictor mode can be used.

An explanation is given hereinafter, along with figures, regarding the details of a moving picture coding device, a moving picture coding method, and a moving picture coding program, and moving picture decoding device, a moving picture decoding method, and a moving picture decoding program according to a preferred embodiment of the present invention. In the explanations of the figures, the same elements shall be denoted by the same reference numerals, and duplicative explanations will be omitted.

(Configuration of Moving Picture Coding Device 100)

FIG. 7 shows the configuration of a moving picture coding device 100 according to a first embodiment. The moving picture coding device 100 is a device that codes a moving picture signal in units of prediction blocks for performing motion compensation prediction. It is assumed that the partition of a coding block, the determination of a skip mode, the determination of a prediction block size type, the determination of a prediction block size and a position in a coding block of a prediction block (also referred to as position information or a prediction block number of a prediction block), and the determination of whether a prediction coding mode is intra are determined by a higher-order coding control unit (not shown). Thus, an explanation is given regarding a case where a prediction coding mode is not intra in the first embodiment. An explanation is given regarding a B picture (B slice), which corresponds to bi-prediction, in the first embodiment. For a P picture (P slice), which does not correspond to bi-prediction, L1 prediction needs to be omitted.

The moving picture coding device 100 is achieved by hardware such as an information processing device or the like provided with a CPU (Central Processing Unit), a frame memory, a hard disk, and the like. By the operation of the above constituting elements, the moving picture coding device 100 achieves functional constituting elements explained in the following. The position information, the prediction block size, and the prediction direction of motion compensation prediction of a target prediction block are assumed to be shared in the moving picture coding device 100 and are thus not shown.

The moving picture coding device 100 according to the first embodiment includes a prediction block picture derivation unit 101, a subtraction unit 102, a prediction error coding unit 103, a bitstream generation unit 104, a prediction error decoding unit 105, a motion compensation unit 106, an addition unit 107, a motion vector detection unit 108, a motion information generation unit 109, a frame memory 110, and a motion information memory 111.

(Function and Operation of Moving Picture Coding Device 100)

An explanation is given in the following regarding the function and operation of each component. The prediction block picture derivation unit 101 derives a picture signal of a target prediction block from a picture signal supplied from a terminal 10 based on the position information and prediction block size of the prediction block and supplies the picture signal of the prediction block to the subtraction unit 102, the motion vector detection unit 108, and the motion information generation unit 109.

The motion vector detection unit 108 detects respective motion vectors and respective reference indices showing reference pictures for the L0 prediction and the L1 prediction in the picture signal supplied by the prediction block picture derivation unit 101 and respective picture signals corresponding to a plurality of reference pictures stored therein. The motion vector detection unit 108 supplies the respective motion vectors of the L0 prediction and the L1 prediction and the respective reference indices of the L0 prediction and the L1 prediction to the motion information generation unit 109. Although it is described that the motion vector detection unit 108 uses respective picture signals corresponding to the plurality of reference pictures stored therein as reference pictures, the motion vector detection unit 108 can also use reference pictures stored in the frame memory 110.

In a commonly-practiced method of detecting a motion vector, an evaluation value of an error between a picture signal of a target picture and a prediction signal of a reference picture moved from the same position by a predetermined amount of displacement is calculated, and an amount of displacement that results in the smallest evaluation value of the error is set to represent a motion vector. If there a plurality of reference pictures, a motion vector is detected for each of the reference pictures, and a reference picture with the smallest evaluation value of the error is selected. As the evaluation value of the error, a SAD (Sum of Absolute Difference) showing the sum of an absolute difference, an MSE (Mean Square Error) showing a mean square error, or the like can be used. It is also possible to add a motion vector coding amount to the evaluation value of the error so as to make evaluation.

The motion information generation unit 109 determines a prediction coding mode based on the respective motion vectors of the L0 prediction and the L1 prediction and the respective reference indices of the L0 prediction and the L1 prediction supplied by the motion vector detection unit 108, a candidate block group supplied by the motion information memory 111, the reference pictures stored in the frame memory 110 that are indicated by the respective reference indices, and the picture signal supplied by the prediction block picture derivation unit 101.

Based on the prediction coding mode that has been determined, the motion information generation unit 109 supplies, to the bitstream generation unit 104, a merge flag, a merge index, a prediction direction of motion compensation prediction, respective reference indices of the L0 prediction and the L1 prediction, respective vector differences of the L0 prediction and the L1 prediction, and respective vector predictor indices of the L0 prediction and the L1 prediction, as necessary. The motion information generation unit 109 supplies, to the motion compensation unit 106 and the motion information memory 111, the prediction direction of motion compensation prediction, the respective reference indices of the L0 prediction and the L1 prediction, and respective motion vectors of the L0 prediction and the L1 prediction. Details of the motion information generation unit 109 will be described later.

If the prediction direction of motion compensation prediction supplied by the motion information generation unit 109 is LN prediction, the motion compensation unit 106 performs motion compensation on a reference picture in the frame memory 110 that is indicated by a reference index of LN prediction supplied by the motion information generation unit 109 based on a motion vector of LN prediction supplied by the motion information generation unit 109 so as to generate a prediction signal for LN prediction. N is 0 or 1. If the prediction direction of motion compensation prediction is bi-prediction, an average value of respective prediction signals for the L0 prediction and the L1 prediction is set to represent the prediction signal. The respective prediction signals for the L0 prediction and the L1 prediction may be weighted. The motion compensation unit 106 supplies the prediction signals to the subtraction unit 102.

The subtraction unit 102 subtracts the picture signal supplied by the prediction block picture derivation unit 101 and the prediction signals supplied by the motion compensation unit 106 so as to calculate a prediction error signal and supplies the prediction error signal to the prediction error coding unit 103.

The prediction error coding unit 103 generates prediction error coding data by performing a process such as orthogonal transformation, quantization, or the like on the prediction error signal provided from the subtraction unit 102 and supplies the prediction error coding data to the bitstream generation unit 104 and the prediction error decoding unit 105.

The bitstream generation unit 104 subjects the prediction error coding data supplied by the prediction error coding unit 103 and the merge flag, the merge index, the prediction direction (inter prediction type) of motion compensation prediction, the respective reference indices of the L0 prediction and the L1 prediction, the respective vector differences of the L0 prediction and the L1 prediction, and the respective vector predictor indices of the L0 prediction and the L1 prediction supplied by the motion information generation unit 109 to entropy coding according to the order of the syntax shown in FIG. 6 so as to generate a bitstream and supplies the bitstream to the terminal 11 as a bitstream. The entropy coding is performed by a method including variable-length coding such as arithmetic coding, Huffman coding, or the like.

The bitstream generation unit 104 multiplexes the partition information for the coding block, the prediction block size type, and the prediction coding mode used in the moving picture coding device 100 in the bitstream along with an SPS (Sequence Parameter Set) defining a parameter group for determining the properties of the bitstream, a PPS (Picture Parameter Set) defining a parameter group for determining the properties of the picture, a slice header defining a parameter group for determining the properties of the slice, and the like.

The prediction error decoding unit 105 generates a prediction error signal by performing a process such as inverse quantization, inverse orthogonal transformation, or the like on the prediction error coding data supplied by the prediction error coding unit 103 and supplies the prediction error signal to the addition unit 107. The addition unit 107 adds the prediction error signal supplied by the prediction error decoding unit 105 and the prediction signals supplied by the motion compensation unit 106 so as to generate a decoding picture signal and supplies the decoding picture signal to the frame memory 110.

The frame memory 110 stores the decoding picture signal supplied by the addition unit 107. For a decoded picture in which the decoding of the entire picture has been completed, the frame memory 110 stores a predetermined number of greater than or equal to one picture thereof as a reference picture. The frame memory 110 supplies a stored reference picture signal to the motion compensation unit 106 and the motion information generation unit 109. A storage area that stores the reference images is controlled by a FIFO (First In First Out) method.

The motion information memory 111 stores motion information supplied by the motion information generation unit 109 for a predetermined number of pictures in units of the minimum prediction block sizes. The motion information memory 111 sets the motion information of a neighboring block of the target prediction block to represent a spatial candidate block group.

Also, the motion information memory 111 sets motion information in a same-position prediction block, which is located at the same position as the target prediction block, on a ColPic and a block around the same-position prediction block to represent a temporal candidate block group. The motion information memory 111 supplies the spatial candidate block group and the temporal candidate block group to the motion information generation unit 109 as candidate block groups. The motion information memory 111 is synchronized with the frame memory 110 and is controlled by the FIFO (First In First Out) method.

A ColPic is a picture that has been decoded and that is different from a picture with a target prediction block and is stored in the frame memory 110 as a reference picture. In the first embodiment, a ColPic is a reference picture that is decoded immediately before a target picture. In the first embodiment, the ColPic is a reference picture that is decoded immediately before a target picture. However, as long as the ColPic is a decoded picture, the ColPic may be a reference picture immediately before or immediately after the target picture in the order of display and can be specified in a bitstream.

An explanation is now given regarding a method of managing the motion information in the motion information memory 111. The motion information is stored in units of the minimum prediction blocks in each memory area. Each memory area stores at least a prediction direction, a motion vector of L0 prediction, a reference index of L0 prediction, a motion vector of L1 prediction, and a reference index of L1 prediction.

If the prediction coding mode is the intra mode, (0,0) is stored as the respective motion vectors of the L0 prediction and the L1 prediction, and "−1" is stored as the respective reference indices of the L0 prediction and L1 prediction. Hereinafter, in (H,V) of a motion vector, H represents a horizontal component, and V represents a vertical component. As long as it can be determined that a mode where motion compensation prediction is not performed is used, the value "−1" of the reference indices may be any value. Hereinafter, what is simply expressed as "block" represents the minimum prediction block unit unless otherwise noted. The same holds for a block outside the area. As in the case of the intra mode, (0,0) is stored as respective motion vectors of L0 prediction and L1 prediction, and "−1" is stored as respective reference indices of L0 prediction and L1 prediction. An LX direction (X is 0 or 1) being valid means that a reference index in the LX direction is larger than or equal to 0. The LX direction being invalid (not valid) means that the reference index in the LX direction is "4".

(Configuration of Motion Information Generation Unit 109)

Figure 8:
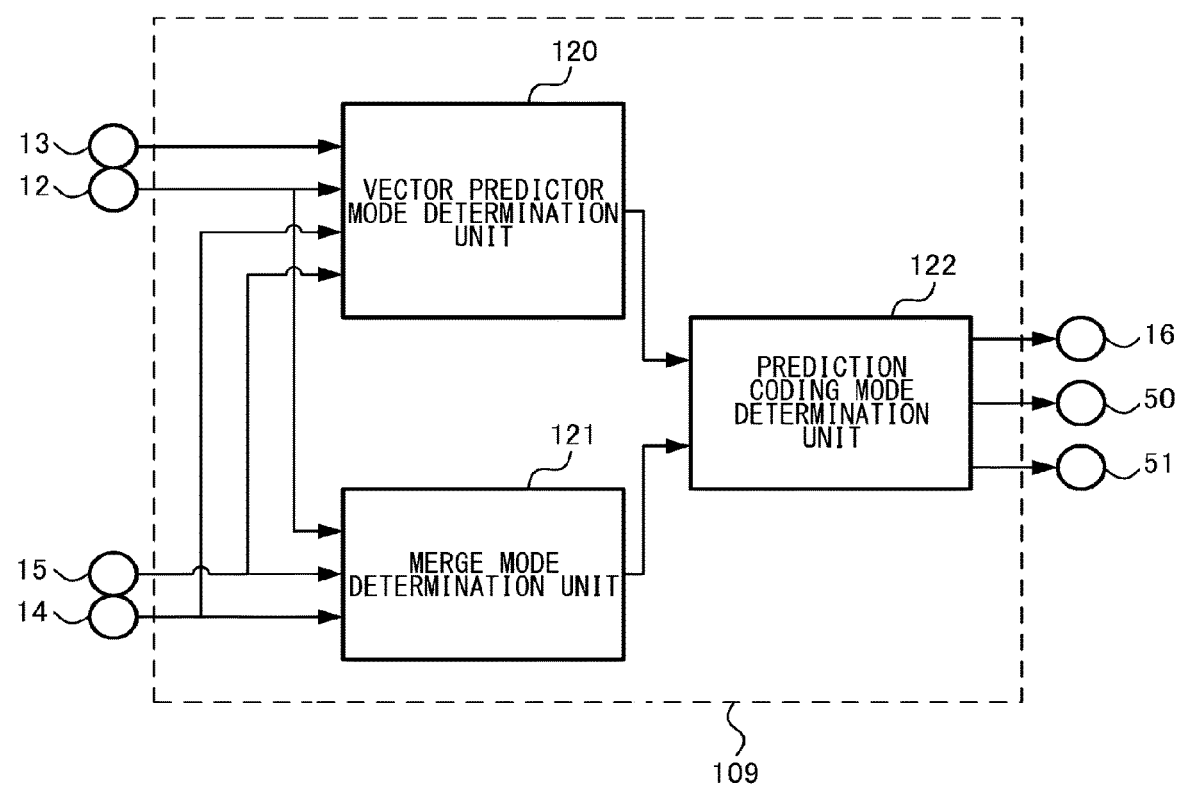
FIG. 8 is a diagram showing the configuration of a motion information generation unit shown in FIG. 7.

An explanation is now given regarding the detailed configuration of the motion information generation unit 109. FIG. 8 shows the configuration of the motion information generation unit 109. The motion information generation unit 109 includes a vector predictor mode determination unit 120, a merge mode determination unit 121, and a prediction coding mode determination unit 122. A terminal 12, a terminal 13, a terminal 14, a terminal 15, a terminal 16, a terminal 50, and a terminal 51 are connected to the motion information memory 111, the motion vector detection unit 108, the frame memory 110, the prediction block picture derivation unit 101, the bitstream generation unit 104, the motion compensation unit 106, and the motion information memory 111, respectively.

(Function and Operation of Motion Information Generation Unit 109)

An explanation is given in the following regarding the function and operation of each component. The vector predictor mode determination unit 120 determines an inter prediction type based on a candidate block group supplied by the terminal 12, respective motion vectors of L0 prediction and L1 prediction and respective reference indices of the L0 prediction and the L1 prediction supplied by the terminal 13, a reference picture indicated by a reference index supplied by the terminal 14, and a picture signal supplied by the terminal 15. Based on the inter prediction type, the vector predictor mode determination unit 120 selects respective vector predictor indices of the L0 prediction and the L1 prediction so as to calculate respective vector differences of the L0 prediction and the L1 prediction and calculate a prediction error and also calculates a rate distortion evaluation value. The vector predictor mode determination unit 120 then supplies motion information, the vector differences, the vector predictor indices, and the rate distortion evaluation value based on the inter prediction type to the prediction coding mode determination unit 122.

The merge mode determination unit 121 constructs a merging motion information candidate list from the candidate block group supplied by the terminal 12, the reference picture supplied by the terminal 14, and the picture signal supplied by the terminal 15, selects one merging motion information candidate from the merging motion information candidate list so as to determine a merge index, and calculates a rate distortion evaluation value. The merge mode determination unit 121 then supplies motion information of the merging motion information candidate, the merge index, and the rate distortion evaluation value to the prediction coding mode determination unit 122. Details of the merge mode determination unit 121 will be described later.

The prediction coding mode determination unit 122 determines a merge flag by comparing the rate distortion evaluation value supplied by the vector predictor mode determination unit 120 and the rate distortion evaluation value supplied by the merge mode determination unit 121.

If the rate distortion evaluation value for the vector predictor mode is less than the rate distortion evaluation value for the merge mode, the prediction coding mode determination unit 122 sets the merge flag to "0". The prediction coding mode determination unit 122 supplies, to the terminal 16, the merge flag and the inter prediction type, the reference indices, the vector differences, and the vector predictor index supplied by the vector predictor mode determination unit 120 and supplies the motion information supplied by the vector predictor mode determination unit 120 to the terminals 50 and 51.

If the rate distortion evaluation value for the merge mode is the rate distortion evaluation value for the vector predictor mode or less, the prediction coding mode determination unit 122 sets the merge flag to "1". The prediction coding mode determination unit 122 supplies, to the terminal 16, the merge flag and the merge index supplied by the merge mode determination unit 121 and supplies the motion information supplied by the merge mode determination unit 121 to the terminals 50 and 51. A specific method of calculating a rate distortion evaluation value is not the main point of the present invention, and a detailed explanation thereof is thus omitted. From a prediction error and a coding amount, a prediction error amount per a coding amount is calculated. The rate distortion evaluation value is an evaluation value that has a property where the coding efficiency becomes higher as the rate distortion evaluation value becomes smaller. Therefore, by selecting a prediction coding mode with a small rate distortion evaluation value, the coding efficiency can be improved.

(Configuration of Merge Mode Determination Unit 121)

Figure 9:
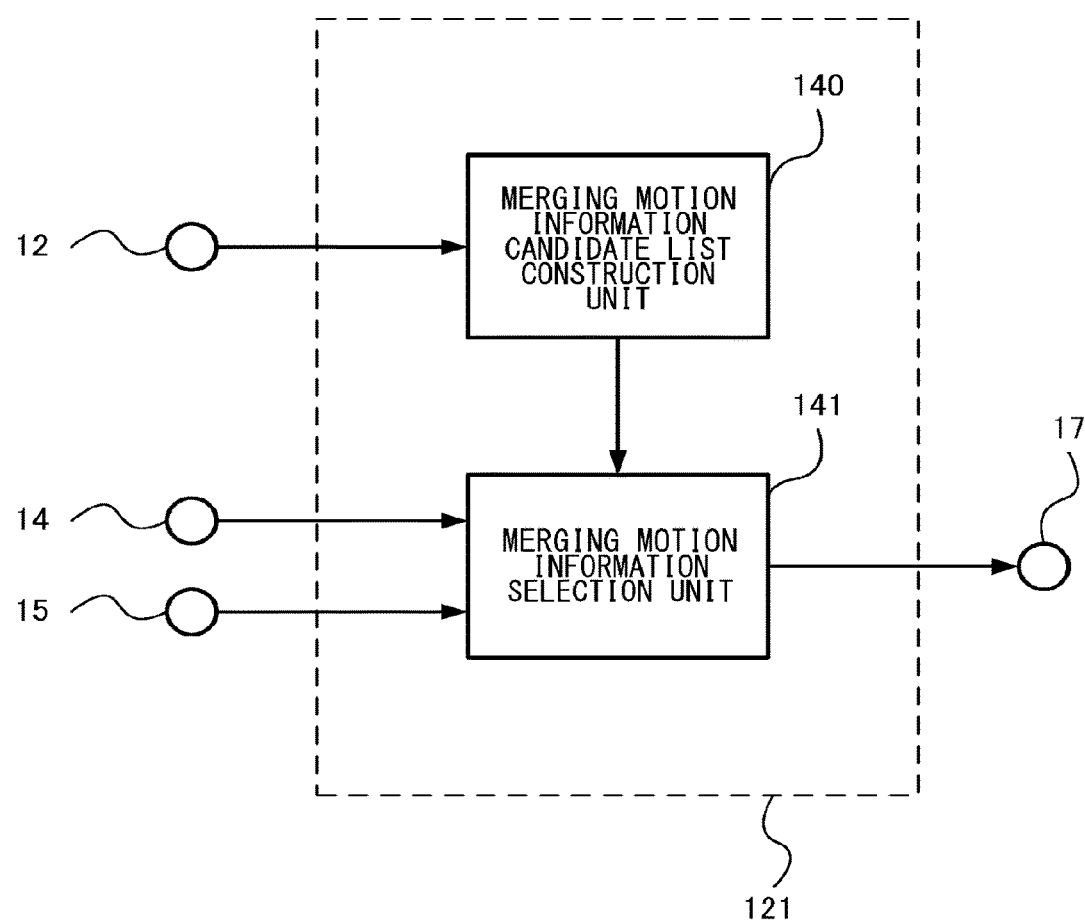
FIG. 9 is a diagram explaining the configuration of a merge mode determination unit shown in FIG. 8.

An explanation is now given regarding the detailed configuration of the merge mode determination unit 121. FIG. 9 is a diagram for explaining the configuration of the merge mode determination unit 121. The merge mode determination unit 121 includes a merging motion information candidate list construction unit 140 and a merging motion information selection unit 141. A merging motion information candidate list construction unit 140 is also provided in the same way in a moving picture decoding device 200 that decodes a bitstream generated by the moving picture coding device 100 according to the first embodiment, and an identical merging motion information list is constructed each in the moving picture coding device 100 and the moving picture decoding device 200.

(Function and Operation of Merge Mode Determination Unit 121)

An explanation is given in the following regarding the function and operation of each component. The merging motion information candidate list construction unit 140 constructs a merging motion information candidate list including merging motion information candidates of the maximum number of merge candidates from the candidate block group supplied by the terminal 12 and supplies the merging motion information candidate list to the merging motion information selection unit 141. The detailed configuration of the merging motion information candidate list construction unit 140 will be described later.

The merging motion information selection unit 141 selects an optimum merging motion information candidate from the merging motion information candidate list supplied from the merging motion information candidate list construction unit 140, determines a merge index serving as information indicating the selected merging motion information candidate, and supplies the merge index to the terminal 17.

An explanation is now given regarding a method of selecting the optimum merging motion information candidate. A prediction error amount is calculated from the reference picture obtained by performing motion compensation prediction based on the prediction direction, motion vector, and reference index of the merging motion information candidate and supplied by the terminal 14 and from the picture signal supplied by the terminal 15. A rate distortion evaluation value is calculated from the coding amount of the merge index and the prediction error amount, and a merging motion information candidate with the smallest rate distortion evaluation value is selected as the optimum merging motion information candidate.

(Configuration of Merging Motion Information Candidate List Construction Unit 140)

Figure 10:
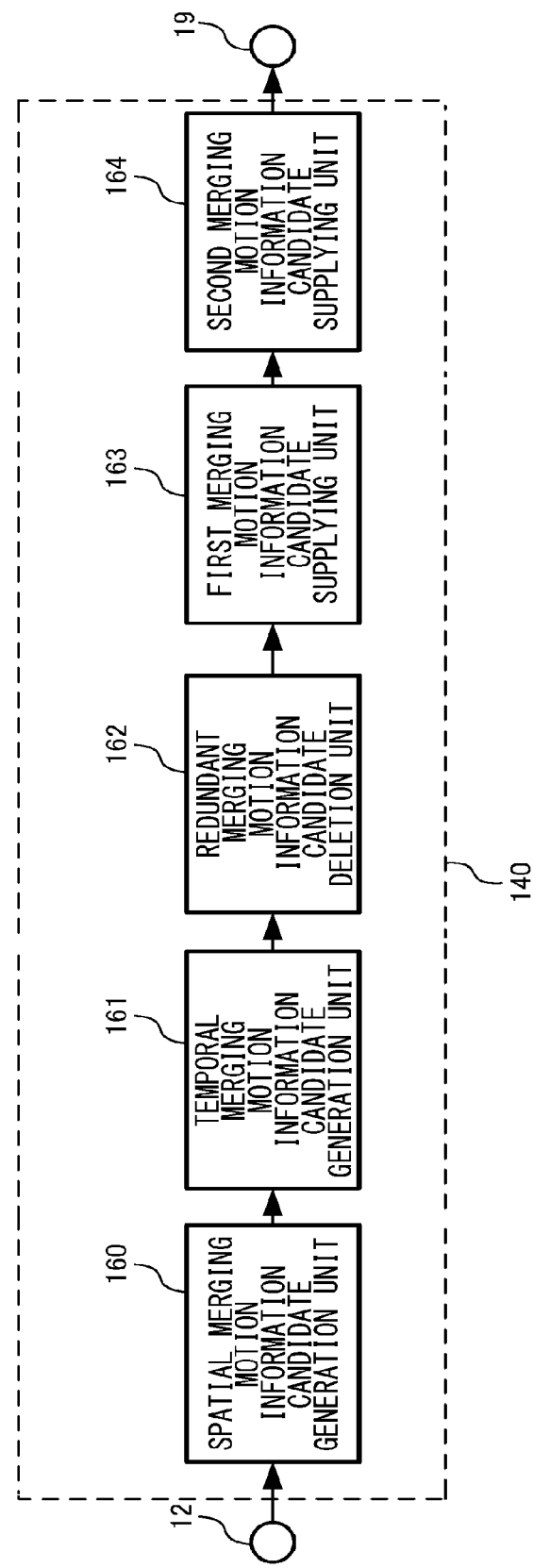
FIG. 10 is a diagram explaining the configuration of a merging motion information candidate list construction unit shown in FIG. 9.

An explanation is now given of the detailed configuration of the merging motion information candidate list construction unit 140. FIG. 10 is a diagram for explaining the configuration of the merging motion information candidate list construction unit 140. A terminal 19 is connected to the merging motion information selection unit 141. The merging motion information candidate list construction unit 140 includes a spatial merging motion information candidate generation unit 160, a temporal merging motion information candidate generation unit 161, a redundant merging motion information candidate deletion unit 162, a first merging motion information candidate supplying unit 163, and a second merging motion information candidate supplying unit 164. Hereinafter, an expression of "generating" a merging motion information candidate is used. However, the expression of "generating" may be changed to an expression of "deriving".

(Function and Operation of Merging Motion Information Candidate List Construction Unit 140)

Figure 11:
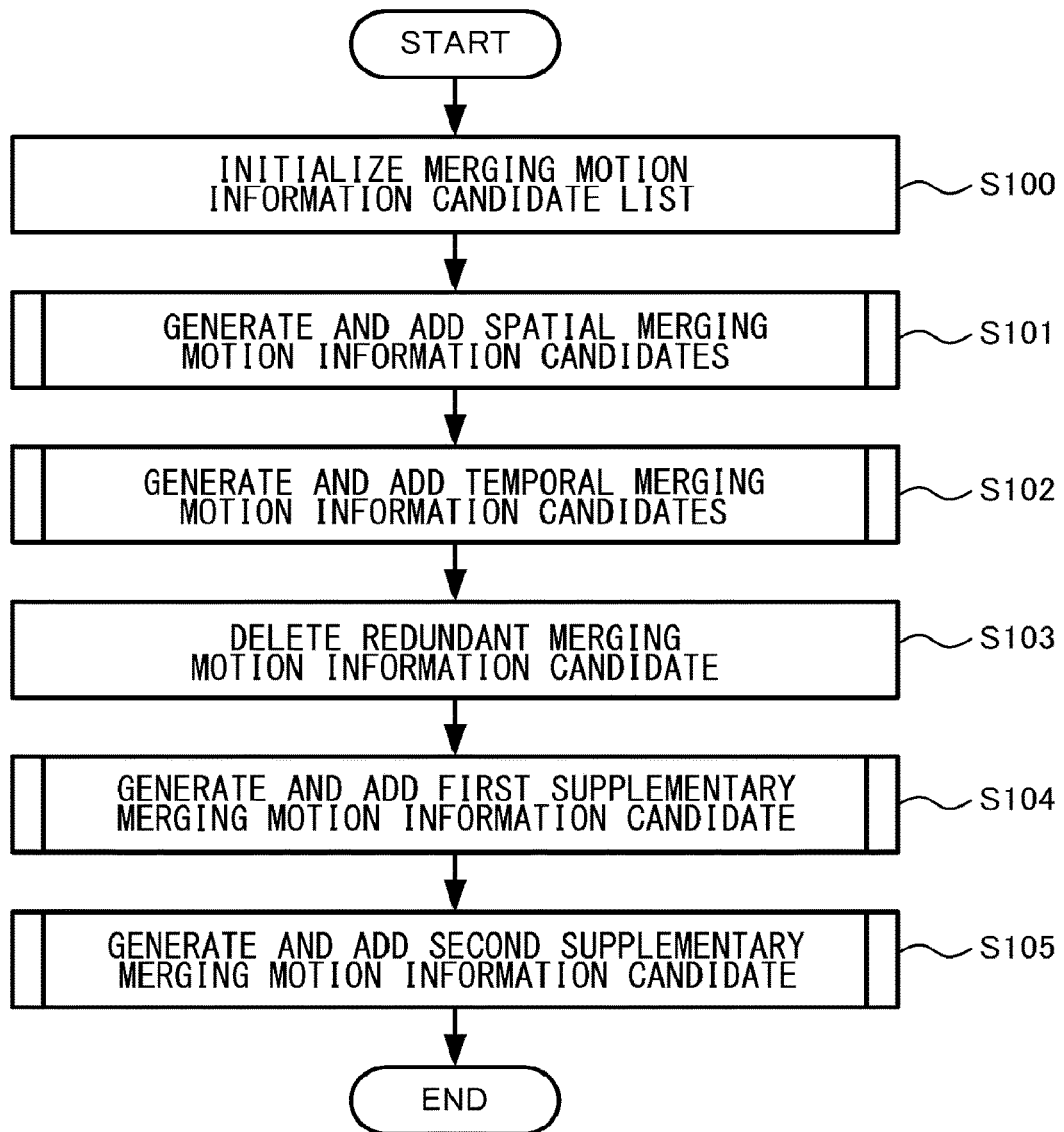
FIG. 11 is a flowchart explaining the operation of the merging motion information candidate list construction unit shown in FIG. 9.

An explanation is given in the following regarding the function and operation of each component. FIG. 11 is a flowchart for explaining the operation of the merging motion information candidate list construction unit 140. First, the merging motion information candidate list construction unit 140 initializes a merging motion information candidate list (S100). There is no merging motion information candidate in the initialized merging motion information candidate list.

The spatial merging motion information candidate generation unit 160 then generates spatial merging motion information candidates, as many as zero to the maximum number of spatial merging motion information candidates, from the candidate block group supplied by the terminal 12 so as to add the generated spatial merging motion information candidates to the merging motion information candidate list (S101) and supplies the merging motion information candidate list and the candidate block group to the temporal merging motion information candidate generation unit 161. The detailed operation of the spatial merging motion information candidate generation unit 160 will be described later. Descriptions will be also made later regarding the maximum number of spatial merging motion information candidates.

The temporal merging motion information candidate generation unit 161 then generates temporal merging motion information candidates, as many as zero to the maximum number of temporal merging motion information candidates, from the candidate block group supplied by the spatial merging motion information candidate generation unit 160 so as to add the generated temporal merging motion information candidates to the merging motion information candidate list supplied by the spatial merging motion information candidate generation unit 160 (S102) and supplies the merging motion information candidate list to the redundant merging motion information candidate deletion unit 162. The detailed operation of the temporal merging motion information candidate generation unit 161 will be described later. Descriptions will be also made later regarding the maximum number of temporal merging motion information candidates.

The redundant merging motion information candidate deletion unit 162 then examines the merging motion information candidates added in the merging motion information candidate list supplied by the temporal merging motion information candidate generation unit 161, leaves, if there are a plurality of merging motion information candidates having the same motion information, one of the plurality of merging motion information candidates while deleting the rest of the merging motion information candidates (S103), and supplies the merging motion information candidate list to the first merging motion information candidate supplying unit 163. Merging motion information candidates added to the merging motion information candidate list are all different merging motion information candidates at this time.

The first merging motion information candidate supplying unit 163 then generates zero to two first supplementary merging motion information candidates from the merging motion information candidates added to the merging motion information candidate list supplied by the redundant merging motion information candidate deletion unit 162 so as to add the first supplementary merging motion information candidates to the merging motion information candidate list (S104) and supplies the merging motion information candidate list to the second merging motion information candidate supplying unit 164. The detailed operation of the first merging motion information candidate supplying unit 163 will be described later.

The second merging motion information candidate supplying unit 164 then keeps generating second supplementary merging motion information candidates until the number of merging motion information candidates added to the merging motion information candidate list supplied by the first merging motion information candidate supplying unit 163 reaches the maximum number of merge candidates so as to add the second supplementary merging motion information candidates to the merging motion information candidate list (S105) and supplies the merging motion information candidate list to the terminal 19. The detailed operation of the second merging motion information candidate supplying unit 164 will be described later.

The spatial merging motion information candidate generation unit 160 and the temporal merging motion information candidate generation unit 161 are described to respectively generate a spatial merging motion information candidate and a temporal merging motion information candidate and respectively add the spatial merging motion information candidate and the temporal merging motion information candidate to the merging motion information candidate list. Alternatively, the spatial merging motion information candidate generation unit 160 and the temporal merging motion information candidate generation unit 161 may only generate a spatial merging motion information candidate and a temporal merging motion information candidate, respectively, and the merging motion information candidate list may be constructed from candidates generated immediately before redundant merging motion information candidate deletion unit 162.

(2N.times.2N Candidate Block Group)

Figure 12:
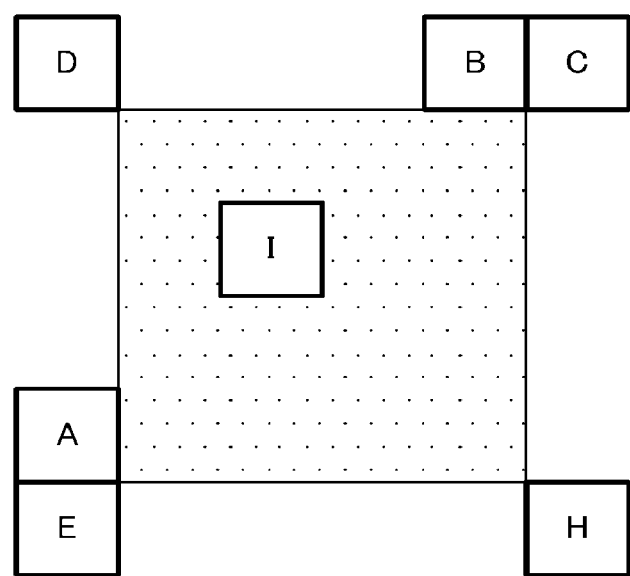
FIG. 12 is a diagram explaining a candidate block group of a prediction block having a prediction block size type of 2N.times.2N.

Hereinafter, an explanation is given regarding a candidate block group of a prediction block. First, an explanation is given regarding a prediction block having a prediction block size type of 2N.times.2N. FIG. 12 is a diagram explaining a candidate block group of a prediction block having a prediction block size type of 2N.times.2N. FIG. 12 shows an example where a prediction block size is 16 pixels.times.16 pixels. Temporal candidate blocks H and I described later exist in a decoded picture that is different from a picture where spatial candidate blocks A through E, which are also described later, exist. However, for the sake of ease of understanding and explanation, FIG. 12 shows the temporal candidate blocks H and I along with the spatial candidate blocks A through E.

The spatial candidate block group includes a block A located to the left of a lower-left pixel of the prediction block, a block B located above an upper-right pixel of the prediction block, a block C located diagonally above to the right of an upper-right pixel of the prediction block, a block E located diagonally below to the left of a lower-left pixel of the prediction block, and a block D located diagonally above to the left of an upper-left pixel of the prediction block. As described, the spatial candidate block group is determined based on the position and size of the prediction block. The temporal candidate block group includes two blocks: a block H and a block I, which are representative blocks in a predetermined area of the ColPic. When the position of the upper-left pixel of the target prediction block is set to be (x, y) and the width and height of the target prediction block are set to be PUW and PUH, respectively, a block on the ColPic that includes a pixel position of ((((x+PUW)>>4)<<4), (((y+PUH)>>4)<<4)) as the position of an upper-left pixel of the block is set to be a temporal candidate block H, where ">>" represents a bit shift in a right direction and "<<" represents a bit shift in a left direction.

Similarly, a block on the ColPic that includes a pixel position of (x+(PUW>>1), y+(PUH>>1)) as the position of an upper-left pixel of the block is set to be a temporal candidate block I. As described, the temporal candidate block group is determined based on the position and size of the prediction block. As described, by setting the temporal candidate block as the representative blocks of the predetermined area of the ColPic (16 pixels.times.16 pixels in this case), motion vectors and reference indices to be stored by the ColPic can be reduced. Reducing motion vectors and reference indices that are stored in one picture allows a plurality of decoded pictures to be subject to the ColPic, thus having the effect of improving the prediction efficiency.

A coding block having a prediction block size type of 2N.times.2N consists of one prediction block. Thus, the position of a candidate block with respect to a prediction block having a prediction block size type of 2N.times.2N is equal to the position of the candidate block with respect to the coding block, and the position of the candidate block is outside the coding block.

In the figure, the block A is located to the lower left of the prediction block. However, as long as the block A is in contact with the left side of the prediction block, the position of the block A is not limited to this. The block B is located to the upper right of the prediction block. However, as long as the block B is in contact with the upper side of the prediction block, the position of the block B is not limited to this. The temporal candidate block group is set to include the two blocks: the block H; and the block I. However, the temporal candidate block group is not limited to this set.

(Example of Applying Same Positional Relationship as that of 2N.times.2N to Candidate Block of Group of Other than 2N.times.2N)

An explanation is now given regarding an example where a positional relationship that is the same as that of a prediction block of a coding block that has a prediction block size type of 2N.times.2N is applied to a prediction block in a coding block that does not have a prediction block size type of 2N.times.2N. FIGS. 13A-13H are diagrams showing a candidate block group occurring when a positional relationship that is the same as that of a prediction block of a coding block that has a prediction block size type of 2N.times.2N is applied to a prediction block in a coding block that does not have a prediction block size type of 2N.times.2N. In FIGS. 13A-13H, as in the case of FIG. 12, temporal candidate blocks H and I exist in a decoded picture that is different from a picture where spatial candidate blocks A through E exist. However, for the sake of ease of understanding and explanation, FIGS. 13A-13H show the temporal candidate blocks H and I along with the spatial candidate blocks A through E. FIGS. 13A through 13H show respective candidate block groups for a prediction block 0 having a prediction block size type of N.times.2N, a prediction block 1 having a prediction block size type of N.times.2N, a prediction block 0 having a prediction block size type of 2N.times.N, a prediction block 1 having a prediction block size type of 2N.times.N, a prediction block 0 having a prediction block size type of N.times.N, a prediction block 1 having a prediction block size type of N.times.N, a prediction block 2 having a prediction block size type of N.times.N, and a prediction block 3 having a prediction block size type of N.times.N, respectively. FIGS. 13A-13H show an example where a prediction block size is 16 pixels.times.16 pixels. A temporal candidate block group is derived in the same way as in the case of a prediction block size type of 2N.times.2N, and the position of a block H is shown in FIGS. 13A-13H. As described, in a prediction block included in a coding block having a prediction block size type of 2N.times.2N, a candidate block group is determined for each prediction block based on the position and size of the prediction block.

In the case of the prediction block 1 of a prediction block size type of N.times.2N (FIG. 13B), a block A is located inside a prediction block 0 of the same coding block, and motion information of the prediction block 0 needs to be determined prior to the processing of the prediction block 1 in order to obtain motion information of the block A. Thus, the prediction block 0 and the prediction block 1 cannot be processed at the same time if the block A is used as a candidate block of the prediction block 1. The maximum coding block is processed in raster scan order, and a coding block is processed in zigzag scanning order. Thus, a block E always becomes an unprocessed block. Similarly, in the case of the prediction block 1 of a prediction block size type of 2N.times.N (FIG. 13D), a block B is located inside a prediction block 0 of the same coding block, and a block C always becomes an unprocessed block. For the prediction block 1 (FIG. 13F), the prediction block 2 (FIG. 13G), the prediction block 3 (FIG. 13H) each having a prediction block size type of N.times.N, a block in the same coding block and a block that always becomes an unprocessed block are respectively shown in FIG. 13.

In the prediction block 1 having a prediction block size type of N.times.2N, the prediction block 1 having a prediction block size type of 2N.times.N, the prediction block 1 having a prediction block size type of N.times.N, and the prediction block 2 having a prediction block size type of N.times.N, the number of candidate blocks that are not located inside the same coding block and do not become unprocessed blocks is three. In the prediction block 3 having a prediction block size type of N.times.N, the number of candidate blocks that are not located inside the same coding block and do not become unprocessed blocks is zero. A reduction in the number of candidate blocks leads to a decrease in the prediction efficiency.

(Positional Relationship of Candidate Block)

FIGS. 14A-14H are diagrams explaining an example of a positional relationship between a prediction block having a prediction block size type other than 2N.times.2N and a spatial candidate block group in the first embodiment. The same as in FIGS. 13A-13H also applies to a temporal candidate block group. FIGS. 14A through 14H show respective spatial candidate block groups for a prediction block 0 having a prediction block size type of N.times.2N, a prediction block 1 having a prediction block size type of N.times.2N, a prediction block 0 having a prediction block size type of 2N.times.N, a prediction block 1 having a prediction block size type of 2N.times.N, a prediction block 0 having a prediction block size type of N.times.N, a prediction block 1 having a prediction block size type of N.times.N, a prediction block 2 having a prediction block size type of N.times.N, and a prediction block 3 having a prediction block size type of N.times.N, respectively. FIGS. 14A-14H show an example where a prediction block size is 16 pixels.times.16 pixels.

In the figure, a block located inside another prediction block in the same coding block is replaced by a candidate block of a prediction block having a prediction block size type of 2N.times.2N. In other words, in the case of the prediction block 1 having a prediction block size type of N.times.2N (FIG. 14B), a block A is changed to a block A of a candidate block of a prediction block having a prediction block size type of 2N.times.2N. In the case of the prediction block 1 of a prediction block size type of 2N.times.N (FIG. 14D), a block B is changed to a block B of a candidate block of a prediction block having a prediction block size type of 2N.times.2N. In the case of the prediction block 1 of a prediction block size type of N.times.N (FIG. 14F), a block A and a block E are respectively changed to a block A and a block E of candidate blocks of a prediction block having a prediction block size type of 2N.times.2N. In the case of the prediction block 2 of a prediction block size type of N.times.N (FIG. 14G), a block B and a block C are respectively changed to a block B and a block C that are candidate blocks of a prediction block having a prediction block size type of 2N.times.2N. In the case of the prediction block 3 of a prediction block size type of N.times.N (FIG. 14H), a block A, a block B, and a block D are respectively changed to a block A, a block B, and a block D that are candidate blocks of a prediction block having a prediction block size type of 2N.times.2N.

The number of valid candidate blocks is five for the prediction block 1 having a prediction block size type of N.times.2N, the prediction block 1 having a prediction block size type of 2N.times.N, the prediction block 1 having a prediction block size type of N.times.N, the prediction block 2 having a prediction block size type of N.times.N, and the prediction block 3 having a prediction block size type of N.times.N.

As described above, by changing a candidate block included in another prediction block of the same coding block to a candidate block of a prediction block having a prediction block size type of 2N.times.2N, which results in the largest prediction block size of a prediction block size of a coding block, a dependence relationship of motion information between the prediction blocks included in the coding block is lost, and a plurality of prediction blocks included in the coding block can be processed at the same time.

(Detailed Operation of Spatial Merging Motion Information Candidate Generation Unit 160)

Figure 15:
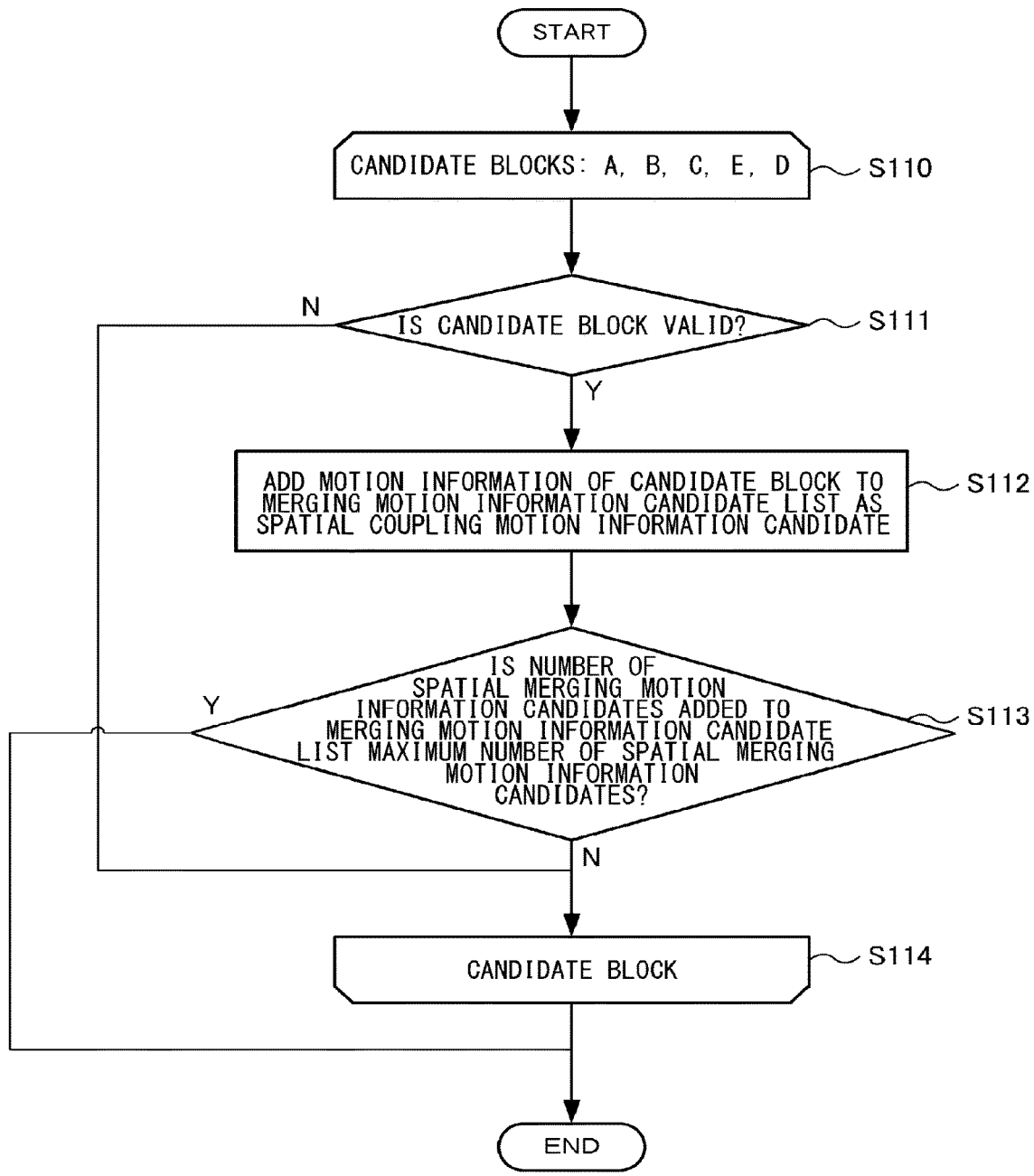
FIG. 15 is a flowchart explaining the operation of a spatial merging motion information candidate generation unit shown in FIG. 10.

An explanation is now given of the detailed operation of the spatial merging motion information candidate generation unit 160. FIG. 15 is a flowchart for explaining the operation of the spatial merging motion information candidate generation unit 160. The spatial merging motion information candidate generation unit 160 repeats the following processes in order of a block A, a block B, a block C, a block E, and a block D, which are candidate blocks included in a spatial candidate block group of a candidate block group (S110 through S114).

First, the spatial merging motion information candidate generation unit 160 checks whether a candidate block is valid (S111). A candidate block being valid means that at least one of respective reference indices of L0 prediction and L1 prediction of the candidate block is larger than or equal to 0. If the candidate block is valid (Y in S111), the spatial merging motion information candidate generation unit 160 adds motion information of the candidate block to the merging motion information candidate list as a spatial merging motion information candidate (S112). If the candidate block is not valid (N in S111), the spatial merging motion information candidate generation unit 160 checks a subsequent candidate block (S114). Subsequently to the step S112, the spatial merging motion information candidate generation unit 160 checks whether the number of spatial merging motion information candidates added to the merging motion information candidate list is the maximum number of spatial merging motion information candidates (S113). In this case, the maximum number of spatial merging motion information candidates is set to be 4. If the number of spatial merging motion information candidates added to the merging motion information candidate list is not the maximum number of spatial merging motion information candidates (N in S113), the spatial merging motion information candidate generation unit 160 checks a subsequent candidate block (S114). If the number of spatial merging motion information candidates added to the merging motion information candidate list is the maximum number of spatial merging motion information candidates (Y in S113), the spatial merging motion information candidate generation unit 160 ends the process.

In order for addition to the merging motion information candidate list while giving priority to motion information of the block A and the block B, which have a long contact line with the target block and are generally considered to have high correlation with the target block, the order of the processes are set to be the block A, the block B, the block C, the block E, and the block D. However, the order of the processes is not limited to this, as long as merging motion information candidates are added to the merging motion information candidate list in descending order of correlation with the target block or in descending order of a selection probability as a candidate block. For example, in the case of the prediction block 1 having a prediction block size type of N.times.2N, the order can be the order of a block B, a block C, a block E, a block D, and a block A. In the case of the prediction block 1 having a prediction block size type of 2N.times.N, the order can be a block A, a block C, a block E, a block D, and a block B. In the case of the prediction block 1 having a prediction block size type of N.times.N, the order can be a block B, a block C, a block D, a block A, and a block E. In the case of the prediction block 2 having a prediction block size type of N.times.N, the order can be a block A, a block E, a block D, a block B, and a block C. In the case of the prediction block 3 having a prediction block size type of N.times.N, the order can be a block C, a block E, a block A, a block B, and a block D. As described, by adding merging motion information candidates to the merging motion information candidate list in order of closeness to the target prediction block, assignment of a large merge index to a block close to the target prediction block can be prevented, and the coding efficiency can be improved. The maximum number of spatial merging motion information candidates is set to be 4. However, the maximum number is not limited to this as long as the number of spatial merging motion information candidates is larger than or equal to 1 and is smaller than or equal to the maximum number of merge candidates.

(Detailed Operation of Temporal Merging Motion Information Candidate Generation Unit 161)

Figure 16:
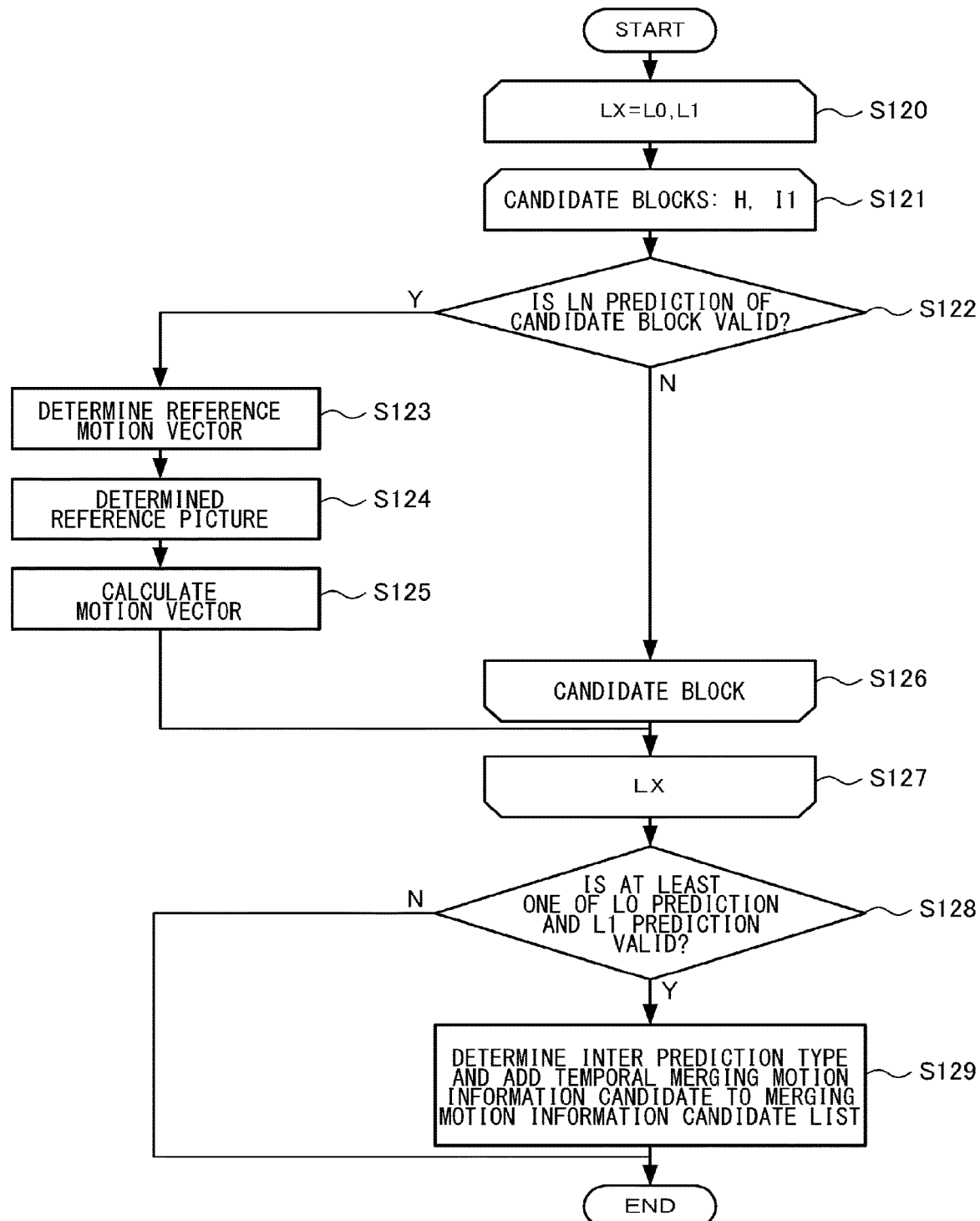
FIG. 16 is a flowchart explaining the operation of a temporal merging motion information candidate generation unit shown in FIG. 10.

An explanation is now given of the detailed operation of the temporal merging motion information candidate generation unit 161. FIG. 16 is a flowchart for explaining the operation of the temporal merging motion information candidate generation unit 161. The temporal merging motion information candidate generation unit 161 repeats the following processes for each prediction direction LX of L0 prediction and L1 prediction (S120 through S127). X is 0 or 1. The temporal merging motion information candidate generation unit 161 repeats the following processes in order of a block H and a block I, which are candidate blocks included in a temporal candidate block group of a candidate block group (S121 through S126).

The temporal merging motion information candidate generation unit 161 checks whether LN prediction of a candidate block is valid (S122). N is 0 or 1. It is assumed that N is the same as X. LN prediction of a candidate block being valid means that a reference index of the LN prediction of the candidate block is larger than or equal to 0. If the LN prediction of the candidate block is valid (Yin S122), a motion vector of the LN prediction of the candidate block is set to be a reference motion vector (S123). If the LN prediction of the candidate block is not valid (N in S122), the steps 123 to 126 are skipped, and a subsequent candidate block is checked (S126).

Subsequently to the step S123, the temporal merging motion information candidate generation unit 161 determines a reference picture of the LX prediction of a temporal merging motion information candidate (S124). In this case, the reference picture of the LX prediction of the temporal merging motion information candidate is set to be a reference picture of a reference index 0. In this case, the reference picture of the LX prediction of the temporal merging motion information candidate is set to be a reference picture of a reference index 0. However, the reference picture is not limited to this, as long as the reference picture does not depend on the value of another prediction block in the coding block. Then, by scaling the reference motion vector to match a distance between the target picture and the reference picture of the LX prediction of the temporal merging motion information candidate, the temporal merging motion information candidate generation unit 161 calculates a motion vector of the LX prediction of the temporal merging motion information candidate (S125) and processes the subsequent prediction direction (S127). A specific method of calculating the motion vector of the LX prediction of the temporal merging motion information candidate will be described later. Subsequently to the step S127 where the processes are ended for the L0 prediction and the L1 prediction, the temporal merging motion information candidate generation unit 161 checks whether at least one of the L0 prediction and the L1 prediction of the temporal merging motion information candidate is valid (S128). If at least one of the L0 prediction and the L1 prediction of the temporal merging motion information candidate is valid (Y in S128), the temporal merging motion information candidate generation unit 161 determines the inter prediction type of the temporal merging motion information candidate and adds the temporal merging motion information candidate to the merging motion information candidate list (S129). For the determination of the inter prediction type, the inter prediction type of the temporal merging motion information candidate is set to be Pred_L0 if only the L0 prediction is valid, the inter prediction type of the temporal merging motion information candidate is set to be Pred_L1 if only the L1 prediction is valid, and the inter prediction type of the temporal merging motion information candidate is set to be Pred_BI if both the L0 prediction and the L1 prediction are valid.

Subsequently, an explanation is given of the method of calculating the motion vector of the LX prediction of the temporal merging motion information candidate. If an inter-picture distance between a ColPic having a temporal candidate block and a ColRefLXPic, which is a picture referred to by the temporal candidate block in motion compensation prediction of the LX prediction, an inter-picture distance between a reference image RefLXPic of the LX prediction of the temporal merging motion information candidate and a target picture CurPic, and the reference motion vector of the LX prediction are denoted as td, tb, and mvLX, respectively, a motion vector mvLXCol of the LX prediction of the temporal merging motion information candidate is calculated by Expression 1. It can be understood based on Expression 1 that subtraction, division, and multiplication for calculating tb and td are necessary for calculating the motion vector of the LX prediction of the temporal merging motion information candidate.

$$mvLXCol = tb/td * mvLX;  \quad \text{Expression 1}$$

In the case of using integer arithmetic for the simplification of floating-point arithmetic, for example, Expression 1 may be used after being expanded as in Expression 2 through Expression 4. Abs (v) is a function for calculating the absolute value of a value v. Clip3(uv,lv,v) is a function that limits the value v to be from a lower limit Iv to an upper limit uv. Sign (v) is a function that returns 1 if the value v is larger than or equal to 0 and returns −1 if the value v is smaller than 0.

$$tx = (16384 + Abs(td/2))/td; \quad \text{Expression 2}$$

$$DistScaleFactor = Clip3(-1024, 1023, (tb*tx+32) >> 6); \quad \text{Expression}$$

$$mvLXCol = Sign(DistScaleFactor*mvLX) * ((Abs(DistScaleFactor*mvLX)+127) > \&-gt; 8); \quad \text{Expression 4}$$

In this case, the maximum number of temporal merging motion information candidates, which in the maximum number of temporal merging motion information candidates that can be added to the merging motion information candidate list, is set to be 1. Therefore, although a process that corresponds to the step S115 shown in FIGS. 14A-14H, which is a flowchart explaining the operation of the spatial merging motion information candidate generation unit 160, is omitted in FIG. 16, the process that corresponds to the step S115 can be added after the step S129 if the maximum number of temporal merging motion information candidates is larger than or equal to 2.

In this case, N is set to be the same as X. However, N may be different from X and is not limited to this.

(Detailed Operation of First Merging Motion Information Candidate Supplying Unit 163)

Figure 17:
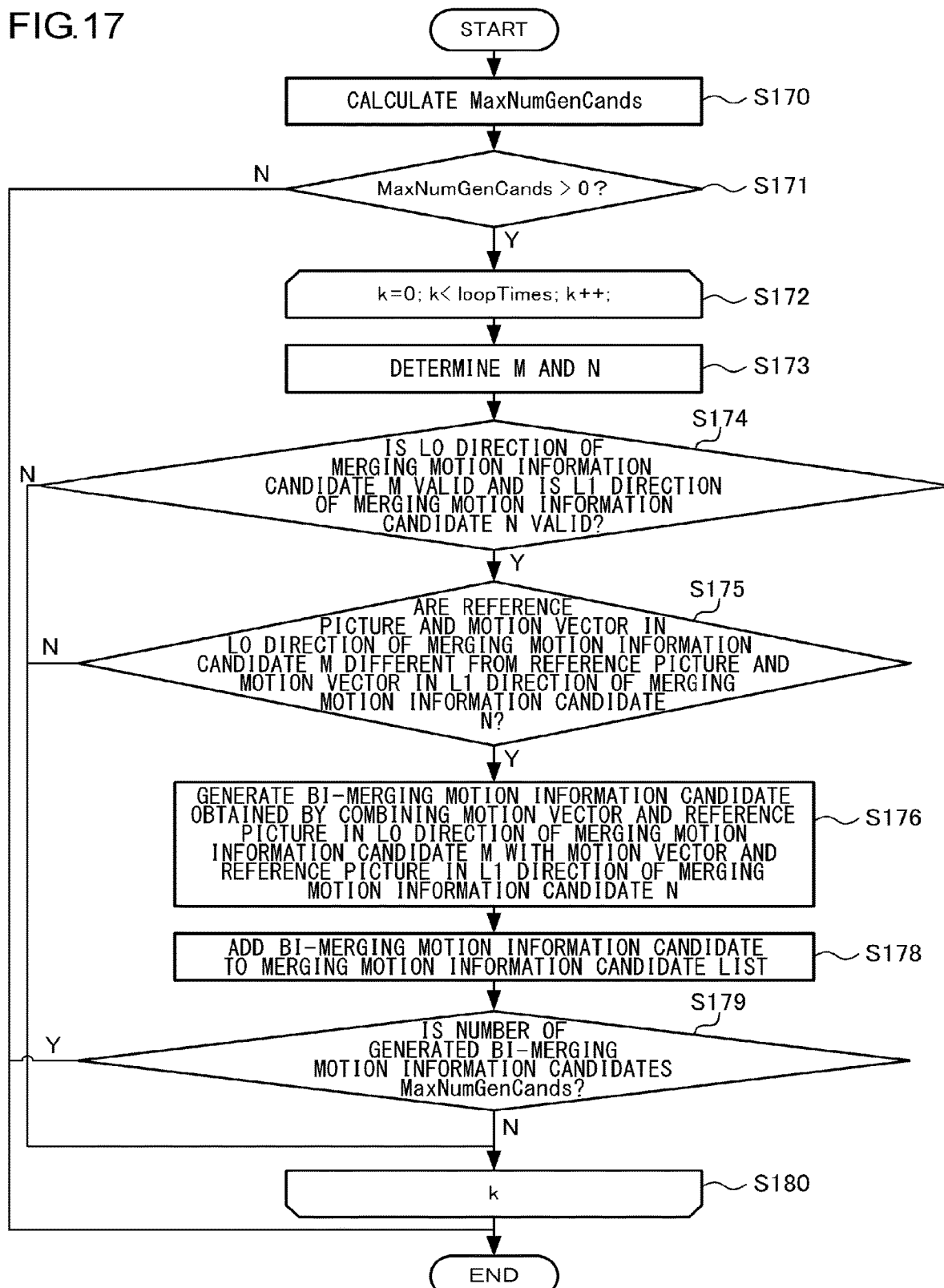
FIG. 17 is a flowchart explaining the operation of a first merging motion information candidate supplying unit shown in FIG. 10.

An explanation is now given of the detailed operation of the first merging motion information candidate supplying unit 163. FIG. 17 is a flowchart for explaining the operation of the first merging motion information candidate supplying unit 163. First, the first merging motion information candidate supplying unit 163 calculates MaxNumGenCand, which is the maximum number for generating first supplementary merging motion information candidates, by Expression 5 from the number of merging motion information candidates (NumCandList) and the maximum number of merge candidates (MaxNumMergeCand) added to the merging motion information candidate list supplied by the first merging motion information candidate supplying unit 163 (S170).

MaxNumGenCand=MaxNumMergeCand−NumCandList;

(NumCandList>1)

MaxNumGenCand=0;(NumCandList<=1)  Expression 5

Then, the first merging motion information candidate supplying unit 163 checks whether MaxNumGenCand is larger than 0 (S171). If MaxNumGenCand is not larger than 0 (N in S171), the first merging motion information candidate supplying unit 163 ends the process. If MaxNumGenCand is larger than 0 (Y in S171), the first merging motion information candidate supplying unit 163 performs the following processes. First, the first merging motion information candidate supplying unit 163 determines loopTinnes, which is the number of combination checks. loopTinnes is set to be NumCandListxNumCandList. If loopTinnes exceeds 8, loopTinnes is limited to 8 (S172). loopTinnes is an integer of 0 to 7. The following processes are repeated only for loopTinnes (S172 through S180). The first merging motion information candidate supplying unit 163 determines a combination of a merging motion information candidate M and a merging motion information candidate N (S173). Relationships among the number of combination checks, the merging motion information candidate M, and the merging motion information candidate N. FIG. 18 is a diagram for explaining relationships among the number of combination checks, the merging motion information candidate M, and the merging motion information candidate N. As in FIG. 18, M and N are different values and are set in ascending order of the total value of M and N. The first merging motion information candidate supplying unit 163 checks whether the L0 prediction of the merging motion information candidate M is valid and whether the L1 prediction of the merging motion information candidate N is valid (S174). If the L0 prediction of the merging motion information candidate M is valid and the L1 prediction of the merging motion information candidate N is valid (Y in S174), the first merging motion information candidate supplying unit 163 checks whether a reference picture and a motion vector of the L0 prediction of the merging motion information candidate M are different from a reference picture and a motion vector of the L1 prediction of the merging motion information candidate N (S175). If the L0 prediction of the merging motion information candidate M is valid and the L1 prediction of the merging motion information candidate N is not valid (N in S174), the first merging motion information candidate supplying unit 163 processes a subsequent combination. If the reference picture of the L0 prediction of the merging motion information candidate M is different from the reference picture of the L1 prediction of the merging motion information candidate N is valid (Y in S175), the first merging motion information candidate supplying unit 163 generates a bi-merging motion information candidate having an inter prediction type of Pred_BI by combining the motion vector and the reference picture of L0 prediction of the merging motion information candidate M and the motion vector and the reference picture of L1 prediction of the merging motion information candidate N (S176). In this case, the first merging motion information candidate supplying unit 163 generates, as a first supplementary merging motion information candidate, bi-merging motion information obtained by combining motion information of the L0 prediction of a merging motion information candidate and motion information of the L1 prediction of a different merging motion information candidate. If the reference picture of the L0 prediction of the merging motion information candidate M is the same as the reference picture of the L1 prediction of the merging motion information candidate N (N in S175), the first merging motion information candidate supplying unit 163 processes a subsequent combination. Subsequently to the step S176, the first merging motion information candidate supplying unit 163 adds the bi-merging motion information candidate to the merging motion information candidate list (S178). Subsequently to the step S178, the first merging motion information candidate supplying unit 163 checks whether the number of pieces of generated bi-merging motion information is MaxNumGenCand (S179). If the number of the pieces of generated bi-merging motion information is MaxNumGenCand (Y in S179), the first merging motion information candidate supplying unit 163 ends the process. If the number of the pieces of generated bi-merging motion information is not MaxNumGenCand (N in S179), the first merging motion information candidate supplying unit 163 processes a subsequent combination.

In this case, the first supplementary merging motion information candidate is set to be a bi-merging motion information candidate, in which the direction of motion compensation prediction is bi-directional, by combining the motion vector and the reference picture of the L0 prediction of a merging motion information candidate added to the merging motion information candidate list and the motion vector and the reference picture of the L1 prediction of another merging motion information candidate. However, the first supplementary merging motion information candidate is not limited to this. For example, the first supplementary merging motion information candidate may be a merging motion information candidate, in which the direction of motion compensation prediction is bi-directional, obtained by adding an offset value of +1 or the like to the motion vector of the L0 prediction and the motion vector of the L1 prediction of a merging motion information candidate added to the merging motion information candidate list or a merging motion information candidate, in which the direction of motion compensation prediction is uni-directional, obtained by adding an offset value of +1 or the like to the motion vector of the L0 prediction or the motion vector of the L1 prediction of a merging motion information candidate added to the merging motion information candidate list. As another example of the first supplementary merging motion information candidate, a new merging motion information candidate, in which the direction of motion compensation prediction is bi-directional, may be generated by obtaining a motion vector of the L1 prediction by scaling using, as a reference, a motion vector of the L0 prediction of a merging motion information candidate added to the merging motion information candidate list and then combining those motion vectors. Alternatively, those may be arbitrarily combined.

In this case, if there is a slight difference between motion information of a merging motion information candidate added to the merging motion information candidate list and the motion of a target motion information candidate, the first supplementary merging motion information candidate allows for an increase in the coding efficiency by generating a new merging motion information candidate that is valid by modifying the motion information of the merging motion information candidate added to the merging motion information candidate list.

(Detailed Operation of Second Merging Motion Information Candidate Supplying Unit 164)

Figure 19:
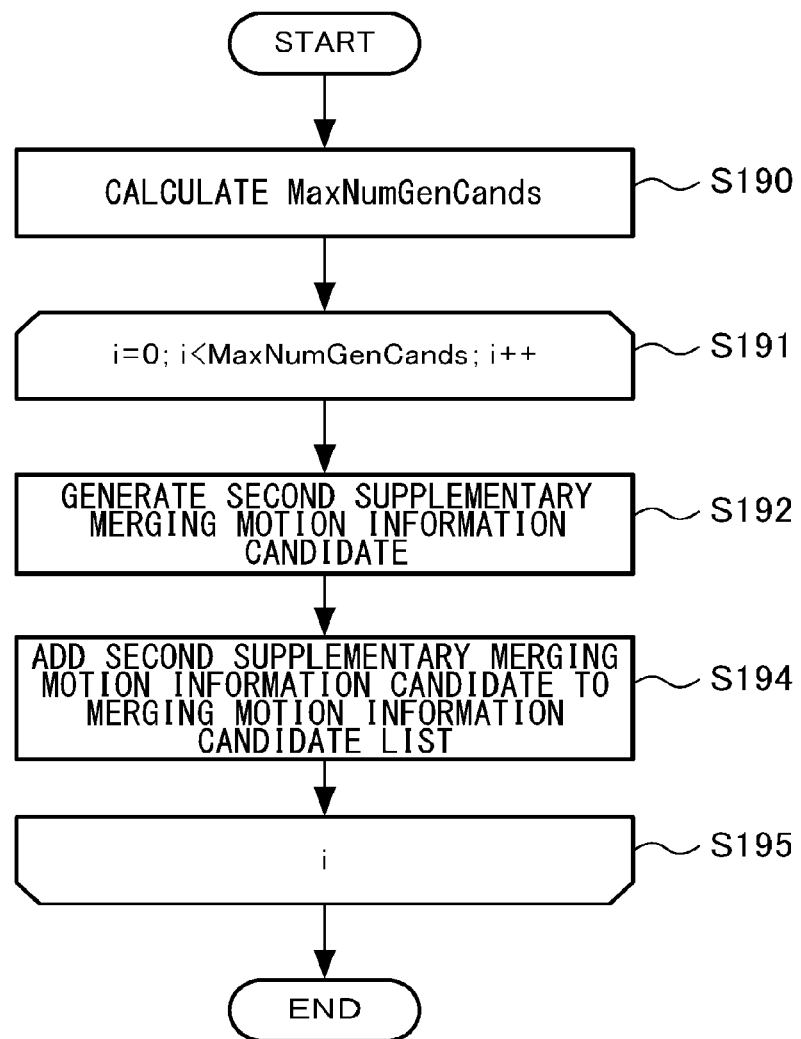
FIG. 19 is a flowchart explaining the operation of a second merging motion information candidate supplying unit shown in FIG. 10.

An explanation is now given of the detailed operation of the second merging motion information candidate supplying unit 164. FIG. 19 is a flowchart for explaining the operation of the second merging motion information candidate supplying unit 164. First, the second merging motion information candidate supplying unit 164 calculates MaxNumGenCand, which is the maximum number for generating first supplementary merging motion information candidates, by Expression 6 from the number of merging motion information candidates (NumCandList) and the maximum number of merge candidates (MaxNumMergeCand) added to the merging motion information candidate list supplied by the first merging motion information candidate supplying unit 163 (S190).

$$\text{MaxNumGenCand=MaxNumMergeCand−NumCandList;} \quad \text{Expression 6}$$

Then, the second merging motion information candidate supplying unit 164 repeats the following processes for the number of times of MaxNumGenCand for i (S191 through S195), where i is an integer of 0 to (MaxNumGenCand−1). The second merging motion information candidate supplying unit 164 generates a second supplementary merging motion information candidate that has a motion vector of (0,0) and a reference index of i for the L0 prediction, a motion vector of (0,0) and a reference index of i for the L1 prediction, and an inter prediction type of Pred_BI (S192). The second merging motion information candidate supplying unit 164 adds the second supplementary merging motion information candidate to the merging motion information candidate list (S194). The second merging motion information candidate supplying unit 164 processes a subsequent i (S195).

In this case, the second supplementary merging motion information candidate is set to be a merging motion information candidate that has a motion vector of (0,0) and a reference index of i for the L0 prediction, a motion vector of (0,0) and a reference index of i for the L1 prediction, and an inter prediction type of Pred_BI. This is because, in a commonly-used moving picture, the frequency of occurrence of a merging motion information candidate with a motion vector of (0,0) for the L0 prediction and the L1 prediction is statistically high. The second supplementary merging motion information candidate is not limited to this, as long as the second supplementary merging motion information candidate is set to a merging motion information candidate that does not depend on motion information of a merging motion information candidate added to the merging motion information candidate list and that has a statistically high frequency of use. For example, the motion vector of the L0 prediction and the motion vector of the L1 prediction each may take a vector value other than (0,0) and may be set such that a reference index of the L0 prediction and a reference index of the L1 prediction are different. Alternatively, the second supplementary merging motion information candidate can be set to be motion information having a high frequency of occurrence of a coded picture or a portion of a coded picture so as to be coded into a bitstream and then transmitted. In this case, an explanation is given regarding a B picture. In the case of a P picture, a second supplementary merging motion information candidate having a motion vector of (0,0) for L0 prediction and an inter prediction type of Pred_L0 is generated.

Setting a merging motion information candidate that does not depend on a merging motion information candidate added in the merging motion information candidate list as the second supplementary merging motion information candidate allows the use of a merge mode when the number of merging motion information candidates added in the merging motion information candidate list is zero, and the coding efficiency can be improved. Also, when motion information of a merging motion information candidate added to the merging motion information candidate list is different from the motion of a target motion information candidate, the coding efficiency can be improved by increasing choices by generating a new merging motion information candidate.

(Configuration of Moving Picture Decoding Device 200)

Figure 20:
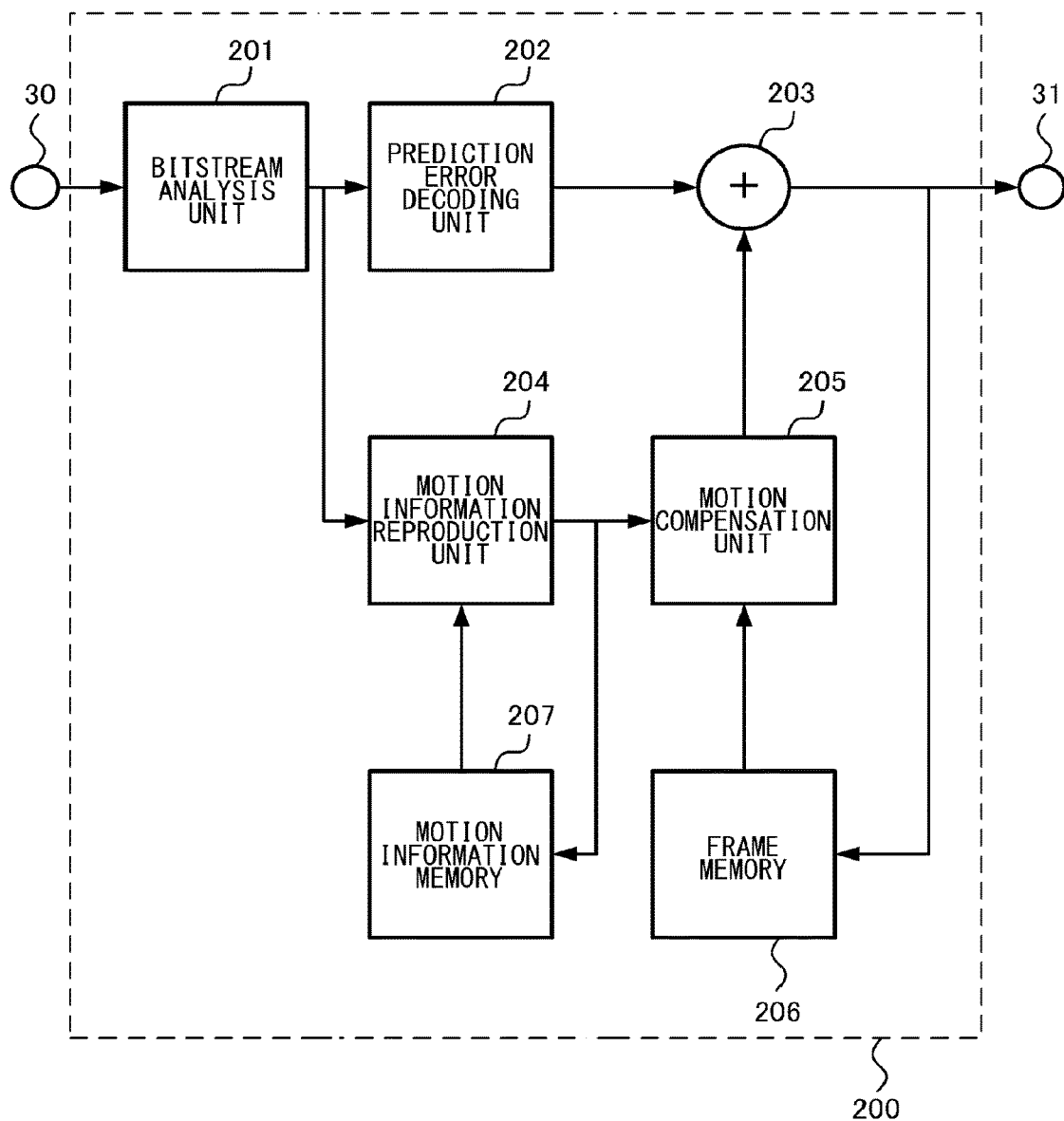
FIG. 20 is a diagram showing the configuration of a moving picture decoding device according to the first embodiment.

An explanation is now given of a moving picture decoding device according to the first embodiment. FIG. 20 is a diagram showing the configuration of the moving picture decoding device 200 according to the first embodiment. The moving picture decoding device 200 is a device that generates a reproduction image by decoding a bitstream coded by the moving picture coding device 100.

The moving picture decoding device 200 is achieved by hardware such as an information processing device or the like provided with a CPU (Central Processing Unit), a frame memory, a hard disk, and the like. By the operation of the above constituting elements, the moving picture decoding device 200 achieves functional constituting elements explained in the following. It is assumed that the partition of a coding block, the determination of a skip mode, the determination of a prediction block size type, the determination of a prediction block size and a position in a coding block of a prediction block (also referred to as position information of a prediction block), and the determination of whether a prediction coding mode is intra are determined by a higher-order control unit (not shown). Thus, an explanation is given regarding a case where a prediction coding mode is not intra. The position information and the prediction block size of a prediction block subject to decoding are assumed to be shared in the moving picture decoding device 200 and are thus not shown.

The moving picture decoding device 200 according to the first embodiment includes a bitstream analysis unit 201, a prediction error decoding unit 202, an addition unit 203, a motion information reproduction unit 204, a motion compensation unit 205, a frame memory 206, and a motion information memory 207.

(Operation of Moving Picture Decoding Device 200)

An explanation is given in the following regarding the function and operation of each component. The bitstream analysis unit 201 analyzes a bitstream supplied by the terminal 30 so as to subject prediction error coding data, a merge flag, a merge index, a prediction direction (inter prediction type) of motion compensation prediction, a reference index, a vector difference, and a vector predictor index to entropy decoding according to syntax. The entropy decoding is performed by a method including variable-length coding such as arithmetic coding, Huffman coding, or the like. The bitstream analysis unit 201 supplies the prediction error coding data to the prediction error decoding unit 202 and supplies the merge flag, the merge index, the inter prediction type, the reference index, the vector difference, and the vector predictor index to the motion information reproduction unit 204.

The bitstream analysis unit 201 decodes partition information for a coding block, a prediction block size type, and a prediction coding mode that are used in the moving picture decoding device 200 from the bitstream along with an SPS (Sequence Parameter Set) defining a parameter group for determining the properties of the bitstream, a PPS (Picture Parameter Set) defining a parameter group for determining the properties of a picture, a slice header defining a parameter group for determining the properties of a slice, and the like.

The motion information reproduction unit 204 reproduces motion information from the merge flag, the merge index, the inter prediction type, the reference index, the vector difference, and the vector predictor index supplied by the bitstream analysis unit 201 and the candidate block group supplied by the motion information memory 207 and supplies the motion information to the motion compensation unit 205 and the motion information memory 207. The detailed configuration of the motion information reproduction unit 204 will be described later.

The motion compensation unit 205 performs motion compensation on a reference picture that is indicated by a reference index in the frame memory 206 based on the motion information supplied by the motion information reproduction unit 204 so as to generate a prediction signal. If the prediction direction is bi-prediction, the motion compensation unit 205 generates the average of respective prediction signals for the L0 prediction and the L1 prediction as the prediction signal and supplies the prediction signal to the addition unit 203.

The prediction error decoding unit 202 generates a prediction error signal by performing a process such as inverse quantization, inverse orthogonal transformation, or the like on the prediction error coding data supplied by the bitstream analysis unit 201 and supplies the prediction error signal to the addition unit 203.

The addition unit 203 adds the prediction error signal supplied by the prediction error decoding unit 202 and the prediction signal supplied by the motion compensation unit 205 so as to generate a decoding picture signal and supplies the decoding picture signal to the frame memory 206 and the terminal 31.

The frame memory 206 and the motion information memory 207 have the same respective functions of the frame memory 110 and the motion information memory 111 of the moving picture coding device 100, respectively. The frame memory 206 stores the decoding picture signal supplied by the addition unit 203. The motion information memory 207 stores the motion information supplied by the motion information reproduction unit 204 in units of the minimum prediction block sizes.

(Detailed Configuration of Motion Information Reproduction Unit 204)

Figure 21:
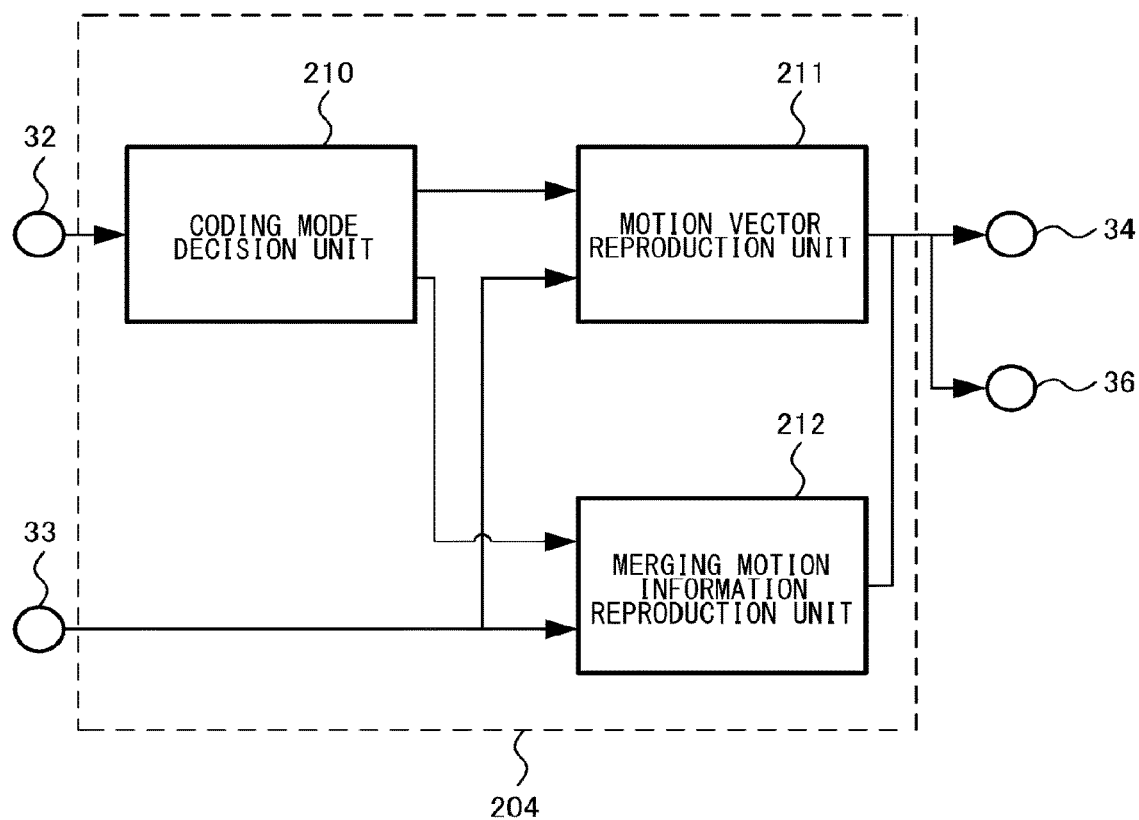
FIG. 21 is a diagram showing the configuration of a motion information reproduction unit shown in FIG. 20.

An explanation is now given regarding the detailed configuration of the motion information reproduction unit 204. FIG. 21 shows the configuration of the motion information reproduction unit 204. The motion information reproduction unit 204 includes a coding mode decision unit 210, a motion vector reproduction unit 211, and a merging motion information reproduction unit 212. A terminal 32, a terminal 33, a terminal 34, and a terminal 36 are connected to the bitstream analysis unit 201, the motion information memory 207, the motion compensation unit 205, and the motion information memory 207, respectively.

(Detailed Operation of Motion Information Reproduction Unit 204)

An explanation is given in the following regarding the function and operation of each component. The coding mode decision unit 210 determines whether the merge flag supplied by the bitstream analysis unit 201 is "0" or "1". If the merge flag is "0", the coding mode decision unit 210 supplies the inter prediction type, the reference index, the vector difference, and the vector predictor index supplied by the bitstream analysis unit 201 to the motion vector reproduction unit 211. If the merge flag is "1", the coding mode decision unit 210 supplies the merge index supplied by the bitstream analysis unit 201 to the merging motion information reproduction unit 212.

The motion vector reproduction unit 211 reproduces a motion vector from the inter prediction type, the reference index, the vector difference, and the vector predictor index supplied by the coding mode decision unit 210 and the candidate block group supplied by the terminal 22 so as to generate motion information and supplies the motion information to the terminal 34 and the terminal 36.

The merging motion information reproduction unit 212 constructs a merging motion information candidate list from the candidate block group supplied by the terminal 33, selects motion information of a merging motion information candidate indicated by the merge index supplied by the coding mode decision unit 210 from the merging motion information candidate list, and supplies the motion information to the terminal 34 and the terminal 36.

(Detailed Configuration of Merging Motion Information Reproduction Unit 212)

Figure 22:
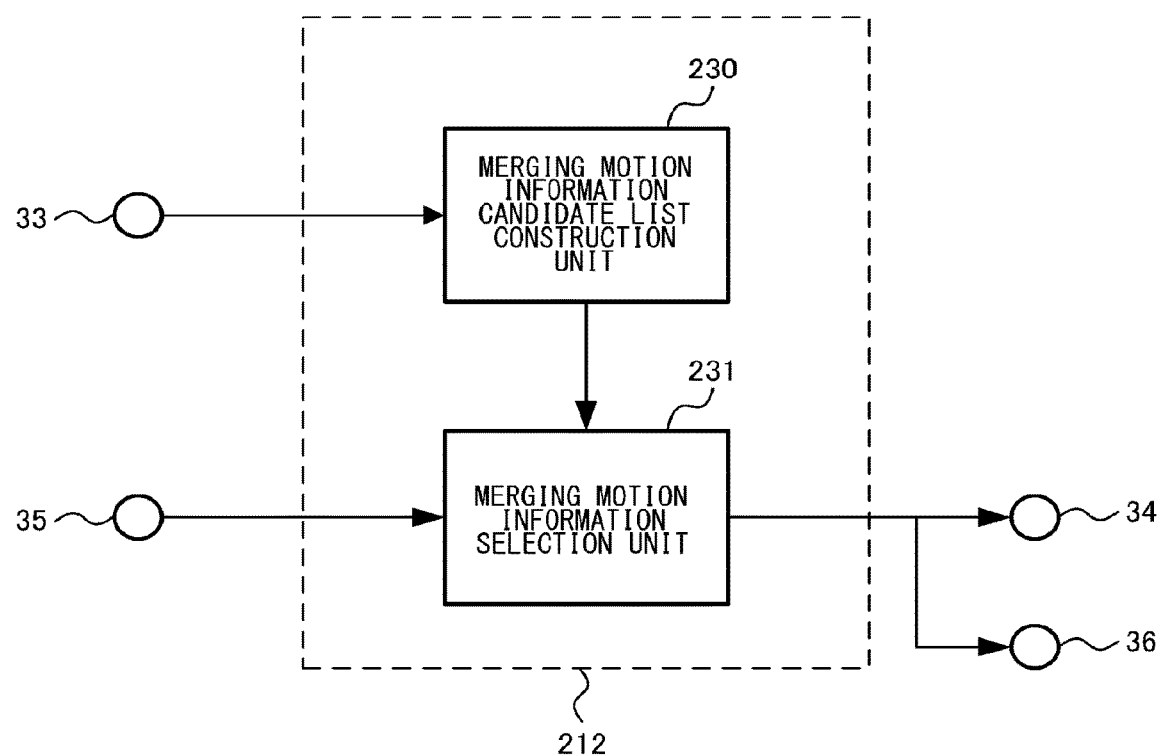
FIG. 22 is a diagram showing the configuration of a merging motion information reproduction unit shown in FIG. 21.

An explanation is now given regarding the detailed configuration of the merging motion information reproduction unit 212. FIG. 22 shows the configuration of the merging motion information reproduction unit 212. The merging motion information reproduction unit 212 includes a merging motion information candidate list construction unit 230 and a merging motion information selection unit 231. A terminal 35 is connected to the coding mode decision unit 210.

(Detailed Operation of Merging Motion Information Reproduction Unit 212)

An explanation is given in the following regarding the function and operation of each component. The merging motion information candidate list construction unit 230 has the same function as the merging motion information candidate list construction unit 140 of the moving picture coding device 100, constructs a merging motion information candidate list by the same operation as the merging motion information candidate list construction unit 140 of the moving picture coding device 100, and supplies the merging motion information candidate list to the merging motion information selection unit 231.

The merging motion information selection unit 231 selects a merging motion information candidate indicated by the merge index supplied by the terminal 35 from the merging motion information candidate list supplied by the merging motion information candidate list construction unit 230, determines merging motion information, and supplies motion information of the merging motion information to the terminals 34 and 36.

As described above, the moving picture decoding device 200 is capable of generating a reproduction image by decoding a bitstream coded by the moving picture coding device 100.

Second Embodiment

An explanation is given in the following regarding a second embodiment. A spatial candidate block group used in the spatial merging motion information candidate generation unit 160 for a prediction block having a prediction block size type other than 2N.times.2N is different from that in the first embodiment. An explanation is given in the following regarding a spatial candidate block group of a prediction block having a prediction block size type other than 2N.times.2N in the second embodiment.

FIGS. 23A-23H are diagrams explaining a positional relationship between a prediction block having a prediction block size type other than 2N.times.2N and a spatial candidate block group in the second embodiment. FIGS. 23A through 23H show respective spatial candidate block groups for a prediction block 0 having a prediction block size type of N.times.2N, a prediction block 1 having a prediction block size type of N.times.2N, a prediction block 0 having a prediction block size type of 2N.times.N, a prediction block 1 having a prediction block size type of 2N.times.N, a prediction block 0 having a prediction block size type of N.times.N, a prediction block 1 having a prediction block size type of N.times.N, a prediction block 2 having a prediction block size type of N.times.N, and a prediction block 3 having a prediction block size type of N.times.N, respectively. FIGS. 23A-23H show an example where a prediction block size is 16 pixels.times.16 pixels. As described, in a prediction block included in a coding block having a prediction block size type of 2N.times.2N, a candidate block group is determined for each prediction block based on the position and size of the prediction block.

In the figure, in addition to the first example, a block that always becomes unprocessed is replaced by a candidate block of a prediction block having a prediction block size type of 2N.times.2N. In other words, in the case of a prediction block 1 having a prediction block size type of N.times.2N (FIG. 23B), a block E is changed to a block E of a candidate block of a prediction block having a prediction block size type of 2N.times.2N. In the case of a prediction block 1 having a prediction block size type of 2N.times.N (FIG. 23D), a block C is changed to a block C of a candidate block of a prediction block having a prediction block size type of 2N.times.2N. In the case of a prediction block 1 having a prediction block size type of N.times.N (FIG. 23H), a block C and a block E are respectively changed to a block C and a block E of candidate blocks of a prediction block having a prediction block size type of 2N.times.2N.

As described above, by changing a candidate block that always becomes unprocessed to a candidate block of a prediction block having a prediction block size type of 2N.times.2N, the candidate block that always becomes unprocessed can be changed to a candidate block having the possibility of becoming valid. An increase in choices of merge modes increases the selectivity of the merge modes, and the coding efficiency can thus be improved. The coding efficiency can be improved by adding a first supplementary merging motion information candidate having relatively higher selectivity than a second supplementary merging motion information candidate to the merging motion information candidate list by generating new motion information by combining motion information of the replaced candidate block and motion information of another merging motion information candidate or by modifying the motion information of the replaced candidate block. In particular, since at least two merging motion information candidates are required when using a bi-merging motion information candidate, motion information of a replaced candidate block operates effectively in the case where there is only one merging motion information candidate, other than the replaced candidate block, that is added to the merging motion information candidate list.

In the operation of the spatial merging motion information candidate generation unit 160, the order of addition to the merging motion information candidate list is set to be the order of a block A, a block B, a block C, a block E, and a block D. However, the order can be changed as follows.

In the case of the prediction block 1 having a prediction block size type of N.times.2N, the order can be the order of a block B, a block C, a block D, a block A, and a block E. In the case of the prediction block 1 having a prediction block size type of 2N.times.N, the order can be a block A, a block E, a block D, a block B, and a block C. In the case of the prediction block 1 having a prediction block size type of N.times.N, the order can be a block B, a block C, a block D, a block A, and a block E. In the case of the prediction block 2 having a prediction block size type of N.times.N, the order can be a block A, a block E, a block D, a block B, and a block C. As described, by adding merging motion information candidates to the merging motion information candidate list in order of closeness to the target prediction block, assignment of a large merge index to a block close to the target prediction block can be prevented, and the coding efficiency can be improved.

Third Embodiment

First, an explanation is given regarding an example where a candidate block of a prediction block in a coding block is shared without depending on a prediction block size type. A prediction block having a prediction block size type other than 2N.times.2N, a spatial candidate block group, and a temporal candidate block group are different from those in the first embodiment. An explanation is given in the following regarding a prediction block having a prediction block size type other than 2N.times.2N, a spatial candidate block group, and a temporal candidate block group in an example where a candidate block of a prediction block in a coding block is shared without depending on a prediction block size type. In this example, a candidate block of a prediction block in a coding block shared without depending on a prediction block size type is used as a candidate block of a prediction block having a prediction block size type other than 2N.times.2N.

FIGS. 24A-24H are diagrams explaining a positional relationship between a prediction block having a prediction block size type other than 2N.times.2N and a candidate block group in an example where a candidate block of a prediction block in a coding block is shared without depending on a prediction block size type. In FIGS. 24A-24H, temporal candidate blocks H and I exist in a decoded picture that is different from a picture where spatial candidate blocks A through E exist. However, for the sake of ease of understanding and explanation, FIGS. 24A-24H show the temporal candidate blocks H and I along with the spatial candidate blocks A through E. FIGS. 24A through 24H show respective spatial candidate block groups for a prediction block 0 having a prediction block size type of N.times.2N, a prediction block 1 having a prediction block size type of N.times.2N, a prediction block 0 having a prediction block size type of 2N.times.N, a prediction block 1 having a prediction block size type of 2N.times.N, a prediction block 0 having a prediction block size type of N.times.N, a prediction block 1 having a prediction block size type of N.times.N, a prediction block 2 having a prediction block size type of N.times.N, and a prediction block 3 having a prediction block size type of N.times.N, respectively. FIGS.

24A-24H show an example where a prediction block size is 16 pixels.times.16 pixels. As a temporal candidate block group of a prediction block having a prediction block size type other than 2N.times.2N, a temporal candidate block group derived as a prediction block having a prediction block size type of 2N.times.2N is used as shown in FIGS. 24A-24H.

As described above, a candidate block does not depend on a prediction block size type and is set to be a candidate block of a prediction block having a prediction block size type of 2N.times.2N. In other words, without depending on a prediction block size type, a candidate block obtained when a prediction block size type is 2N.times.2N is shared in all prediction blocks in the coding block. In other words, according to the merging motion information candidate list construction units 140 and 230, an identical merging motion information candidate list is constructed if an identical candidate block is used. Therefore, without depending on a prediction block size type, a merging motion information candidate list derived when a prediction block size type is 2N.times.2N is shared in all prediction blocks in the coding block. Thereby, before the determination of a prediction block size type, a candidate block can be determined so that a merging motion information candidate list can be determined. In the case where the coding block is partitioned into a plurality of prediction blocks, it is no longer necessary to derive a candidate block for each prediction block. Thus, the number of times the merging motion information candidate list shown in FIG. 11 is constructed is reduced to ½ (in the case of halving partitioning) or ¼ (in the case of quartering partitioning). Also, the prediction blocks of the coding block can be processed in parallel.

An explanation is given in the following regarding another example of the third embodiment. A spatial candidate block group and a temporal candidate block group used in the spatial merging motion information candidate generation unit 160 and the operation of the merging motion information candidate list construction unit 140 for a prediction block having a prediction block size type other than 2N.times.2N are different from those in the first embodiment. An explanation is given in the following regarding a spatial candidate block group and a temporal candidate block group of a prediction block having a prediction block size type other than 2N.times.2N in the third embodiment.

In this case, in the case where a prediction block is partitioned into a plurality of pieces, a candidate block of a prediction block 0 is used as a candidate block of all prediction blocks in the coding block.

FIGS. 25A-25H are diagrams explaining a positional relationship between a prediction block having a prediction block size type other than 2N.times.2N and a candidate block group in the third embodiment. In FIGS. 25A-25H, temporal candidate blocks H and I exist in a decoded picture that is different from a picture where spatial candidate blocks A through E exist. However, for the sake of ease of understanding and explanation, FIGS. 25A-25H show the temporal candidate blocks H and I along with the spatial candidate blocks A through E. FIGS. 25A through 25H show respective spatial candidate block groups and respective temporal candidate block groups for a prediction block 0 having a prediction block size type of N.times.2N, a prediction block 1 having a prediction block size type of N.times.2N, a prediction block 0 having a prediction block size type of 2N.times.N, a prediction block 1 having a prediction block size type of 2N.times.N, a prediction block 0 having a prediction block size type of N.times.N, a prediction block 1 having a prediction block size type of N.times.N, a prediction block 2 having a prediction block size type of N.times.N, and a prediction block 3 having a prediction block size type of N.times.N, respectively. FIGS. 25A-25H show an example where a prediction block size is 16 pixels.times.16 pixels. As a temporal candidate block group of a prediction block having a prediction block size type other than 2N.times.2N, a temporal candidate block group derived as a prediction block 0 is used as shown in FIGS. 25A-25H.

Figure 26:
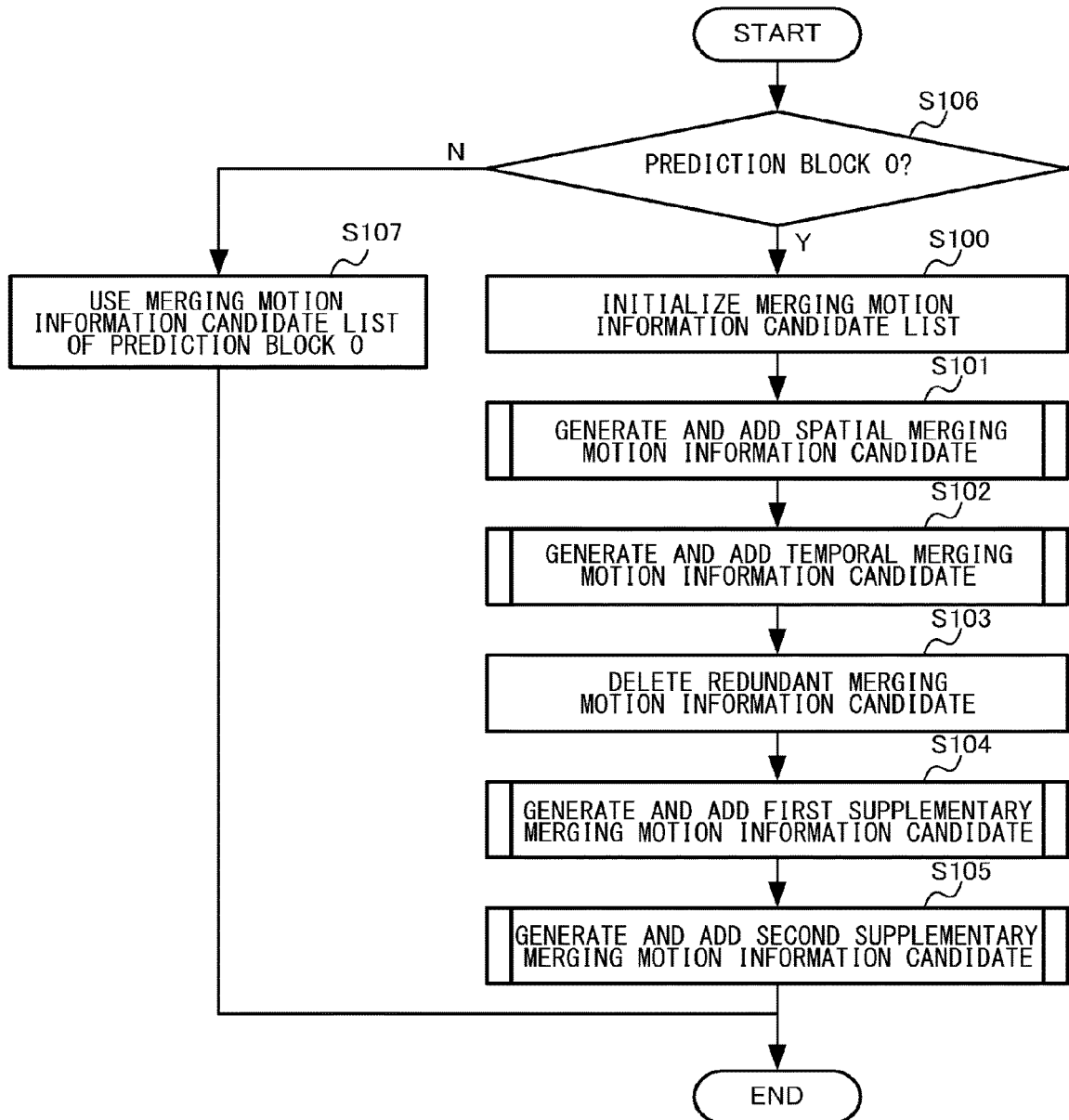
FIG. 26 is a flowchart explaining the operation of a merging motion information candidate list construction unit according to the third embodiment.

An explanation is now given of the operation of the merging motion information candidate list construction unit 140. FIG. 26 is a flowchart explaining the operation of the merging motion information candidate list construction unit 140 according to the third embodiment. Addition of step S106 and step S107 is different from FIG. 11 showing the operation of the merging motion information candidate list construction unit 140 according to the first embodiment. An explanation is given regarding the step S106 and the step S107, which are different from the first embodiment. The merging motion information candidate list construction unit 140 checks whether the target prediction block is a prediction block 0 (S106). If the target prediction block is a prediction block 0 (Y in S106), the merging motion information candidate list construction unit 140 performs the processes from step S100 to S105 and ends the process. If the target prediction block is not a prediction block 0 (N in S106), the merging motion information candidate list construction unit 140 uses the merging motion information candidate list of the prediction block 0 as the merging motion information candidate list of the target prediction block (S107) and ends the process.

As described above, by using a candidate block of a prediction block 0 as a candidate block of all prediction blocks in the coding block in the case where the coding block is partitioned into a plurality of prediction blocks, it is no longer necessary to construct a merging motion information candidate list of a prediction block other than the prediction block 0. Thus, the number of times the merging motion information candidate list shown in FIG. 11 is constructed is reduced to ½ (in the case of halving partitioning) or ¼ (in the case of quartering partitioning). In other words, a merging motion information candidate list derived in the prediction block 0 can be also shared in any of the prediction blocks of the coding block. Also, since the merging motion information candidate list can be constructed before the position of a prediction block is determined if the prediction block size type is determined, a circuit design and a software design can become flexible, and a circuit size and a software size can be reduced. Also, the prediction blocks of the coding block can be processed in parallel.

Further, by setting the position of a candidate block of a prediction block having a prediction block size type other than 2N.times.2N to be the position of a candidate block different from those of a prediction block having a prediction block size type of 2N.times.2N, the selection probability of a prediction block having a prediction block size type of 2N.times.2N can be increased, and the coding efficiency can be more improved compared to the example where a candidate block of a prediction block in a coding block is shared without depending on a prediction block size type. Further, since the prediction block 0 does not include a candidate block included in another prediction block in the same coding block or a candidate block that always becomes unprocessed, the probability of a merging motion information candidate becoming valid can be increased, and the prediction efficiency can thus be improved. Since the skip mode in which the coding efficiency is the highest is equivalent to a prediction block size type of 2N.times.2N, there is no effect caused by the present embodiment.

In the third embodiment, as a representative block of a coding block, a prediction block 0, which is the first prediction block in the coding block, is used. However, the representative block is not limited to this. For example, a prediction block that uses a merge mode first in the coding block can be also used. In this case, S106 and S107 are as shown in the following. Whether a merging motion information candidate list has already been constructed in the coding block is checked (S106). If a merging motion information candidate list has not been already constructed in the coding block (Y in S106), the processes from step S100 to S105 are performed, and the process is ended. If a merging motion information candidate list has already been constructed in the coding block (N in S106), the merging motion information candidate list already constructed in the coding block is used (S107), and the process is ended.

As described above, by using a merging motion information candidate list of a prediction block that uses a merge mode first in the coding block also in another prediction block in the coding block, at least the prediction efficiency of a prediction block that uses a merge mode first can be improved. Also, as a representative block of the coding block, the last prediction block (a prediction block 1 in the case of halving partitioning and a prediction block 3 in the case of quartering partitioning) in the coding block can be also used. In this case, by setting the position of a temporal candidate block group to be the position of a candidate block different from those of a prediction block having a prediction block size type of 2N.times.2N, the selection probability of a prediction block having a prediction block size type other than 2N.times.2N can be increased, and the prediction efficiency can be improved.

Also, as in the second embodiment, the addition to the merging motion information candidate list can be in the order of closeness to a target prediction block.

First Exemplary Variation of Third Embodiment

Figure 27:
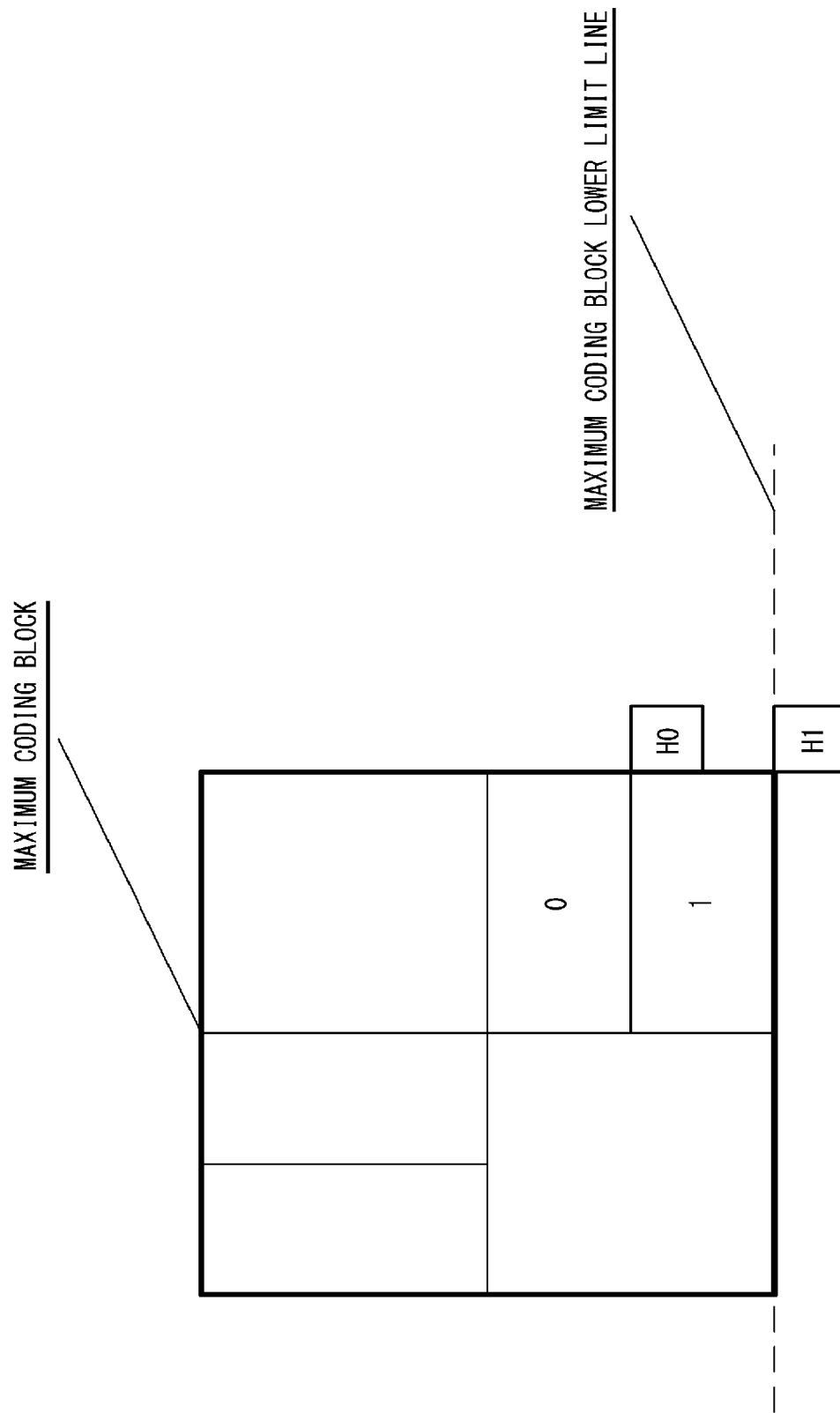
FIG. 27 is a diagram explaining a maximum coding block lower limit line and a temporal candidate block group.

An explanation is given in the following regarding a first exemplary variation of the third embodiment. Limitation of a temporal candidate block group by a maximum coding block lower limit line is different from the third embodiment. An explanation is given regarding the limitation of a temporal candidate block group by a maximum coding block lower limit line. FIG. 27 is a diagram explaining a maximum coding block lower limit line and a temporal candidate block group. As shown in FIG. 27, a maximum coding block lower limit line is a line where pixels of the lowermost part of a maximum coding block are included. By imposing a limitation such that a block located below the maximum coding block lower limit line, the capacity of a temporary storage area for a temporal candidate block group can be reduced in the moving picture coding device 100 and the moving picture decoding device 200.

If a positional relationship that is the same as that of a prediction block of a coding block that has a prediction block size type of 2N.times.2N is applied to a prediction block in a coding block that does not have a prediction block size type of 2N.times.2N, the position of a temporal candidate block (H1) of a prediction block 1 having a prediction block size type of 2N.times.N, which is in contact with the maximum coding block lower limit line shown in 27, cannot be used in the case where the maximum coding block lower limit line is provided.

However, as in the third embodiment, by using, when a prediction block is partitioned into a plurality of blocks, a candidate block of a prediction block 0 as a candidate block of all prediction blocks in the coding block, a temporal candidate block (H0) is used as a temporal candidate block group. Thus, the temporal candidate block can be made valid, and the prediction efficiency can thus be improved. This also applies to a prediction block 2 and a prediction block 3 having a prediction block size type of N.times.N.

Fourth Embodiment

An explanation is given in the following regarding a fourth embodiment. A spatial candidate block group and a temporal candidate block group of a prediction block having a prediction block size type other than 2N.times.2N and the configuration and operation of the merging motion information candidate list construction unit 140 are different from those in the first embodiment. An explanation is given in the following regarding a prediction block having a prediction block size type other than 2N.times.2N, a spatial candidate block group, and a temporal candidate block group in the fourth embodiment.

In this case, it is assumed that a positional relationship that is the same as that of a prediction block of a coding block having a prediction block size type of 2N.times.2N is applied in the spatial candidate block group. As the temporal candidate block group, a temporal candidate block group derived as the prediction block 0 is used.

FIGS. 28A-28H are diagrams explaining a positional relationship between a prediction block having a prediction block size type other than 2N.times.2N and a candidate block group in the fourth embodiment. In FIGS. 28A-28H, temporal candidate blocks H and I exist in a decoded picture that is different from a picture where spatial candidate blocks A through E exist. However, for the sake of ease of understanding and explanation, FIGS. 28A-28H show the temporal candidate blocks H and I along with the spatial candidate blocks A through E. FIGS. 28A through 28H show respective spatial candidate block groups for a prediction block 0 having a prediction block size type of N.times.2N, a prediction block 1 having a prediction block size type of N.times.2N, a prediction block 0 having a prediction block size type of 2N.times.N, a prediction block 1 having a prediction block size type of 2N.times.N, a prediction block 0 having a prediction block size type of N.times.N, a prediction block 1 having a prediction block size type of N.times.N, a prediction block 2 having a prediction block size type of N.times.N, and a prediction block 3 having a prediction block size type of N.times.N, respectively. FIGS. 28A-28H show an example where a prediction block size is 16 pixels.times.16 pixels. As a temporal candidate block group of a prediction block having a prediction block size type other than 2N.times.2N, a temporal candidate block group derived as a prediction block 0 is used as shown in FIGS. 28A-28H. Undoubtedly, as a temporal candidate block group of a prediction block having a prediction block size type other than 2N.times.2N, a temporal candidate block group derived as a prediction block having a prediction block size type of 2N.times.2N can be also used.

Figure 29:
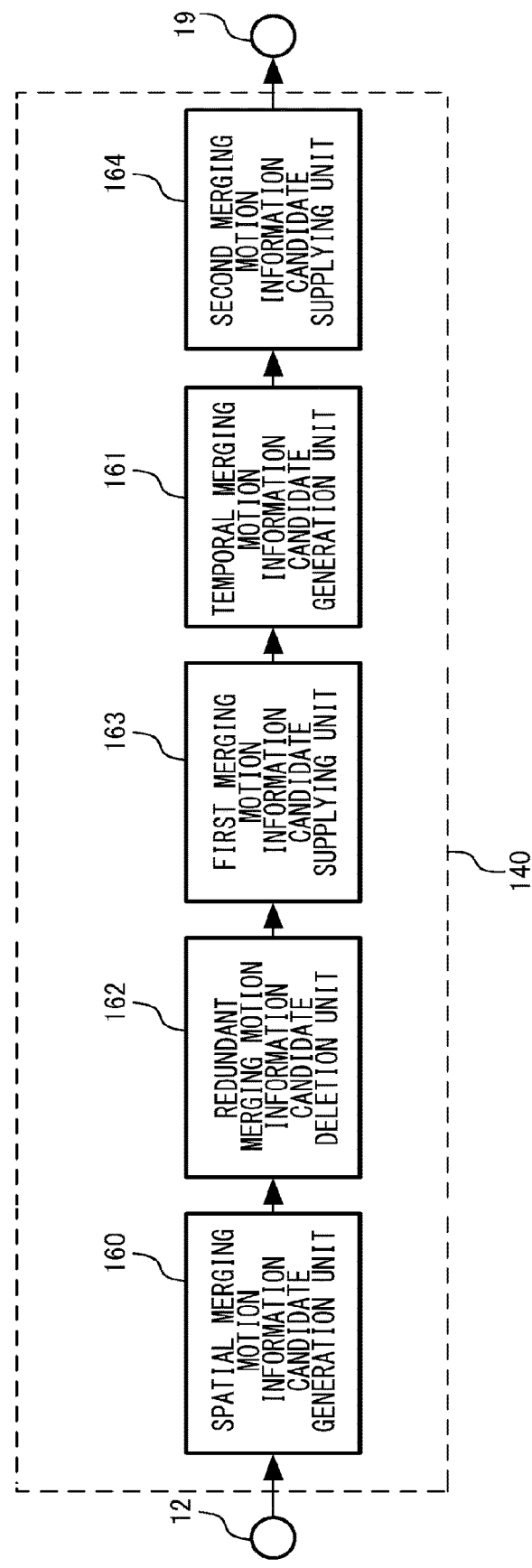
FIG. 29 is a diagram explaining the configuration of a merging motion information candidate list construction unit according to the fourth embodiment.
Figure 30:
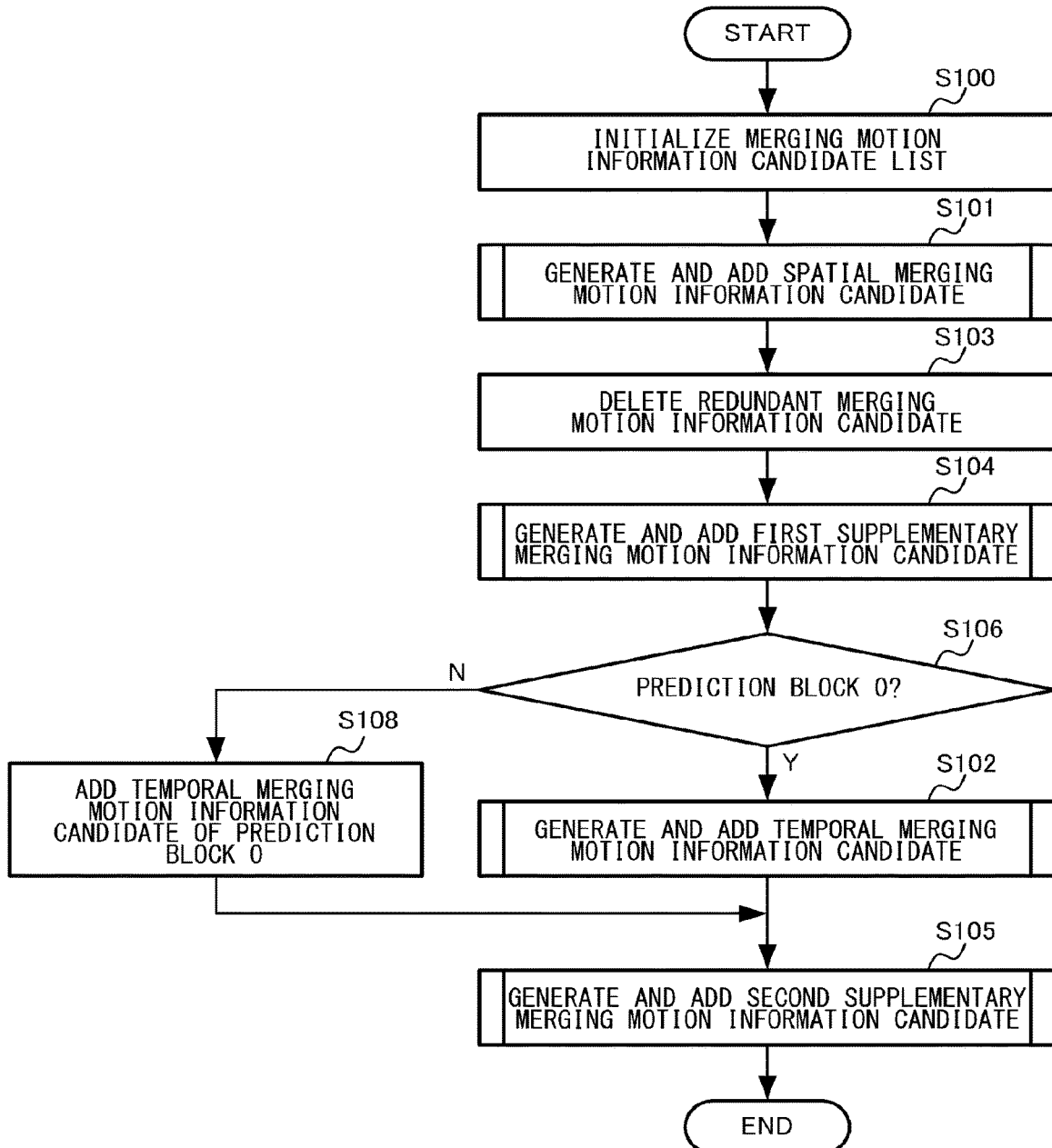
FIG. 30 is a flowchart explaining the operation of the merging motion information candidate list construction unit according to the fourth embodiment.

An explanation is now given of the configuration and operation of the merging motion information candidate list construction unit 140. FIG. 29 is a diagram explaining the configuration of the merging motion information candidate list construction unit 140 according to the fourth embodiment. The position of the temporal merging motion information candidate generation unit 161 provided in a stage following the first merging motion information candidate supplying unit 163 is different from that in the first embodiment. FIG. 30 is a flowchart explaining the operation of the merging motion information candidate list construction unit 140 according to the fourth embodiment. Addition of step S106 and step S108 and the position of the step S102 are different from FIG. 11 showing the operation of the merging motion information candidate list construction unit 140 according to the first embodiment. An explanation is given regarding differences from the first embodiment.

The spatial merging motion information candidate generation unit 160 generates spatial merging motion information candidates, as many as zero to the maximum number of spatial merging motion information candidates, from the candidate block group supplied by the terminal 12 so as to add the generated spatial merging motion information candidates to the merging motion information candidate list (S101) and supplies the merging motion information candidate list and the candidate block group to the redundant merging motion information candidate deletion unit 162.

The redundant merging motion information candidate deletion unit 162 then examines the merging motion information candidates added in the merging motion information candidate list supplied by the spatial merging motion information candidate generation unit 160, leaves, if there are a plurality of merging motion information candidates having the same motion information, one of the plurality of merging motion information candidates while deleting the rest of the merging motion information candidates (S103), and supplies the merging motion information candidate list to the first merging motion information candidate supplying unit 163.

The first merging motion information candidate supplying unit 163 then generates zero to two first supplementary merging motion information candidates from the merging motion information candidates added to the merging motion information candidate list supplied by the redundant merging motion information candidate deletion unit 162 so as to add the first supplementary merging motion information candidates to the merging motion information candidate list (S104) and supplies the merging motion information candidate list and the candidate block group to the temporal merging motion information candidate generation unit 161.

Next, the temporal merging motion information candidate generation unit 161 checks whether the target prediction block is a prediction block 0 (S106). If the target prediction block is a prediction block 0 (Y in S106), the temporal merging motion information candidate generation unit 161 generates temporal merging motion information candidates, as many as zero to the maximum number of temporal merging motion information candidates, from the candidate block group supplied by the redundant merging motion information candidate deletion unit 162 so as to add the generated temporal merging motion information candidates to the merging motion information candidate list supplied by the redundant merging motion information candidate deletion unit 162 (S102) and supplies the merging motion information candidate list to the second merging motion information candidate supplying unit 164. If the target prediction block is not a prediction block 0 (N in S106), the temporal merging motion information candidate generation unit 161 adds a temporal merging motion information candidate of a candidate block 0 to the merging motion information candidate list (S108) and supplies the merging motion information candidate list to the second merging motion information candidate supplying unit 164.

The second merging motion information candidate supplying unit 164 then keeps generating second supplementary merging motion information candidates until the number of merging motion information candidates added to the merging motion information candidate list supplied by the temporal merging motion information candidate generation unit 161 reaches the maximum number of merge candidates so as to add the second supplementary merging motion information candidates to the merging motion information candidate list (S105) and supplies the merging motion information candidate list to the terminal 19.

As described above, by setting a spatial candidate block group of a prediction block having a prediction block size type other than 2N.times.2N to be the one in which a positional relationship that is the same as that of a prediction block of a coding block that has a prediction block size type of 2N.times.2N is applied and setting a temporal candidate block group to be a temporal candidate block group of a prediction block 0, the temporal candidate block group can be determined upon the determination of the prediction block size type. In other words, a temporal merging motion information candidate derived in the prediction block 0 can be also shared in any of the prediction blocks of the coding block. On the other hand, the spatial candidate block group is determined for each prediction block based on the position and size of the prediction block. Since motion information of a candidate block is directly used for the derivation of a spatial merging motion information candidate, an arithmetic operation is unnecessary, and the processing time is thus short. However, since a process of calculating a vector such as those in Expression 1 or Expression 2 through Expression 4 is necessary for the derivation of a temporal merging motion information candidate and since there is a process of determining an inter prediction type, the processing time becomes longer.

Thus, by setting the derivation of a temporal merging motion information candidate that requires the longest processing time in a process of constructing the merging motion information candidate list to be performed once in a coding block, the processing time required when a prediction block is partitioned into a plurality of blocks can be shortened.

Further, by using a block neighboring the target prediction block as a spatial merging motion information candidate, the selection probability of a prediction block having a prediction block size type other than 2N.times.2N can be increased, and the coding efficiency can be more improved compared to the example where a candidate block of a prediction block in a coding block is shared without depending on a prediction block size type. Also, since representative blocks in a predetermined area of a ColPic are used as the temporal candidate block group, the accuracy of the temporal candidate block group becomes relatively low compared to the spatial candidate block group, and a decrease in the prediction efficiency can be prevented even when the accuracy of the temporal candidate block group is lowered.

In this case, the time used for deriving a temporal merging motion information candidate is sufficiently longer than the derivation of a spatial merging motion information candidate, the operation of the redundant merging motion information candidate deletion unit 162, and the operation of the first merging motion information candidate supplying unit 163, and the operation of the merging motion information candidate list construction unit 140 is set as shown in FIG. 30. Alternatively, for example, S106, S102, and S108 may be moved in a stage following S101 or S103 giving priority to the prediction efficiency or may be provided in a stage following S105 giving priority to the processing efficiency. In the case of providing S106, S102, and S108 in a stage following S105, the number of merging motion information candidates added to the merging motion information candidate list output from the second merging motion information candidate supplying unit 164 is set to be a number that is smaller than the maximum number of merge candidates by one.

In this case, focusing on the prediction efficiency, a positional relationship that is the same as that of a prediction block of a coding block that has a prediction block size type of 2N.times.2N is applied in the spatial candidate block group. However, in order to achieve parallel processing of a prediction block in the coding block, a candidate block included in another prediction block in the same coding block may be set such that the candidate block is not used as a candidate block. Alternatively, as the temporal candidate block group, a temporal candidate block group derived as a prediction block 0 may be used by combining the spatial candidate block group with those of other embodiments.

Also, in this case, a temporal candidate block group of a prediction block having a prediction block size type other than 2N.times.2N is set to be a temporal candidate block group derived in a prediction block 0, which is the first prediction block in the coding block. However, the temporal candidate block group is not limited to this. For example, the temporal candidate block group may be a temporal candidate block group of a prediction block obtained when the prediction block size type is 2N.times.2N or may be a temporal candidate block group of the last prediction block (a prediction block 1 in the case of halving partitioning and a prediction block 3 in the case of quartering partitioning) in the coding block. If the temporal candidate block group is set to be a temporal candidate block group of a prediction block obtained when the prediction block size type is 2N.times.2N, the temporal candidate block group can be generated before the prediction block size type and the position of a prediction block are determined. Therefore, a circuit design and a software design can become flexible, and a circuit size and a software size can be reduced.

Fifth Embodiment

An explanation is given in the following regarding a fifth embodiment. From the first embodiment, the configuration and operation of the merging motion information candidate list construction unit 140 are different, and the operation of the bitstream generation unit 104 and the operation of the bitstream analysis unit 201 are also different.

Figure 31:
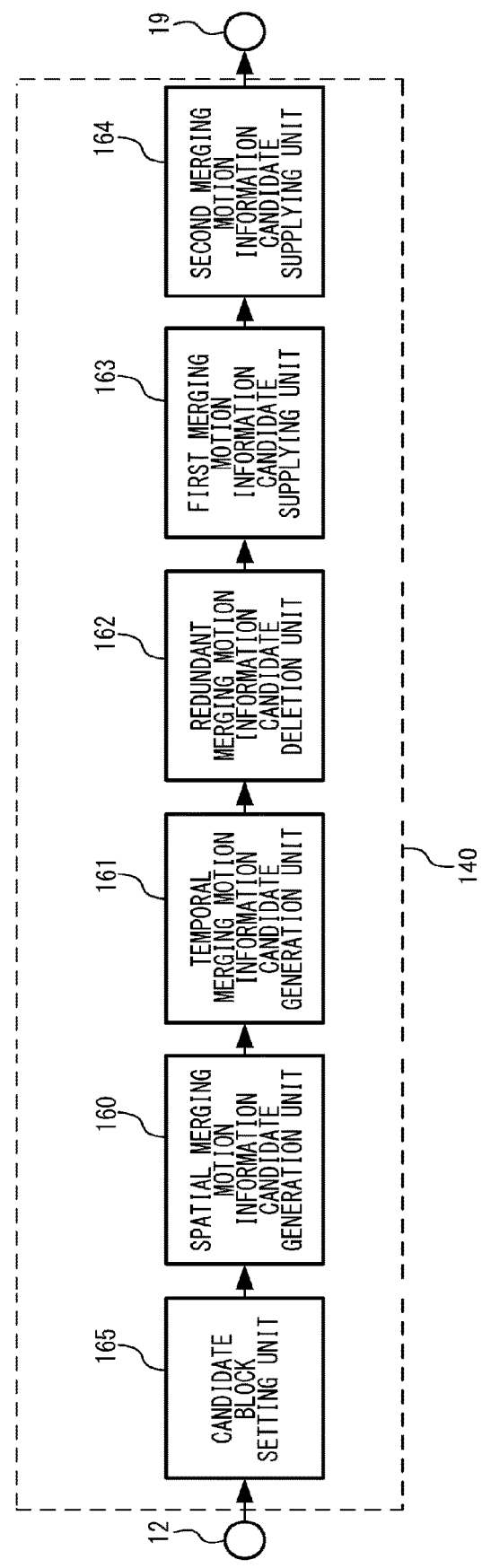
FIG. 31 is a diagram explaining the configuration of a merging motion information candidate list construction unit according to a fifth embodiment.

First, an explanation is given of the configuration of the merging motion information candidate list construction unit 140. FIG. 31 is a diagram explaining the configuration of the merging motion information candidate list construction unit 140 according to the fifth embodiment. From the merging motion information candidate list construction unit 140 according to the first embodiment shown in FIG. 10, the addition of a candidate block setting unit 165 in a stage preceding a spatial merging motion information candidate generation unit 160 is different. In this case, whether candidate block placement giving priority to the prediction efficiency is used or candidate block placement giving priority to the processing efficiency such as parallel processing or reduction in processing time is used is switched by a flag or the like.

Figure 32:
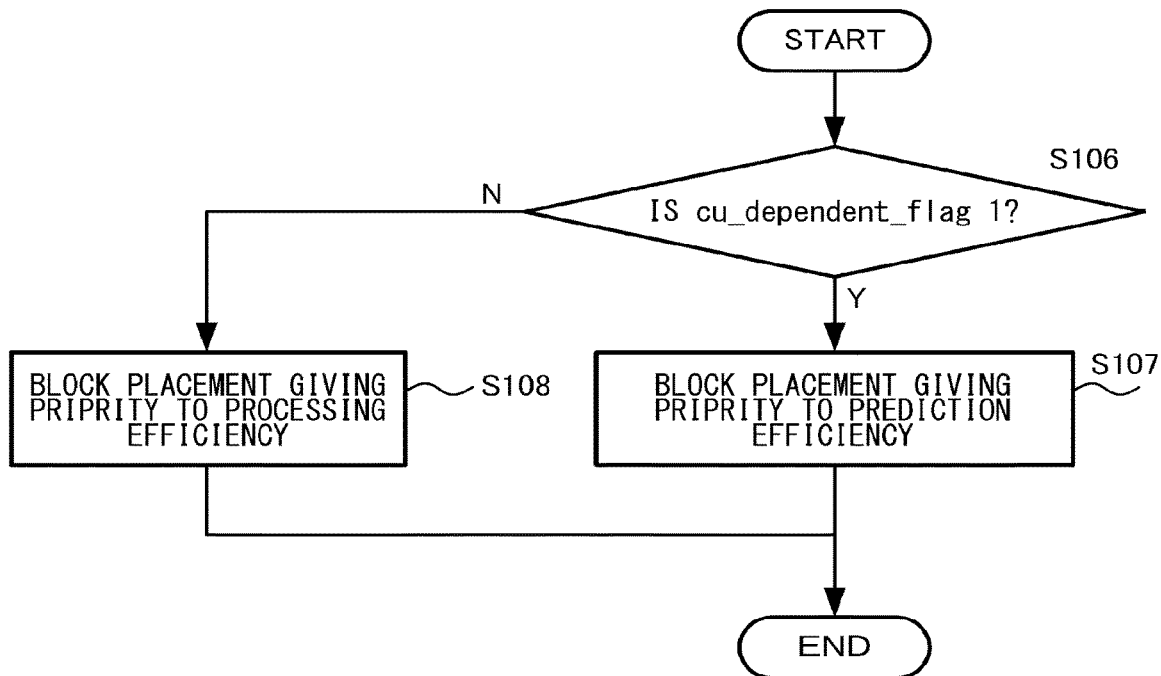
FIG. 32 is a flowchart explaining the operation of the merging motion information candidate list construction unit according to the fifth embodiment.

An explanation is now given of the operation of the merging motion information candidate list construction unit 140. FIG. 32 is a flowchart explaining the operation of the merging motion information candidate list construction unit 140 according to the fifth embodiment. Addition of step S106 through step S108 in a stage preceding step S100 is different from the operation of the merging motion information candidate list construction unit 140 according to the first embodiment. An explanation is given regarding the step S106 through the step S108. First, the merging motion information candidate list construction unit 140 determines whether cu_dependent_flag is 1 (S106). If cu_dependent_flag is 1 (Y in S106), the merging motion information candidate list construction unit 140 employs the block placement giving priority to the prediction efficiency (S107). The block placement giving priority to the prediction efficiency is, for example, block placement consisting of only candidate blocks neighboring a target prediction block such as the one shown in FIG. 12 where a positional relationship that is the same as that of a prediction block having a prediction block size type of 2N.times.2N is applied in a candidate block group of a prediction block having a prediction block size type other than 2N.times.2N. If cu_dependent_flag is 0 (N in S106), the merging motion information candidate list construction unit 140 employs the block placement giving priority to the processing efficiency (S108). The block placement giving priority to the processing efficiency is, for example, block placement including candidate blocks that do not neighbor the target prediction block such as those shown in FIGS. 14A-14H, FIGS. 23A-23H, FIGS. 24A-24H, FIGS. 25A-25H, and FIGS. 28A-28H. Following the step S107 and the step S108, processes in and after step S100 are performed. In this case, in the present embodiment, for example, based on the block placement giving priority to the prediction efficiency such as the one shown in FIG. 12, the determination of a candidate block group and the construction of a merging motion information candidate list are performed for each prediction block of a coding block based on the position and size thereof. Alternatively, for example, based on the block placement giving priority to the processing efficiency such as the one shown in FIGS. 25A-25H, whether or not to construct a merging motion information candidate list from a candidate block shared in all prediction blocks of a coding block is switched.

In the moving picture coding device 100, whether enable_cu_parallel_flag is 0 or 1 is set at a level higher than the moving picture coding device 100. In this case, the operation shown in FIG. 32 is performed by the merging motion information candidate list construction unit 140. However, the operation may be set at a level higher than the moving picture coding device 100.

The bitstream generation unit 104 multiplexes cu_dependent_flag at a position other than that of a coding block such as the position of a SPS, a PPS, a slice header, or the like. The bitstream analysis unit 201 decodes cu_dependent_flag multiplexed at a position other than that of a coding block such as the position of a SPS, a PPS, a slice header, or the like and supplies the decoded cu_dependent_flag to the motion information reproduction unit 204.

By multiplexing cu_dependent_flag in a bitstream, whether the bitstream is a bitstream giving priority to the prediction efficiency can be easily determined. Also, a bitstream by block placement giving priority to the prediction efficiency and a bitstream by block placement giving priority to the processing efficiency can be decoded in a common decoding device. For a decoding device that decodes only cu_dependent_flag of 0 or 1, a bitstream can be correctly decoded by, for example, generating a bitstream while fixing cu_dependent_flag to be either 0 or 1 by application regulations, a profile that classifies coding tools such as MPEG-4AVC, or the like and ignoring cu_dependent_flag or setting cu_dependent_flag implicitly. Also, by multiplexing cu_dependent_flag to a header higher than the coding block, the operation shown in FIG. 32 can be reduced.

In this case, the block placement giving priority to the prediction efficiency and the block placement giving priority to the processing efficiency are switched by cu_dependent_flag. However, for example, the following can be also possible. The block placement giving priority to the processing efficiency is used when the number of partition occurrences is larger than or equal to a predetermined number of times. The block placement giving priority to the prediction efficiency is used when the coding block is not larger than or equal to a predetermined threshold size. The block placement giving priority to the processing efficiency is used when the coding block is smaller than or equal to the predetermined threshold size. The block placement giving priority to the prediction efficiency is used when the coding block is not smaller than or equal to the predetermined threshold size. Also, setting the predetermined threshold size to be 8.times.8, which is the minimum coding block size, allows for the application only when throughput is increased the most, and the throughput and the prediction efficiency can thus be balanced in an optimal way. In this case, whether the coding block is the predetermined threshold size is determined in the step S108. By using the block placement giving priority to the processing efficiency when the number of partition occurrences of the coding block is larger than or equal to the predetermined number of times (or smaller than or equal to the predetermined threshold size) in the coding block and by using the block placement giving priority to the prediction efficiency when the number of partition occurrences of the coding block is not larger than or equal to the predetermined number of times (or smaller than or equal to the predetermined threshold size) in the coding block, the prediction efficiency and the throughput can be easily adjusted. The predetermined threshold size and the predetermined number of times can be also multiplexed at a position other than that of the coding block such as the position of a SPS, a PPS, a slice header, or the like. By using enable_cu_parallel_flag meaning that the predetermined threshold size or the predetermined number of times is defined when enable_cu_parallel_flag is 1 and the predetermined threshold size or the predetermined number of times is not defined when enable_cu_parallel_flag is 0 so as to perform multiplexing in a bitstream, the throughput and the prediction efficiency can be adjusted more flexibly. In other words, the block placement giving priority to the prediction efficiency is always used regardless of the predetermined threshold size or the predetermined number of times by setting enable_cu_parallel_flag to be 0, and the throughput and the prediction efficiency can be balanced by switching the prediction efficiency and the processing efficiency according to the predetermined threshold size or the predetermined number of times by setting enable_cu_parallel_flag to be 1.

Sixth Embodiment

An explanation is given in the following regarding a sixth embodiment. A detailed explanation is given regarding the configuration of the vector predictor mode determination unit 120 and the operation of the motion vector reproduction unit 211 of the moving picture coding device 100 according to the third embodiment. An explanation is given in the following regarding the detailed configuration of the vector predictor mode determination unit 120.

(Configuration of Vector Predictor Mode Determination Unit 120)

Figure 33:
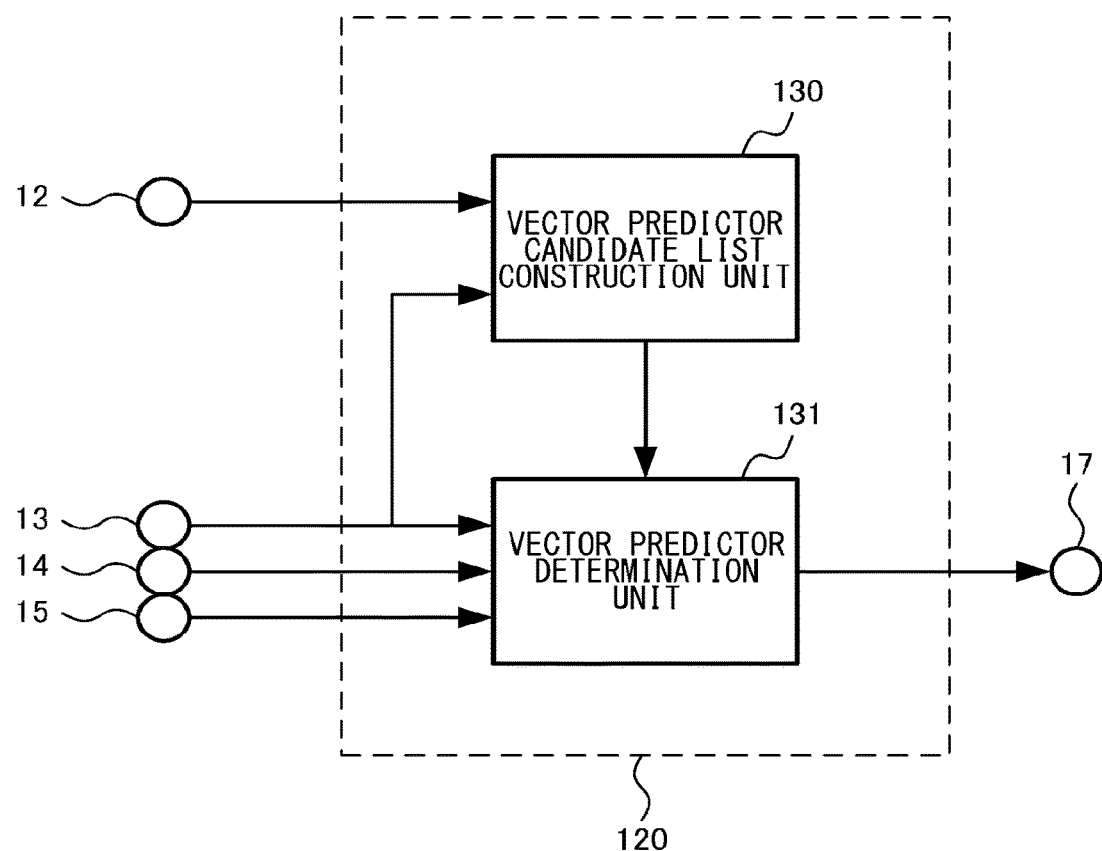
FIG. 33 shows the configuration of a vector predictor mode determination unit.

Subsequently, an explanation is given regarding the detailed configuration of the vector predictor mode determination unit 120. FIG. 33 shows the configuration of the vector predictor mode determination unit 120. The vector predictor mode determination unit 120 includes a vector predictor candidate list construction unit 130 and a vector predictor determination unit 131. A terminal 17 is connected to the prediction coding mode determination unit 122.

The vector predictor candidate list construction unit 130 is also provided in the same way in the motion vector reproduction unit 211 inside the moving picture decoding device 200 that decodes a bitstream generated by a moving picture coding device 100 according to the sixth embodiment, and an identical vector predictor candidate list is constructed each in the moving picture coding device 100 and the moving picture decoding device 200.

(Operation of Vector Predictor Mode Determination Unit 120)

An explanation is given in the following regarding the operation of the vector predictor mode determination unit 120.

First, the following processes are performed for the L0 prediction. In the following, x represents 0. The vector predictor candidate list construction unit 130 derives a reference index of LX prediction supplied by the terminal 13. The vector predictor candidate list construction unit 130 constructs a vector predictor candidate list of the LX prediction including vector predictor candidates of the maximum number of vector predictor candidates from the candidate block group supplied by the terminal 12 and the reference index of the LX prediction. The vector predictor candidate list construction unit 130 supplies the vector predictor candidate list of the LX prediction to the vector predictor determination unit 131.

The vector predictor determination unit 131 selects one vector predictor candidate from the vector predictor candidate list of the LX prediction supplied by the vector predictor candidate list construction unit 130 and determines a vector predictor index of the LX prediction.

The vector predictor determination unit 131 calculates a vector difference of the LX prediction by subtracting the vector predictor of the LX prediction from the motion vector of the LX prediction supplied by the terminal 13 and outputs the vector difference of the LX prediction and the vector predictor index of the LX prediction.

The vector predictor determination unit 131 calculates a prediction error amount from the picture signal supplied by the terminal 15 and from a prediction signal of the LX prediction obtained by performing motion compensation prediction on the reference picture supplied by the terminal 14 based on the motion vector of the LX prediction and the reference index of the LX prediction supplied by the terminal 13, and calculates a rate distortion evaluation value of Pred_LX from the prediction error amount and from the coding amount of the vector difference of the LX prediction, the reference index of the LX prediction, and the vector predictor index of the LX prediction.

Then, a process that is the same as that for the L0 prediction is performed for the L1 prediction while setting X to be 1.

Subsequently, the vector predictor determination unit 131 calculates a prediction error amount from the picture signal supplied by the terminal 15 and from a prediction signal of the BI prediction obtained by averaging the prediction signal of the L0 prediction and the prediction signal of the L1 prediction, and calculates a rate distortion evaluation value of Pred_BI from the prediction error amount and from the coding amount of the respective vector differences of the L0 prediction and the L1 prediction, the respective reference indices of the L0 prediction and the L1 prediction, and the vector predictor indices of the L0 prediction and the L1 prediction.

The vector predictor determination unit 131 compares the rate distortion evaluation value of Pred_L0, the rate distortion evaluation value of Pred_L1, and the rate distortion evaluation value of Pred_BI and selects one prediction coding mode with the smallest rate distortion evaluation value. The vector predictor determination unit 131 then supplies motion information, the vector differences, the vector predictor indices, and the rate distortion evaluation value based on the prediction coding mode to the prediction coding mode determination unit 122. If the prediction coding mode is Pred_L0, the motion vector of the L1 prediction becomes (0,0), and the reference index of the L1 prediction becomes "−1". If the prediction coding mode is Pred_L1, the motion vector of the L0 prediction becomes (0,0), and the reference index of the L0 prediction becomes "4".

(Configuration of Vector Predictor Candidate List Construction Unit 130)

Figure 34:
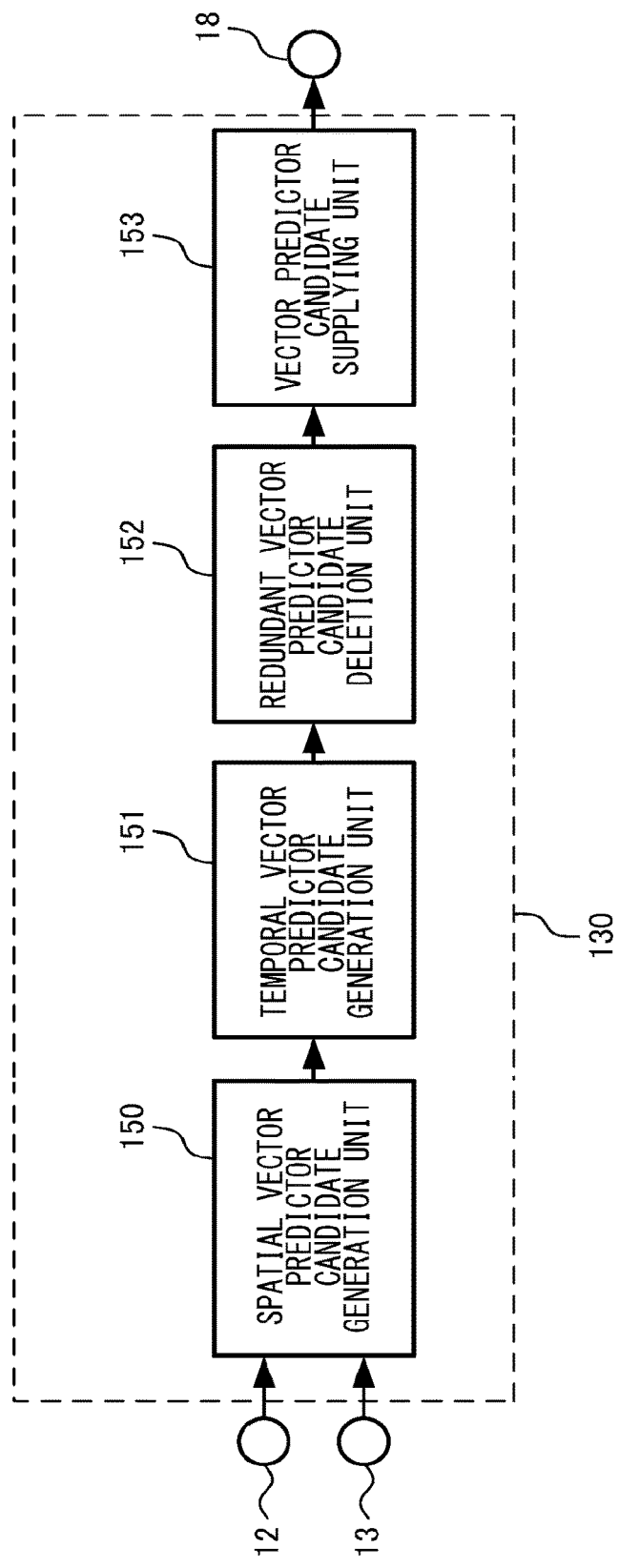
FIG. 34 is a diagram explaining the configuration of a vector predictor candidate list construction unit.

An explanation is then given of the detailed configuration of the vector predictor candidate list construction unit 130. FIG. 34 is a diagram for explaining the configuration of the vector predictor candidate list construction unit 130. A terminal 18 is connected to the vector predictor determination unit 131. The vector predictor candidate list construction unit 130 includes a spatial vector predictor candidate generation unit 150, a temporal vector predictor candidate generation unit 151, a redundant vector predictor candidate deletion unit 152, and a vector predictor candidate supplying unit 153.

(Operation of Vector Predictor Candidate List Construction Unit 130)

Figure 35:
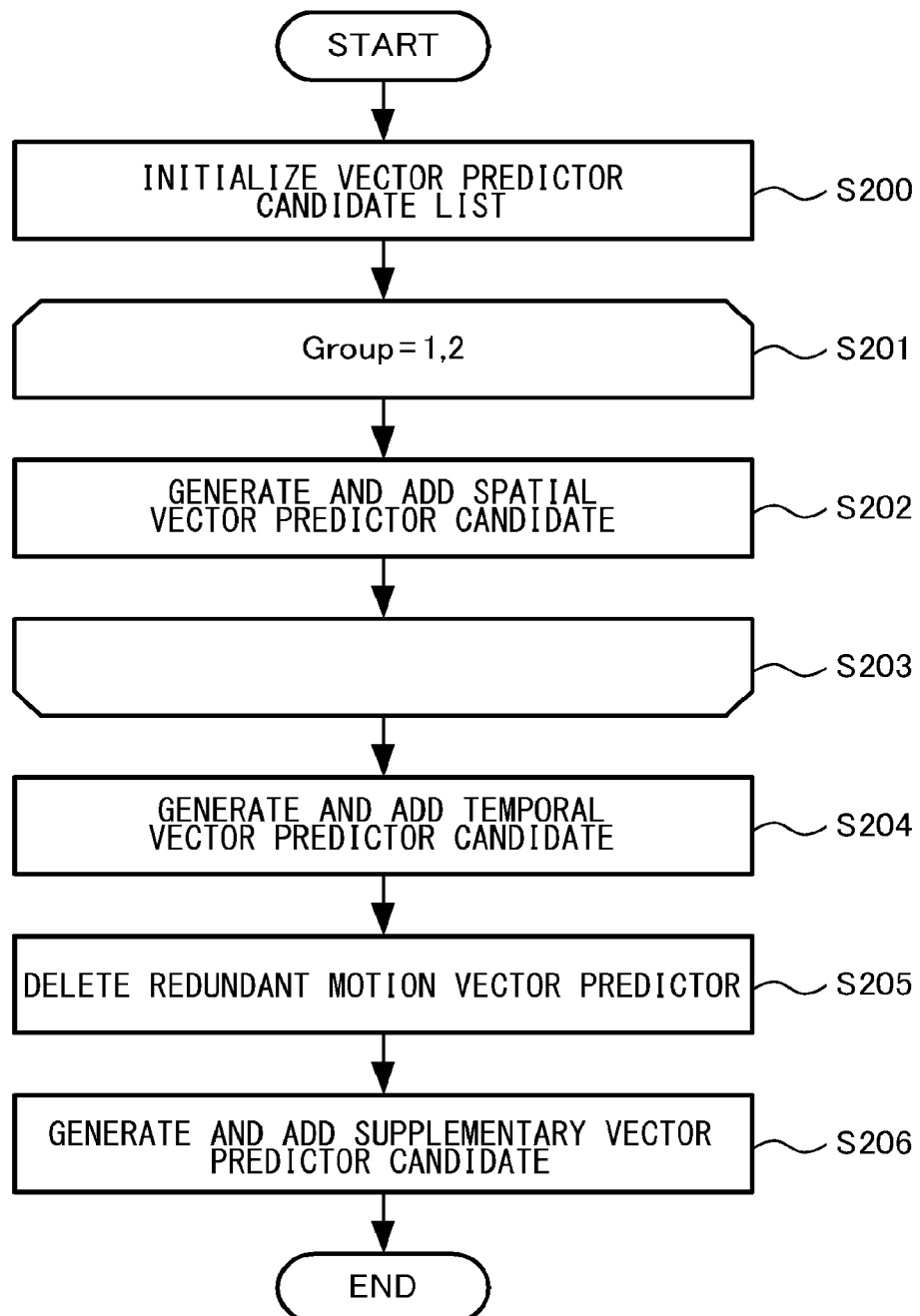
FIG. 35 is a flowchart explaining the operation of the vector predictor candidate list construction unit.

An explanation is given in the following regarding the function and operation of each component. The vector predictor candidate list construction unit 130 constructs a vector predictor candidate list of the L0 prediction and a vector predictor candidate list of the L1 prediction, as necessary. An explanation is given in the following using LX prediction. X is 0 or 1. FIG. 35 is a flowchart for explaining the operation of the vector predictor candidate list construction unit 130.

First, the vector predictor candidate list construction unit 130 initializes a vector predictor candidate list of the LX prediction (S200). There is no vector predictor candidate in the initialized vector predictor candidate list of the LX prediction.

The vector predictor candidate list construction unit 130 separates candidate blocks included in the spatial candidate block group supplied by the terminal 12 into two groups: a block E and a block A forming a first group; and a block C, a block B, and a block D forming a second group, and repeats the following processes in order of the first group and the second group (S201 through S203).

In this case, regarding the candidate block group supplied by the terminal 12, the same candidate block group as in the merge mode is used for a candidate block group of 2N.times.2N, and a candidate block group in which a positional relationship that is the same as that of 2N.times.2N is applied is used for a candidate block group of other than 2N.times.2N. As explanation is given on the assumption that the reference index of the LX prediction supplied by the terminal 13, the candidate block group supplied by the terminal 12, and the vector predictor candidate list of the LX prediction are shared inside the vector predictor candidate list construction unit 130.

The spatial vector predictor candidate generation unit 150 generates zero or one spatial vector predictor candidate of the LX prediction from the candidate block group of an i-th group (i is 1 or 2), adds the spatial vector predictor candidate of the LX prediction to the vector predictor candidate list of the LX prediction (S202), and supplies the vector predictor candidate list of the LX prediction and the candidate block group to the temporal vector predictor candidate generation unit 151.

An explanation is now given regarding a specific method of deriving the spatial vector predictor candidate. The following processes are repeated for the first group and the second group. The spatial vector predictor candidate generation unit 150 checks the block E and the block A in order as candidate blocks in the first group and checks the block C, the block B, and the block D in order as candidate blocks in the second group.

The following processes are performed for each candidate block in order of the L0 prediction and the L1 prediction. Hereinafter, an explanation is given regarding the L0 prediction and the L1 prediction as LN prediction.

The spatial vector predictor candidate generation unit 150 checks whether a reference picture indicated by a reference index of LN prediction of the candidate block is the same as a reference picture indicated by the reference index of the LX prediction supplied by the terminal 13.

If the reference picture indicated by the reference index of the LN prediction of the candidate block is the same as the reference picture indicated by the reference index of the LX prediction supplied by the terminal 13, the spatial vector predictor candidate generation unit 150 ends the process regarding a motion vector of the LN prediction of the candidate block as the spatial vector predictor candidate.

If the reference picture indicated by the reference index of the LN prediction of the candidate block is not the same as the reference picture indicated by the reference index of the LX prediction supplied by the terminal 13, the spatial vector predictor candidate generation unit 150 checks subsequent LN prediction or a subsequent candidate block.

The spatial vector predictor candidate generation unit 150 ends the process when checking is completed for all candidate blocks.

As described above, zero or one spatial vector predictor candidate is derived from each of the groups, and zero to two spatial vector predictor candidates are derived for the LX prediction.

Subsequently, the temporal vector predictor candidate generation unit 151 generates zero or one temporal vector predictor candidate of the LX prediction from the temporal candidate block group, adds the temporal vector predictor candidate of the LX prediction to the vector predictor candidate list of the LX prediction (S204), and supplies the vector predictor candidate list of the LX prediction and the candidate block group to the vector predictor candidate supplying unit 153.

An explanation is now given regarding a specific method of deriving the temporal vector predictor candidate. The temporal vector predictor candidate generation unit 151 checks in order of the block H and the block I regarding the temporal candidate block group as candidate blocks. The following processes are performed for each candidate block in order of the L0 prediction and the L1 prediction. Hereinafter, an explanation is given regarding the L0 prediction and the L1 prediction as LN prediction. The temporal vector predictor candidate generation unit 151 checks whether LN prediction of the candidate block is valid. LN prediction of the candidate block being valid means that the reference index thereof is larger than or equal to 0. If the LN prediction of the candidate block is valid, the temporal vector predictor candidate generation unit 151 derives the temporal vector predictor candidate using a motion vector of the LN prediction of the candidate block as a reference motion vector and ends the process. A description of the method of deriving the temporal vector predictor candidate will be described later. If the LN prediction of the candidate block is not valid, the temporal vector predictor candidate generation unit 151 checks a subsequent candidate block. The spatial vector predictor candidate generation unit 150 ends the process when checking is completed for all candidate blocks.

An explanation is now given regarding a method of deriving the temporal vector predictor candidate. Using an inter-picture distance between a ColPic having a temporal candidate block and a ColRefLXPic, which is a picture referred to by the temporal candidate block in motion compensation prediction of the LN prediction, an inter-picture distance between a reference image RefLXPic indicated by the reference index of the LX prediction and a target picture CurPic, and the reference motion vector of the LX prediction as td, tb, and mvLX, respectively, a temporal vector predictor candidate mvLXCol is calculated by Expression 1.

The redundant vector predictor candidate deletion unit 152 checks vector predictor candidates added to the vector predictor candidate list of the LX prediction supplied by the temporal vector predictor candidate generation unit 151, leaves, when there are a plurality of vector predictor candidates having an identical vector, one vector predictor candidate and deletes the rest of the vector predictor candidates, deletes, when the number of the vector predictor candidates added to the vector predictor candidate list of the LX prediction exceeds the maximum number of vector predictor candidates, vector predictor candidates in the last part of the vector predictor candidate list of the LX prediction such that the number of the vector predictor candidates added to the vector predictor candidate list of the LX prediction becomes smaller than or equal to the maximum number of vector predictor candidates (S205), supplies the vector predictor candidate list of the LX prediction to the vector predictor candidate supplying unit 153. Merging motion information candidates added to the vector predictor candidate list of the LX prediction are all different merging motion information candidates at this time.

The vector predictor candidate supplying unit 153 generates vector predictor supplying candidates, adds the vector predictor supplying candidates such that the number of the vector predictor candidates added to the vector predictor candidate list of the LX prediction supplied by the redundant vector predictor candidate deletion unit 152 becomes the maximum number of vector predictor candidates (S206), and supplies the vector predictor supplying candidates to the terminal 18. It is assumed that the vector predictor supplying candidates have a motion vector (0,0). In this case, the vector predictor supplying candidates are set to have a motion vector (0,0). However, the vector predictor supplying candidates may have a predetermined value such as (1,1) or have a motion vector where a horizontal component or a vertical component of a spatial vector predictor candidate is set to be +1 or −1.

In this case, the candidate blocks included in the spatial candidate block group supplied by the terminal 12 are separated into two groups so that one spatial motion vector predictor candidate can be selected each from each of the groups. However, the candidate blocks may be put in one group, and two spatial motion vector predictor candidates may be selected.

An explanation is given in the following regarding the detailed configuration of the motion vector reproduction unit 211.

(Detailed Configuration of Motion Vector Reproduction Unit 211)

Figure 36:
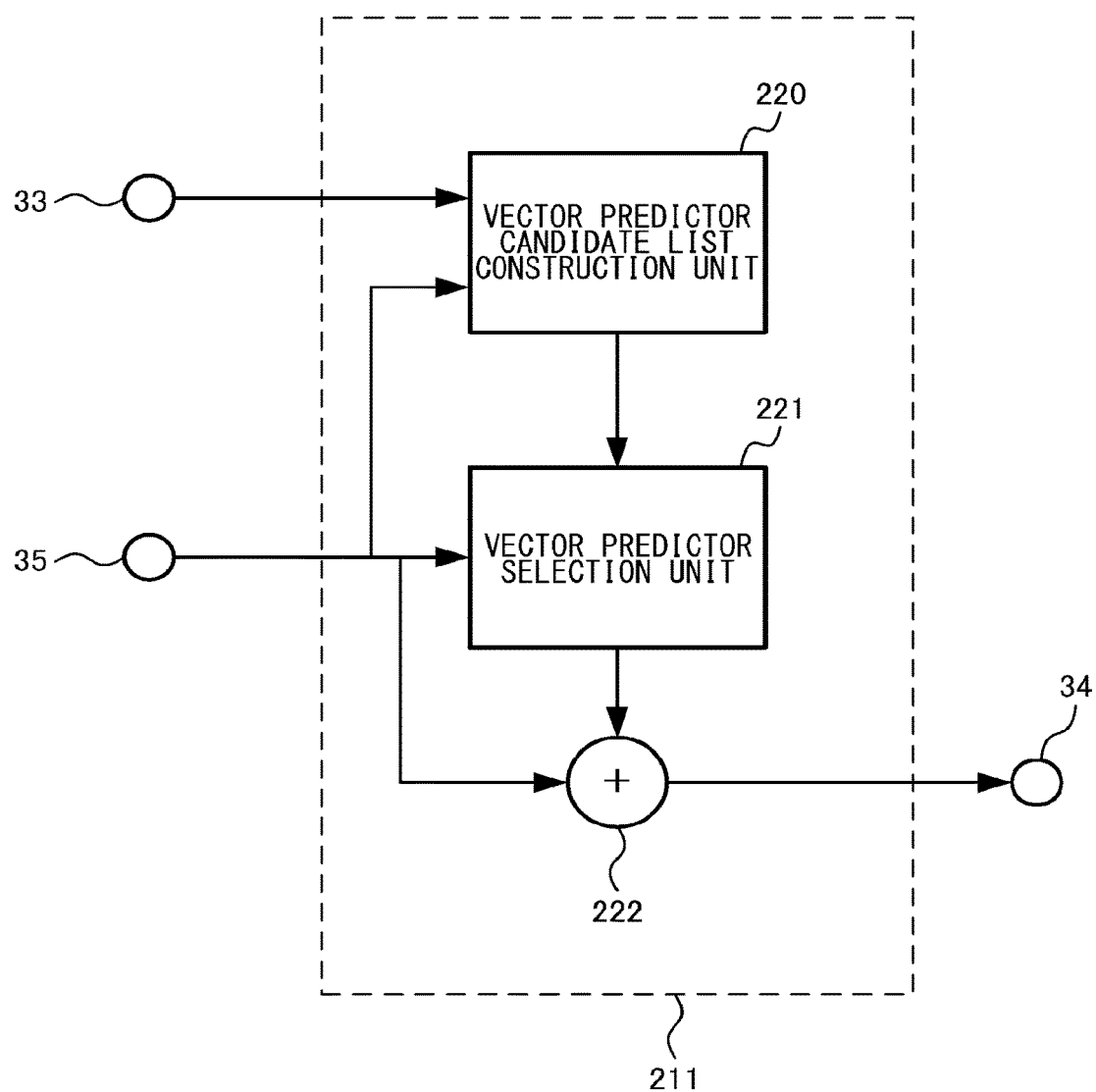
FIG. 36 is a diagram explaining the configuration of a motion vector reproduction unit.

Subsequently, an explanation is given regarding the detailed configuration of the motion vector reproduction unit 211. FIG. 36 is a diagram explaining the configuration of the motion vector reproduction unit 211. The motion vector reproduction unit 211 includes a vector predictor candidate list construction unit 220, a vector predictor selection unit 221, and an addition unit 222. A terminal 35 is connected to the coding mode decision unit 210.

(Detailed Operation of Motion Vector Reproduction Unit 211)

An explanation is given in the following regarding the function and operation of each component. The motion vector reproduction unit 211 calculates a motion vector for L0 prediction if the inter prediction type supplied by the terminal 35 is L0 prediction, calculates a motion vector for L1 prediction if the inter prediction type is L1 prediction, and calculates a motion vector for L0 prediction and for L1 prediction if the inter prediction type is BI prediction. The calculation of a motion vector for each LX prediction is as shown in the following.

The motion vector reproduction unit 211 constructs a vector predictor candidate list of LX prediction from a reference index of the LX prediction supplied by the terminal 35 and a candidate block group supplied by the terminal 33. The motion vector reproduction unit 211 selects a vector predictor candidate indicated by a vector predictor index of the LX prediction from the vector predictor list of the LX prediction as a vector predictor of the LX prediction and adds the vector predictor of the LX prediction and a vector difference of the LX prediction so as to calculate a motion vector of the LX prediction.

Motion information is generated by combining the motion vector of the LX prediction and an inter prediction type, and the motion information is supplied to the terminal 34 and the terminal 36.

As described above, in a merge mode where the maximum number of merge candidates is 5 and where the number of the candidates is relatively high, a merging motion information candidate list is communalized in a coding block by using a candidate block of a prediction block 0 as a candidate block of all prediction blocks in the coding block for a candidate block group of other than 2N.times.2N so as to allow for the parallelization of processes required for candidate selection. In a vector predictor mode where the maximum number of vector predictor candidates is 2 and where the number of the candidates is relatively low, preferred processing efficiency and prediction efficiency can be achieved by optimizing the prediction efficiency by using a candidate block, in which a positional relationship of that of 2N.times.2N is applied, for a candidate block group of other than 2N.times.2N.

The bit stream of moving pictures output from the moving picture coding device according to any of the embodiments described above has a specific data format so that it can be decoded in accordance with the coding method used in the embodiments. The moving picture decoding device compatible with the moving picture coding device is capable of decoding the bitstream of the specific data format.

If a wired or wireless network is used to exchange bitstreams between the moving picture coding device and the moving picture decoding device, the bitstream may be converted into a data format suited to the mode of transmission over a communication channel and be transmitted accordingly. In this case, there is provided a moving picture transmitting device for converting the bitstreams output from the moving picture coding device into coding data of a data format suited to the mode of transmission over the communication channel and for transmitting the bitstreams over the network, and a moving picture receiving device for receiving the coding data over the network to recover the bitstreams and supplying the recovered bitstreams to the moving picture decoding device.

The moving picture transmitting device includes a memory for buffering bitstreams output from the moving picture coding device, a packet processing unit for packetizing the bitstreams, and a transmitting unit for transmitting the packetized coding data over the network. The moving picture receiving device includes a receiving unit for receiving the packetized coding data over the network, a memory for buffering the received coding data, and a packet processing unit for subjecting the coding data to a depacketizing process so as to generate bitstreams and providing the generated bitstreams to the moving picture decoding device.

The above-described processes related to coding and decoding can of course be implemented by hardware-based apparatus for transmission, storage, or reception. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be made available from a server via a wired or wireless network. Still alternatively, the programs may be made available in the form of data transmission over terrestrial or satellite digital broadcast systems.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

[Item 1] A moving picture coding device adapted to code a coding block consisting of greater than or equal to one prediction block, comprising: a temporal merging motion information candidate generation unit configured to derive, when information indicating whether or not to derive a temporal merging motion information candidate shared for all prediction blocks in the coding block is information indicating the derivation of a temporal merging motion information candidate shared for all the prediction blocks in the coding block, a temporal merging motion information candidate shared for all the prediction blocks in the coding block from a prediction block of a coded picture different from a picture having a prediction block subject to coding; a merging motion information candidate generation unit configured to generate a plurality of merging motion information candidates including the temporal merging motion information candidate; a merging motion information selection unit configured to select one merging motion information candidate from the plurality of merging motion information candidates and to use the selected merging motion information candidate as motion information of the prediction block subject to coding; and a coding unit configured to code an index for specifying the selected merging motion information candidate as a candidate specifying index.

[Item 2] The moving picture coding device according to Item 1, wherein the temporal merging motion information candidate generation unit derives, when the information indicating whether or not to derive a temporal merging motion information candidate shared for all the prediction blocks in the coding block is not information indicating the derivation of a temporal merging motion information candidate shared for all the prediction blocks in the coding block, the temporal merging motion information candidate based on the size and position of the prediction block subject to coding.

[Item 3] The moving picture coding device according to Item 1 or 2, wherein the information indicating whether or not to derive a temporal merging motion information candidate shared for all the prediction blocks in the coding block indicates the derivation of a temporal merging motion information candidate shared for all the prediction blocks in the coding block when the size of the coding block is smaller than or equal to a predetermined size.

[Item 4] The moving picture coding device according to Item 1 or 2, wherein the information indicating whether or not to derive a temporal merging motion information candidate shared for all the prediction blocks in the coding block indicates the derivation of a temporal merging motion information candidate shared for all the prediction blocks in the coding block when the size of the coding block is the predetermined size.

[Item 5] The moving picture coding device according to any one of Items 1 through 4, wherein the coding unit codes information indicating whether or not to validate the information indicating whether or not to derive a temporal merging motion information candidate shared for all the prediction blocks in the coding block.

[Item 6] The moving picture coding device according to any one of Items 1 through 5, wherein the temporal merging motion information candidate shared for all the prediction blocks subject to coding in the coding block is a temporal merging motion information candidate derived in a prediction block derived first in the coding block.

[Item 7] The moving picture coding device according to any one of Items 1 through 6, wherein the temporal merging motion information candidate generation unit derives the temporal merging motion information candidate using the coding block as the prediction block subject to coding.

[Item 8] A moving picture coding device adapted to partition a coding block into a plurality of prediction blocks and perform motion compensation, comprising: a temporal merging motion information candidate generation unit configured to generate a temporal merging motion information candidate shared in any one of prediction blocks in the coding block from a block of a coded picture different from a picture having a prediction block subject to coding; a merging motion information candidate generation unit configured to generate a plurality of merging motion information candidates including the temporal merging motion information candidate; a merging motion information selection unit configured to select one merging motion information candidate from the plurality of merging motion information candidates and to set the selected merging motion information candidate to be motion information of the prediction block subject to coding; and a coding unit configured to code an index for specifying the selected merging motion information candidate as a candidate specifying index.

[Item 9] A moving picture coding method for coding a coding block consisting of greater than or equal to one prediction block, comprising: deriving, when information indicating whether or not to derive a temporal merging motion information candidate shared for all prediction blocks in the coding block is information indicating the derivation of a temporal merging motion information candidate shared for all the prediction blocks in the coding block, a temporal merging motion information candidate shared for all the prediction blocks in the coding block from a prediction block of a coded picture different from a picture having a prediction block subject to coding; generating a plurality of merging motion information candidates including the temporal merging motion information candidate; selecting one merging motion information candidate from the plurality of merging motion information candidates and using the selected merging motion information candidate as motion information of the prediction block subject to coding; and coding an index for specifying the selected merging motion information candidate as a candidate specifying index.

[Item 10] A moving picture coding program embedded on a non-transitory computer-readable recording medium and adapted to code a coding block consisting of greater than or equal to one prediction block, comprising: a temporal merging motion information candidate generation module configured to derive, when information indicating whether or not to derive a temporal merging motion information candidate shared for all prediction blocks in the coding block is information indicating the derivation of a temporal merging motion information candidate shared for all the prediction blocks in the coding block, a temporal merging motion information candidate shared for all the prediction blocks in the coding block from a prediction block of a coded picture different from a picture having a prediction block subject to coding; a merging motion information candidate generation module configured to generate a plurality of merging motion information candidates including the temporal merging motion information candidate; a merging motion information selection module configured to select one merging motion information candidate from the plurality of merging motion information candidates and to use the selected merging motion information candidate as motion information of the prediction block subject to coding; and a coding module configured to code an index for specifying the selected merging motion information candidate as a candidate specifying index.

[Item 11] A moving picture decoding device adapted to decode a decoding block consisting of greater than or equal to one prediction block, comprising: a decoding unit configured to decode, from a bit stream in which an index for specifying a merging motion information candidate used in a prediction block subject to decoding is coded as a candidate specifying index, the candidate specifying index; a temporal merging motion information candidate generation unit configured to derive, when information indicating whether or not to derive a temporal merging motion information candidate shared for all prediction blocks in the decoding block is information indicating the derivation of a temporal merging motion information candidate shared for all the prediction blocks in the decoding block, a temporal merging motion information candidate shared for all the prediction blocks in the decoding block from a prediction block of a decoded picture different from a picture having a prediction block subject to decoding; a merging motion information candidate generation unit configured to generate a plurality of merging motion information candidates including the temporal merging motion information candidate; and a merging motion information selection unit configured to select one merging motion information candidate from the plurality of merging motion information candidates based on the candidate specifying index and to use the selected merging motion information candidate as motion information of the prediction block subject to decoding.

[Item 12] The moving picture decoding device according to Item 11, wherein the temporal merging motion information candidate generation unit derives, when the information indicating whether or not to derive a temporal merging motion information candidate shared for all the prediction blocks in the decoding block is not information indicating the derivation of a temporal merging motion information candidate shared for all the prediction blocks in the decoding block, the temporal merging motion information candidate based on the size and position of the prediction block subject to decoding.

[Item 13] The moving picture decoding device according to Item 11 or 12, wherein the information indicating whether or not to derive a temporal merging motion information candidate shared for all the prediction blocks in the decoding block indicates the derivation of a temporal merging motion information candidate shared for all the prediction blocks in the decoding block when the size of the decoding block is smaller than or equal to a predetermined size.

[Item 14] The moving picture decoding device according to Item 11 or 12, wherein the information indicating whether or not to derive a temporal merging motion information candidate shared for all the prediction blocks in the decoding block indicates the derivation of a temporal merging motion information candidate shared for all the prediction blocks in the decoding block when the size of the decoding block is a predetermined size.

[Item 15] The moving picture decoding device according to any one of Items 11 through 14, wherein the decoding unit decodes, from the bitstream, information indicating whether or not to validate the information indicating whether or not to derive a temporal merging motion information candidate shared for all the prediction blocks in the decoding block.

[Item 16] The moving picture decoding device according to any one of Items 11 through 15, wherein the temporal merging motion information candidate shared for all the prediction blocks subject to decoding in the decoding block is a temporal merging motion information candidate derived in a prediction block derived first in the decoding block.

[Item 17] The moving picture decoding device according to any one of Items 11 through 16, wherein the temporal merging motion information candidate generation unit derives the temporal merging motion information candidate using the decoding block as the prediction block subject to decoding.

[Item 18] A moving picture decoding device adapted to partition a decoding block into a plurality of prediction blocks and perform motion compensation, comprising: a decoding unit configured to decode, from a bitstream in which an index for specifying a merging motion information candidate used in a prediction block subject to decoding is coded as a candidate specifying index, the candidate specifying index; a temporal merging motion information candidate generation unit configured to generate a temporal merging motion information candidate shared in any one of prediction blocks in the coding block from a block of a decoded picture different from a picture having a prediction block subject to decoding; a merging motion information candidate generation unit configured to generate a plurality of merging motion information candidates including the temporal merging motion information candidate; and a merging motion information selection unit configured to select one merging motion information candidate from the plurality of merging motion information candidates based on the candidate specifying index and to set the selected merging motion information candidate to be motion information of the prediction block subject to decoding.

[Item 19] A moving picture decoding method for decoding a decoding block consisting of greater than or equal to one prediction block, comprising: decoding, from a bitstream in which an index for specifying a merging motion information candidate used in a prediction block subject to decoding is coded as a candidate specifying index, the candidate specifying index; deriving, when information indicating whether or not to derive a temporal merging motion information candidate shared for all prediction blocks in the decoding block is information indicating the derivation of a temporal merging motion information candidate shared for all the prediction blocks in the decoding block, a temporal merging motion information candidate shared for all the prediction blocks in the decoding block from a prediction block of a decoded picture different from a picture having a prediction block subject to decoding; generating a plurality of merging motion information candidates including the temporal merging motion information candidate; and selecting one merging motion information candidate from the plurality of merging motion information candidates based on the candidate specifying index and using the selected merging motion information candidate as motion information of the prediction block subject to decoding.

[Item 20] A moving picture decoding program embedded on a non-transitory computer-readable recording medium and adapted to decode a decoding block consisting of greater than or equal to one prediction block, comprising: a decoding module configured to decode, from a bitstream in which an index for specifying a merging motion information candidate used in a prediction block subject to decoding is coded as a candidate specifying index, the candidate specifying index; a temporal merging motion information candidate generation module configured to derive, when information indicating whether or not to derive a temporal merging motion information candidate shared for all prediction blocks in the decoding block is information indicating the derivation of a temporal merging motion information candidate shared for all the prediction blocks in the decoding block, a temporal merging motion information candidate shared for all the prediction blocks in the decoding block from a prediction block of a decoded picture different from a picture having a prediction block subject to decoding; a merging motion information candidate generation module configured to generate a plurality of merging motion information candidates including the temporal merging motion information candidate; and a merging motion information selection module configured to select one merging motion information candidate from the plurality of merging motion information candidates based on the candidate specifying index and to use the selected merging motion information candidate as motion information of the prediction block subject to decoding.

What is claimed is:

1. A moving picture coding device adapted to code a coding block consisting of greater than or equal to one prediction block, comprising:
a temporal merging motion information candidate generation unit configured to derive, when a predetermined threshold size is defined and the coding block is smaller than or equal to the predetermined threshold size, a temporal merging motion information candidate shared for all the prediction blocks in the coding block from a prediction block of a coded picture different from a picture having a prediction block subject to coding and derive, when the predetermined threshold size is not defined or the coding block is larger than the predetermined threshold size, a temporal merging motion information candidate not shared for all the prediction blocks in the coding block from a prediction block of a coded picture different from a picture having a prediction block subject to coding;
a merging motion information candidate generation unit configured to generate a plurality of merging motion information candidates including the temporal merging motion information candidate and zero or more spatial merging motion information candidates;
a merging motion information selection unit configured to select one merging motion information candidate from the plurality of merging motion information candidates based on a candidate specifying index and to use the selected merging motion information candidate as motion information of the prediction block subject to coding; and
a coding unit configured to code the candidate specifying index and information for indicating whether or not to define the predetermined threshold size,
wherein the predefined motion vectors are (0,0),
wherein the size of the coding block is one of a plurality of sizes of a minimum size to a maximum size, and the size of the coding block is variable in a picture.

2. A moving picture coding method for coding a coding block consisting of greater than or equal to one prediction block, comprising:
deriving, when a predetermined threshold size is defined and the coding block is smaller than or equal to the predetermined threshold size, a temporal merging motion information candidate shared for all the prediction blocks in the coding block from a prediction block of a coded picture different from a picture having a prediction block subject to coding and derive, when the predetermined threshold size is not defined or the coding block is larger than the predetermined threshold size, a temporal merging motion information candidate not shared for all the prediction blocks in the coding block from a prediction block of a coded picture different from a picture having a prediction block subject to coding;
generating a plurality of merging motion information candidates including the temporal merging motion information candidate and zero or more spatial merging motion information candidates;
selecting one merging motion information candidate from the plurality of merging motion information candidates based on a candidate specifying index and to use the selected merging motion information candidate as motion information of the prediction block subject to coding; and
coding the candidate specifying index and information for indicating whether or not to define the predetermined threshold size,
wherein the predefined motion vectors are (0,0),
wherein the size of the coding block is one of a plurality of sizes of a minimum size to a maximum size, and the size of the coding block is variable in a picture.

3. A moving picture decoding device adapted to decode a decoding block consisting of greater than or equal to one prediction block, comprising:

a decoding unit configured to decode an index specifying a candidate and information for indicating whether or not to define a predetermined threshold size;

a temporal merging motion information candidate generation unit configured to derive, when the predetermined threshold size is defined and the decoding block is smaller than or equal to the predetermined threshold size, a temporal merging motion information candidate shared for all the prediction blocks in the decoding block from a prediction block of a decoded picture different from a picture having a prediction block subject to decoding and derive, when the predetermined threshold size is not defined or the decoding block is larger than the predetermined threshold size, a temporal merging motion information candidate not shared for all the prediction blocks in the decoding block from a prediction block of a decoded picture different from a picture having a prediction block subject to decoding;

a merging motion information candidate generation unit configured to generate a plurality of merging motion information candidates including the temporal merging motion information candidate and zero or more spatial merging motion information candidates;

a merging motion information selection unit configured to select one merging motion information candidate from the plurality of merging motion information candidates based on the index and to use the selected merging motion information candidate as motion information of the prediction block subject to decoding, and wherein the predefined motion vectors are (0,0), wherein the size of the decoding block is one of a plurality of sizes of a minimum size to a maximum size, and the size of the decoding block is variable in a picture.

4. A moving picture decoding method for decoding a decoding block consisting of greater than or equal to one prediction block, comprising:

decoding an index specifying a candidate and information for indicating whether or not to define a predetermined threshold size;

deriving, when the predetermined threshold size is defined and the decoding block is smaller than or equal to the predetermined threshold size, a temporal merging motion information candidate shared for all the prediction blocks in the decoding block from a prediction block of a decoded picture different from a picture having a prediction block subject to decoding and derive, when the predetermined threshold size is not defined or the decoding block is larger than the predetermined threshold size, a temporal merging motion information candidate not shared for all the prediction blocks in the decoding block from a prediction block of a decoded picture different from a picture having a prediction block subject to decoding;

generating a plurality of merging motion information candidates including the temporal merging motion information candidate and zero or more spatial merging motion information candidates;

selecting one merging motion information candidate from the plurality of merging motion information candidates based on the index and to use the selected merging motion information candidate as motion information of the prediction block subject to decoding, and wherein the predefined motion vectors are (0,0), wherein the size of the decoding block is one of a plurality of sizes of a minimum size to a maximum size, and the size of the decoding block is variable in a picture.

\* \* \* \* \*